(12) United States Patent
Eglen et al.

(10) Patent No.: US 8,095,424 B2
(45) Date of Patent: Jan. 10, 2012

(54) DYNAMIC PRICING OF ITEMS BASED ON SALES CRITERIA

(75) Inventors: Jeffrey Lee Eglen, Mount Pleasant, SC (US); Jeremy Eglen, Fishers, IN (US); Josh Voils, Brownsburg, IN (US)

(73) Assignee: Digonex Technologies, Inc., Indianapolis, IN (US)

( * ) Notice: Subject to any disclaimer, the term of this patent is extended or adjusted under 35 U.S.C. 154(b) by 642 days.

(21) Appl. No.: 11/880,173

(22) Filed: Jul. 20, 2007

(65) Prior Publication Data

US 2008/0027827 A1    Jan. 31, 2008

Related U.S. Application Data

(63) Continuation-in-part of application No. 11/422,546, filed on Jun. 6, 2006, which is a continuation of application No. 10/084,777, filed on Feb. 27, 2002, now Pat. No. 7,080,030.

(60) Provisional application No. 60/272,130, filed on Feb. 28, 2001, provisional application No. 60/310,381, filed on Aug. 6, 2001.

(51) Int. Cl.
*G06Q 30/00* (2006.01)

(52) U.S. Cl. .................... 705/26.1; 705/27.1

(58) Field of Classification Search .............. 705/26, 705/27

See application file for complete search history.

(56) References Cited

U.S. PATENT DOCUMENTS

| | | | | |
|---|---|---|---|---|
| 5,933,813 | A * | 8/1999 | Teicher et al. ............ | 705/26 |
| 5,950,178 | A * | 9/1999 | Borgato .................. | 705/37 |
| 5,987,425 | A * | 11/1999 | Hartman et al. ............ | 705/20 |
| 6,085,169 | A * | 7/2000 | Walker et al. ............. | 705/26 |
| 7,509,270 | B1 * | 3/2009 | Hendricks et al. .......... | 705/26 |
| 2001/0014868 | A1 * | 8/2001 | Herz et al. ............... | 705/14 |
| 2001/0047308 | A1 * | 11/2001 | Kaminsky et al. .......... | 705/26 |
| 2002/0026368 | A1 * | 2/2002 | Carter, III ............... | 705/20 |

OTHER PUBLICATIONS

Chapter 1 An overview of the retail industry: trends and statistics. Plunkett's Retail Industry Almanac, p. 7 Jan. 2001.*
U.S. Appl. No. 60/230,355.

* cited by examiner

*Primary Examiner* — Jeffrey A Smith
*Assistant Examiner* — Resha Desai
(74) *Attorney, Agent, or Firm* — Ice Miller LLP

(57) ABSTRACT

A method of dynamically adjusting prices of items using a processor based upon the category to which the item is assigned and sales criteria of the item relative to other items in the category is disclosed. The items are of the type that are deliverable over a network.

18 Claims, 37 Drawing Sheets

Fig. 15

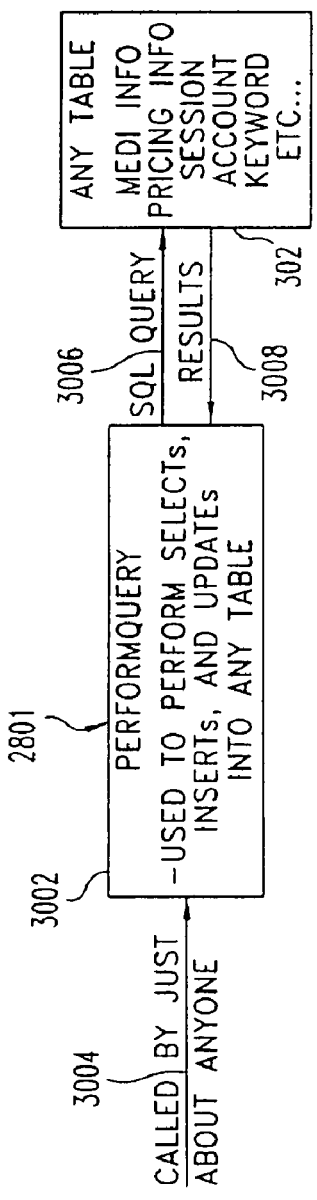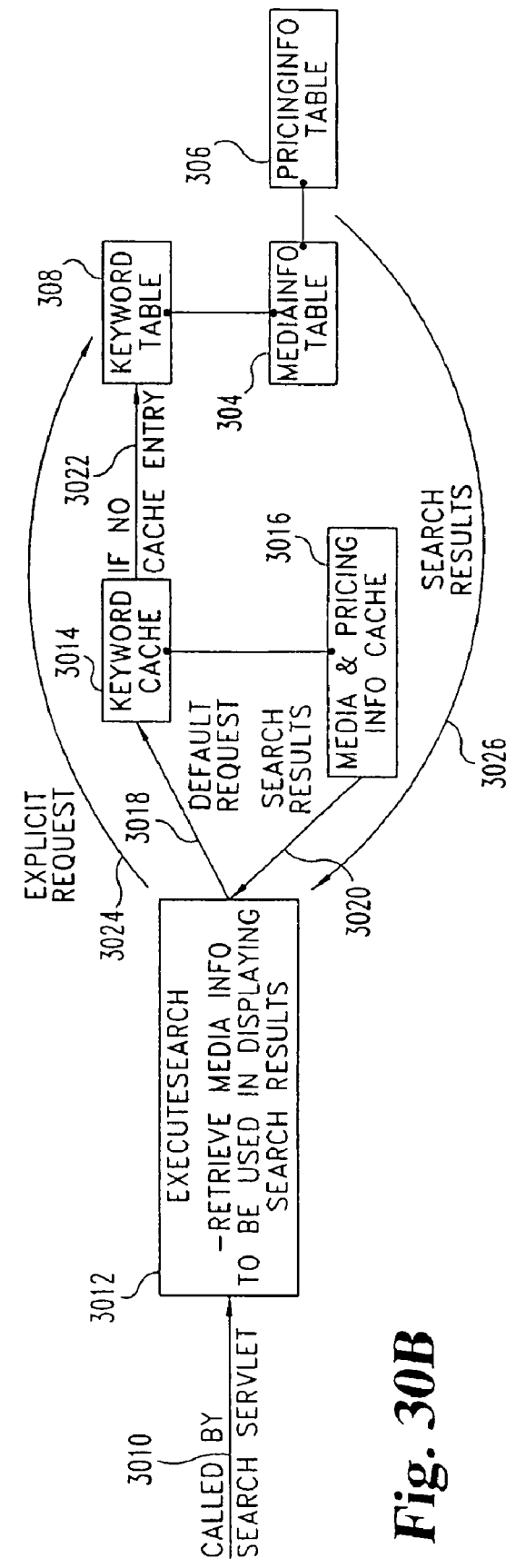
Fig. 30A
Fig. 30B

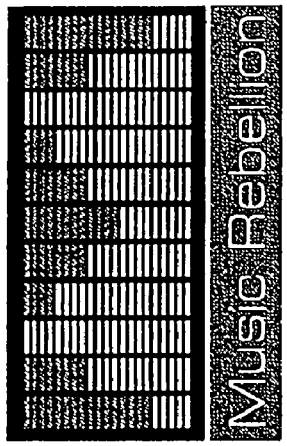

*Fig. 32*

MusicRebellion.Com, Inc.
Attn: New Artist Contracts
100 South Campus Drive
P.O. Box 3799
Terre Haute, IN 47803-0799
812-244-4120

Artist Agreement & Release

This agreement ("Agreement") is between MusicRebellion.Com, Inc., having an office at 100 South Campus Drive, Suite #252, Terre Haute, Indiana 47802 ("MR") and _____, having an address of _____ ("You" or "Your"). You are an individual, or an authorized representative of a group, in which case this Agreement applies to each and every member of the group.

I AGREE    CANCEL

DYNAMIC PRICING OF ITEMS BASED ON SALES CRITERIA

RELATED APPLICATIONS

The present application is a continuation-in-part of pending U.S. patent application Ser. No. 11/422,546 filed Jun. 6, 2006 which is a continuation of U.S. patent application Ser. No. 10/084,777, filed Feb. 27, 2002 (now U.S. Pat. No. 7,080,030) which claimed the benefit of commonly owned U.S. Provisional Patent Application Ser. No. 60/272,130, filed Feb. 28, 2001, and U.S. Provisional Patent Application Ser. No. 60/310,381, filed Aug. 6, 2001, all of which are hereby incorporated by reference in their entirety.

SUMMARY AND BACKGROUND

The present invention generally relates to purchasing systems, and more specifically, but not exclusively, concerns a sales system adapted to dynamically price goods and/or services over a computer network.

With the recent explosion in Internet commerce, the amount of stolen or pirated content has been on the rise. Encryption systems, such as Secured Digital Music Interface (SDMI), can be circumvented by hackers so that songs contained therein are freely available. For example, point-to-point (peer-to-peer) (P2P) programs, such as Napster and Gnutella, have made it very easy for a person to copy copyrighted material without compensating the author or artist. Consumers who download the pirated content believe that it is "free"; when in actuality they are "stealing" the author's work. Current intellectual property laws are not comprehensive enough and have not quickly adapted to cover this developing technology. Since intellectual property rights vary internationally, enforcement of those rights across national boundaries can be difficult. Although suits against P2P providers, such as Napster, have been successful, the cost and time involved in achieving a successful result can be prohibitive. Moreover, systems like Gnutella do not require a central index server for maintaining a list of users. This decentralized approach makes it nearly impossible to shutdown such systems since there is no central operator to target for suit. Pursuing legal remedies against individual users who break copyright laws only antagonizes the public further and creates further animosity towards the recording, movie, software and publishing industries.

Due to their popularity, the P2P swapping services, like Napster and Gnutella, have dramatically increased network loads of institutions where such services are extremely popular, like colleges and universities. To combat the increased network loads, universities have denied students access to such services across their networks. Thus, these services are severely hampered in contacting an extremely desirable demographic of consumers, students.

Therefore, there has been a long-felt need for a system to provide digital media priced so that content suppliers can make a profit, and at the same time provide an incentive for consumers to purchase and not steal content.

One form of the present invention concerns a unique digital media content purchasing system. Other forms concern unique systems, apparatus and techniques for supplying media content.

According to one aspect of the disclosure, a method includes the step of identifying a plurality of media items belonging to a category. A processor groups a first plurality of the media items identified as belonging to the category into a first group based on a sales criteria associated with each of the plurality of media items, prices each media item in the first group according to a first pricing strategy and sends a first price determined by the processor using the first pricing strategy of a first item of the plurality of items in the first group for sale from a processor to one or more clients over a network. A processor groups a second plurality of the media items identified as belonging to the category into a second group based on a sales criteria associated with each of the plurality of media items, prices each media item in the second group according to a second pricing strategy and sends a second price determined by the processor using the second pricing strategy of a second item of the plurality of items in the second group for sale from a processor to one or more clients over a network. The value of the sales criteria associated with each of the media items in the first group is superior to the value of the sales criteria associated with each of the media items in the second group. Also, the first pricing strategy generates a higher price for media items in the first group than the price generates for each media item in the second group by the second pricing strategy.

Other forms, embodiments, objects, features, advantages, benefits, and aspects of the present invention shall become apparent from the detailed drawings and description contained herein.

BRIEF DESCRIPTION OF THE DRAWINGS

FIG. 15 shows a charge credit card display screen for the dynamic pricing system.

FIG. 32 shows an artist agreement and release display screen for the dynamic pricing system.

DETAILED DESCRIPTION

Figure 1:
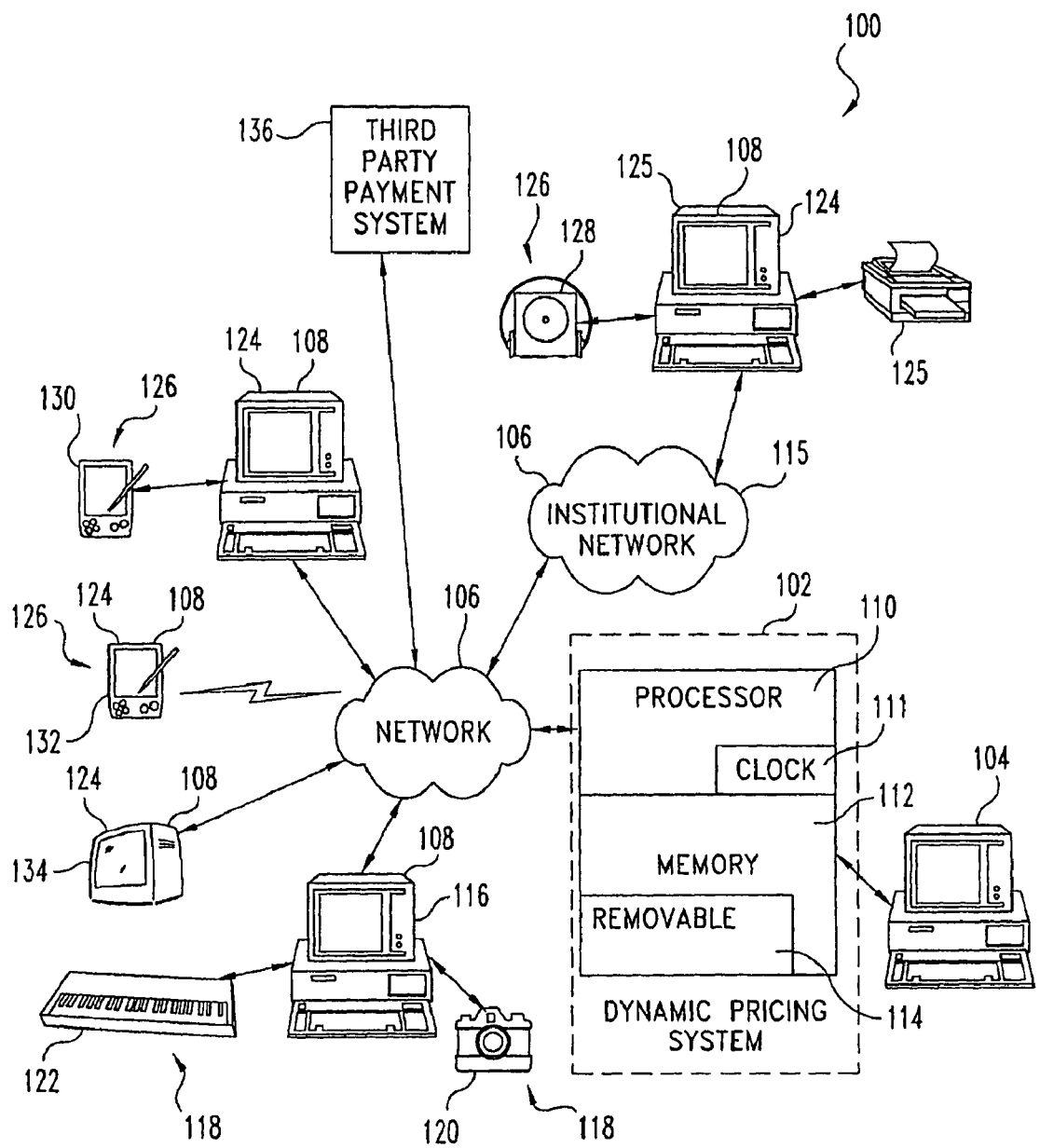
FIG. 1 shows a diagrammatic view of a communication system that includes a dynamic pricing system according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 depicts a communication system 100 according to one embodiment of the present invention in a diagrammatic form. The communication system 100 includes a dynamic pricing system 102, an administrative computer 104, a network 106, and one or more user computers/devices (clients) 108. An administrator of the dynamic pricing system manages the dynamic pricing system 102 with the administrative computer 104. As illustrated, the administrative computer 104 is operatively coupled to the dynamic pricing system 102, and the dynamic pricing system 102 is operatively coupled to the other systems through the network 106. As should be appreciated, administrative computer 104 can also be operatively coupled to system 102 through the network 106. Although only one administrative computer 104 is shown in FIG. 1, it should be understood that system 100 can include multiple administrative computers 104. The administrative computer 104 can include a personal computer, a computer terminal, a personal digital assistant (PDA) and/or other types of devices generally known to those skilled in the art. In one embodiment, administrative computer 104 is a personal computer.

The dynamic pricing system 102 stores, dynamically prices, and delivers media content items to the clients 108 over the network 106. The dynamic pricing system 102 is also operable to receive media content from the clients 108. This media content can include, but is not limited to, music, books, movies, videos, television shows, software, coupons, tickets, web pages, magazines, newspapers, and other types of electronic media. As should be appreciated from the discussion below, the dynamic pricing system 102 can be adapted to dynamically price goods and/or services, such as electronics and repair services. For instance, these goods and/or service items can include, but are not limited to, compact discs, digital versatile discs, electronic products, household products, jewelry, furniture, telephone services, and the like. It should be appreciated that such items, when purchased, can be delivered electronically over the network 106 and/or physically delivered, for example by a postal carrier. As illustrated, the dynamic pricing system 102 includes a processor 110, a clock 111 and memory 112. The dynamic pricing system 102 can be located on a single server or distributed over several servers. In one embodiment, the dynamic pricing system 102 is incorporated into one or more web servers. The processor 110 is used to control the operation of the dynamic pricing system 102. The processor 110 may be comprised of one or more components. For a multi component form of processor 110, one or more components may be located remotely relative to the others, or configured as a single unit. Furthermore, processor 110 can be embodied in a form having more than one processing unit, such as a multi-processor configuration, and should be understood to collectively refer to such configurations as well as a single-processor-based arrangement. One or more components of the processor 110 may be of electronic variety defining digital circuitry, analog circuitry, or both. Processor 110 can be of a programmable variety responsive to software instructions, a hardwired state machine, or a combination of these. The clock 111 is used to time events in the dynamic pricing system 102. As should be appreciated, the clock 111 can be incorporated into the processor 110 or can be a stand-alone component. Further, the clock 111 can be hardware and/or software based. Among its many functions, the memory 112 in conjunction with the processor 110 is used to store media content and manage sales. Memory 112 can include one or more types of solid state memory, magnetic memory, or optical memory, just to name a few. By way of nonlimiting example, the memory 112 can include solid state electronic random access memory (RAM), sequential access memory (SAM), such as first-in, first-out (FIFO) variety or last-in, first-out (LIFO) variety, programmable read only memory (PROM), electronically programmable read only memory (EPROM), or electronically erasable programmable read only memory (BEPROM); an optical disc memory (such as a DVD or CD-ROM); a magnetically encoded hard disc, floppy disc, tape, or cartridge media; or a combination of these memory types. In addition, the memory 112 may be volatile, non-volatile, or a hybrid combination of volatile, non-volatile varieties. In the illustrated embodiment, the memory 112 further includes removable memory 114. The removable memory 114 can be in the form of a non-volatile electronic memory unit, optical memory disk (such as a DVD or CD-ROM); a magnetically encoded hard disk, floppy disk, tape, or cartridge media; or a combination of these or other removable memory types.

Network 106 can include the Internet, one or more other wide area networks (WAN), a local area network (LAN), a proprietary network such as provided by America Online, Inc., an institutional network, a cable television network, a public switched telephone network (PSTN), a combination of these, and/or other types of networks generally known to those skilled in the art. In one form of the present invention, the network 106 includes the Internet. In the illustrated embodiment, the network 106 further includes an institutional network 115. As should be appreciated that the network 106 can include more than one institutional network 115. The institutional network 115 is maintained by institutions, such as colleges, universities, high schools, technical schools, other types of learning institutions, and/or charitable organizations. As shown, client devices 108 are operatively coupled to the network 106. Users access the dynamic pricing system 102 through the client devices 108. The clients 108 and the dynamic pricing system 102 communicate with one another by sending signals across the network 106. In one form, these signals can include HyperText Mark Up Language (HTML) pages, Extensible Mark Up Language (XML) Page, and other types transmission protocols. For example, the dynamic pricing system 102 can send a signal corresponding to a web page form across the network 106 to the client 108. The user with client 108 can fill out the form and send a signal corresponding to the filled-out form across the network 106 to the dynamic pricing system 102. By way of non-limiting examples, the clients 108 can include personal computers, both fixed and portable; computer terminals; PDA's; cellular telephones, land line based telephones and the like; television systems, such as televisions, television-based web browsers, digital video recorders, analog video recorders, cable boxes, cable modems, direct broadcast satellite (DBS) boxes, digital versatile disc (DVD) players and video game systems; home entertainment systems, such as stereo equipment, MP3 players, and the like; sound production equipment; video/movie production equipment; or a combination these components, to name a few examples. As shown, the clients 108 are operatively coupled to the dynamic pricing system 102 over the network 106. It should be appreciated that the clients 108 can be operatively coupled to the dynamic pricing system 102 through hardwired and/or wireless connections. The clients 108 are hardwired and/or have software that allows the clients 108 to communicate over the network 106. In one embodiment, the clients 108 are personal computers with software that can include email applications, web browsers, chat programs, and/or proprietary software.

Users of the dynamic pricing system 102 can be further categorized into two types of users, mainly: content suppliers (or artists) and content consumers (or customers). For example, content suppliers can include, but are not limited to, artists, authors, directors, programmers, producers, actors, performers, publishers, movie/television studios, music labels, copyright holding organizations such as the Recording Industry Association of America (RIAA), and their agents. As should be appreciated, the same user of the dynamic pricing system 102 can be a combination of both types, such that they can take the role of being both a content supplier and consumer. As shown, the clients 108 can include one or more content supplier computers/devices 116. The content supplier computer 116 can include, but is not limited to, any of the devices that were described above for the clients 108. With content supplier computer 116, a content supplier can post media content for sale on the dynamic pricing system 102. The media content can come from a source outside of computer 116, or an artist can generate the content with the content supplier computer 116 and/or peripheral devices 118 that operatively coupled to the content supplier computer 116. These peripheral devices 118 can include, but are not limited to, electronic keyboards, digital cameras, scanners, video cameras, video production equipment, sound production equipment, PDA's, portable computers, and other types of content producing equipment. For example, in the illustrated embodiment, the artist can use a camera 120 to create still photographs, movies and videos. Further, in the illustrated embodiment, the artist can create music with keyboard 122 and can create software or text with the content supplier computer 116. Although a single content supplier computer 116 is illustrated in FIG. 1, it should be appreciated that system 100 can include multiple content supplier computers 116. Content suppliers can sell individual items and/or bundle multiple items for sale on the dynamic pricing system 102. For example, the dynamic pricing system 102 can sell one song and two pictures collectively for a single price. In another example, two pictures can be bundled together and sold at a single price on the dynamic pricing system 102.

The clients 108 further include customer devices 124. It should be understood that customer devices 124 can include, but are limited to, the devices as described above for the clients 108. As shown, the customer devices 124 can further include institutional member devices 125. Institutional members, such as students and teachers, are operatively coupled to the dynamic pricing system 102 through the institutional network 115. With customer devices 124, consumers can purchase and download content from the dynamic pricing system 102. Consumers can view, listen to and/or interact with the content they purchased with customer devices 124. For example, when the customer device 124 is a personal computer, the personal computer can be used to store compressed digital media musical content, such as MP3 files. The personal computer then can be used to play, store, and/or "burn" CDs with music from the MP3 files. In the illustrated embodiment, a consumer can download a book with customer device 124 and print out the book with a printer 125 that is operatively coupled to the customer device 124. Alternatively or additionally, the consumer can download the purchased content to one or more portable devices 126. These portable devices 126 can include, but are not limited to, portable music players (such as MP3 players), PDA's, cellular telephones, portable televisions, portable computers, hand held games, e-book readers and/or a combination of these devices. As shown, the portable devices 126 can be operatively to the customer devices 124 in order to download the purchased content. The portable devices 126 can also be operatively coupled to the network 106 through a wireless network connection. For example, a portable music player 128, such as an MP3 player, can download purchased songs from the customer device 124. It should be understood that dynamic pricing system 102 is not limited to a specific file format, such as the MP3 format for music. Rather, the dynamic pricing system 102 is able to accommodate a wide range of file formats such as WAV and SDMI complaint files for musical works and ASCII and portable document format (PDF) files for text, for example. In the illustrated embodiment, a consumer with customer device 124 can download a purchased book, software program, song, and/or movie to a PDA 130. Moreover, the portable devices 126 can be operatively coupled to the network 106 in order to directly purchase and receive content from the dynamic pricing system 102. As illustrated, a wireless PDA or cellular telephone 132 can purchase and download content directly from the dynamic pricing system 102. In another example illustrated in FIG. 1, a customer can purchase dynamically priced movies or television shows with a television 134. In this example, the customer purchases the program from the dynamic pricing system 102 through the Internet, a cable system and/or a direct broadcast satellite (DBS) system (network 106). Payments for content purchased on the dynamic pricing system 102 can be handled internally and/or handled by a third party system. In one embodiment, a third party payment service 136 is used process customer payments for downloaded content. In one form, the third party payment system 136 includes Verisign's PayFlow system.

Figure 2:
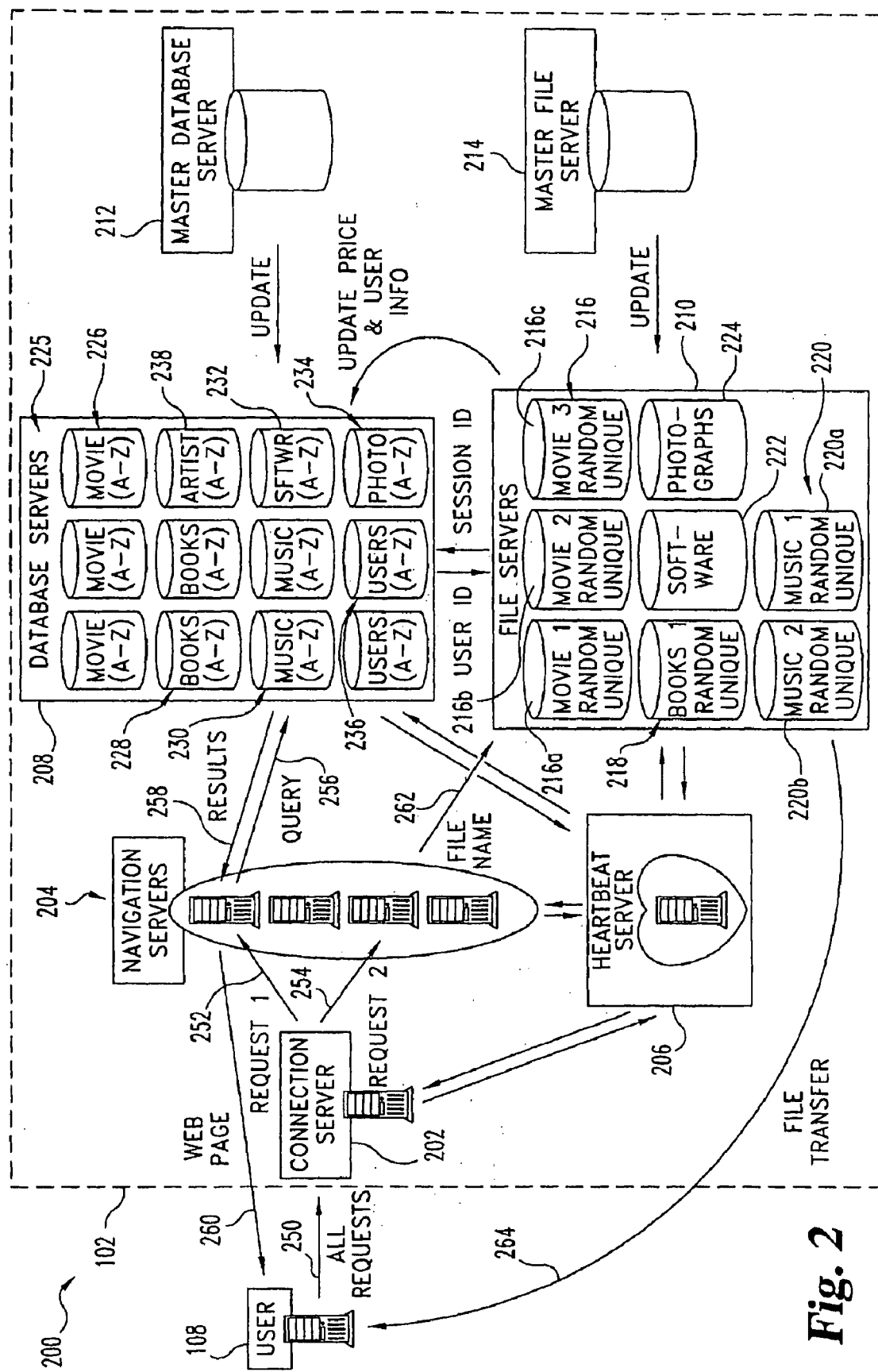
FIG. 2 shows a diagrammatic view of a communication system that includes a dynamic pricing system according to another embodiment of the present invention.

A detailed illustration of one of many embodiments of the dynamic pricing system 102 is illustrated in FIG. 2. As shown, system 200 includes the dynamic pricing system 102 and one or more clients 108. Although not illustrated in FIG. 2, the client computer 108 in the FIG. 2 embodiment is operatively coupled to the dynamic pricing system 102 through the network 106 in the same manner as illustrated in FIG. 1. In one form, the network 106 for the FIG. 2 dynamic pricing system 102 includes the Internet. The dynamic pricing system 102 in the FIG. 2 embodiment includes one or more connection servers 202, one or more navigation servers 204, one or more heartbeat (load balancing) servers 206, one or more database servers 208, one or more file servers 210, one or more master database servers 212, and one or more master file servers 214. Although servers 202, 204, 206, 208, 210, 212 and 214 are illustrated as separate units, it should be understood that selected servers or all of the servers can be combined to form a single unit. In one form, the dynamic pricing system 102 utilizes the Linux operating system with programs coded in the JAVA language. As should be appreciated, the dynamic pricing system can use other operating systems, such as UNIX, Windows and Apple Macintosh operating systems, to name a few. Further, the software in the dynamic pricing system 102 can be programmed in other languages besides JAVA, such as C++, Visual Basic, Fortran, Pascal, CGI and PERL, to name a few.

As illustrated, the heartbeat server 206 is operatively coupled to the connection server 202, the navigation servers 204, the database servers 208, and the file servers 210 in order to monitor their load. The connection server 202 is operatively coupled to the navigation servers 204. The navigation servers 204, the database servers 208 and file servers 210 are operatively coupled to with one another. The heartbeat server 206 monitors the performance of the other servers and load balances the dynamic pricing system 102. Periodically, servers 202, 204, 208 and 210 individually send their load status information to the heartbeat server 206. With the collected status information, the heartbeat server 206 is able to load balance servers 202, 204, 208 and 210. If the heartbeat server 206 does not receive a status signal from one of the servers 202, 204, 208 or 210, the heartbeat server 206 concludes that the server is offline, or otherwise unavailable, and directs the requests to the remaining servers. For example, when one of the database servers 208 goes offline, the heartbeat server 206 can route requests to the remaining database servers 208. Each server receives load information about the other servers from the heartbeat server 206. Based on this load information, a server can send processing requests to a server with the lowest load in order to improve the operational efficiency of the dynamic pricing system 102.

The connection server 202 is operatively coupled to the clients 108 over the network 106. The connection server 202 receives and processes all requests from the clients 108. When a request is received, the connection server 202 queries the heartbeat server 206 to find an available navigation server 204 with the lowest load. The connection server 202 then forwards the request to the navigation server 204 with the lowest load. Based on the request and the load information from the heartbeat server 206, the navigation server 204 determines the appropriate database server 208 and/or file server 210 to contact in order to process the request.

The file servers 210 store the media content that is for sale on the dynamic pricing system 102. As illustrated, the file servers 210 can maintain different media types on separate servers. For example, the file servers 210 can include one or more movie servers 216, one or more book/text servers 218, one or more music servers 220, one or more software servers 222, and one or more photograph/picture servers 224. However, it should be understood that the different media types can be stored on a single server or combined on an array of servers. In the FIG. 2 embodiment, movies, videos, shows, and the like are store on movie servers 216. As shown in the illustrated embodiment, there are three movie servers, first 216a, second 216b and 216c third movie servers. Books, poems, short stories, manuals, news articles and other types of text are stored on the books server 218. The music servers 220 store music, songs, lyrics, sound recordings and the like. In the illustrated embodiment, the music servers 220 include a first music server 220a and a second music server 220b. Software and pictures are respectively stored in the software server 222 and the photograph server 224. The master file server 214 maintains masters of the files stored on the file servers 210 and periodically updates the files stored on the file servers 210. In one form, so as to minimize the risk of corruption, the master file server 214 is offline with respect to the file server 210 and only connects to the file servers 210 when updating the files on the file servers 210.

Depending on popularity, multiple copies of the same work (file) can be stored on multiple file servers 210. Initially, a file containing the work (content) is loaded onto one of the files servers 210, which becomes the "home" file server 210 for the work. For example, during initialization of the dynamic pricing system 102, a song is loaded from the master file server 214 onto the second music server 220b, which becomes the "home" music server 220 for this particular song. As the song becomes popular, the second music server 220b can place a copy of the file containing the song onto the first music server 220a so as to optimize performance of the dynamic pricing system 102. All requests for the song are initially placed with the "home" music server 220, which is the second music server 220b in this example, and if the second, home music server 220b is unable to process a request for the song, the second music server 220b redirects the request to one of the other music servers 220 that has a copy of the song, which in this case is the first music server 220a. Since all requests for downloading of a content file are first placed with the home file server 210, the home file server 210 is able to track and record the number of times the particular content file has been purchased and downloaded. The home file server 210 also perform keeping functions by removing copies of less popular works from the other file servers 210 in order to conserve space in memory 112. Using the same example, once the song becomes less popular, the second, home music server 220b can delete the copy of the song from the first music server 220a. In one embodiment, different works can have different home file servers 210. Returning to the same example, while the second music file server 220b was the home file server 210 for the first song, the first music file server 220a can be the home file server 210 for a second, different song. In another embodiment, all of the works for a particular type of work (music, books, movies, etc.) can have one file server 210 designated as the home file server 210. For example, in this embodiment, all of the songs loaded into the dynamic pricing system 102 can have the first music file server 220a as their "home" file sever 210.

The database servers 208 store information about the content stored on the file servers 210 and information about users of the dynamic pricing system 102, both customers and artists. This information is stored in one or more databases 225 on the database servers 208, and this information can include, but is not limited to, the name/address of the "home" file server 210 for the works; the names of the artists, authors, directors, actors and/or owners of the works; titles; publishers; producers; type of work, such as music, text or video; work category (drama, humor, rock, jazz . . . ); subject; pricing information and size/length of the work. The databases 225 on the database servers 208 can be a standard file, a combination of files, a standard database program, a relational database, a SQL (Structured Query Language) database, and/or other types of data storage structures as generally known by those skilled in the art. In one embodiment, the databases are 225 on the database servers 208 are PostGreSQL databases. As should be appreciated, the databases 225 on the database servers 208 can be other types of database, such as an Oracle or Microsoft SQL Server type databases. In the illustrated embodiment, the database servers 208 have multiple databases 225 organized by content type. For example, the databases 225 can include one or more movie databases 226; one or more book/text databases 228; one or more music databases 230; one or more software databases 232; one or more photograph/picture databases 234; one or more user databases 236; and/or one or more artist information databases 238. The databases 225 can be active as separate database instances on a single database server 208 or on separate database servers 208. In the illustrated embodiment, the databases 225 are maintained on separate database servers 208. To improve performance, the database servers 208 in one embodiment contain multiple, redundant copies of the same database 225.

In the illustrated embodiment, the database servers 208 in FIG. 2 have three movie databases 226 stored on separate database servers 208 that contain the same information. The movies databases 226 contain information about the movies, videos and/or shows stored in the movie file servers 216. For instance, the movies databases 226 can store the file name along with the name/address of the home movie file server 216; file size; title; writer; director; actors; producers; writers; distributors; movie category, such as drama or action; description; comments; reviews; pricing and demand information; and/or length of the work. The books databases 228 maintain information about the text stored in the books file servers 218. For example, the books databases 228 can store the file name along with the home book file server 218 for a work; file size; the title; author; owner; publisher; distributor; picture of the author and/or book cover; category, such as biography or mystery; description; comments; reviews; pricing and demand information; and/or size of the work. Similarly, the music databases 230 can store the file name of a song, the location of the file on the home music server 220, song title, artist, author, producer, distributor (label), album name, album picture, picture of the artist, musical category (i.e. rock, jazz . . . ), description, comments, pricing information, demand information, and/or length/size of the song along with other information relating to the song. The software databases 232 and the picture databases 234 respectively store information about the software stored on the software file servers 222 and the pictures stored on the picture file servers 224, and this information can include file name and home file server information 210; pricing and demand information; titles; size; category; owner and/or authorship. Information about the particular users of the dynamic pricing system 102, both customers and artist, is maintained in the users databases 236. The information in the users databases 236 can be used control access to the dynamic pricing system 102 and maintain billing information. Examples of such information include the username and password; first and last names; home and business addresses; email addresses; telephone numbers; session identifiers (ID's) and other session information; and billing and account balance information, to name a few. Biographical and other types of artist information is maintained one the artists databases 238. It should be understood that the above-described databases 225 can include additional information and/or omit certain information.

The master database server 212 maintains masters of the databases 225 stored on the database servers 208 and periodically updates the databases 225 stored on the database servers 208. In one form, so as to minimize the risk of corruption, the master database server 212 is offline with respect to the database servers 208 and only periodically connects to the database servers 208 when updating the databases 225.

All requests, such as a web page requests, from the client 108 (as indicated by arrow 250 in FIG. 2) are routed to the connection server 202. Based on load information from the heartbeat server 206, the connection server 202 routes the request, as indicated by arrows 252 and 254, to the navigation server 204 with the lowest load. In one embodiment, for each subsequent action by the user, the heartbeat server 206 remembers which server was previously used and routes the user to the same server. The navigation server 204 processes the requests. For instance, the navigation server 204 can query one of the databases 225, as shown by arrow 256, in order to process the request. The navigation server 204 selects the particular database server 208 based on the information required (i.e. information about music, books etc.) and the load information from the heartbeat server 206. As depicted by arrow 258, the results from the query are returned to the navigation server 204 that sent the query. Based on the results, the navigation server 204 generates a web page and sends the page to the client 108, which is depicted by arrow 260. In another example, the navigation server 204 processes a purchase/download request from the client by sending the requested file name to the home file server 210 for the particular file, which is indicated by arrow 262. As depicted by arrow 264, the file server 210 transfers the file to the client 108.

Figure 3:
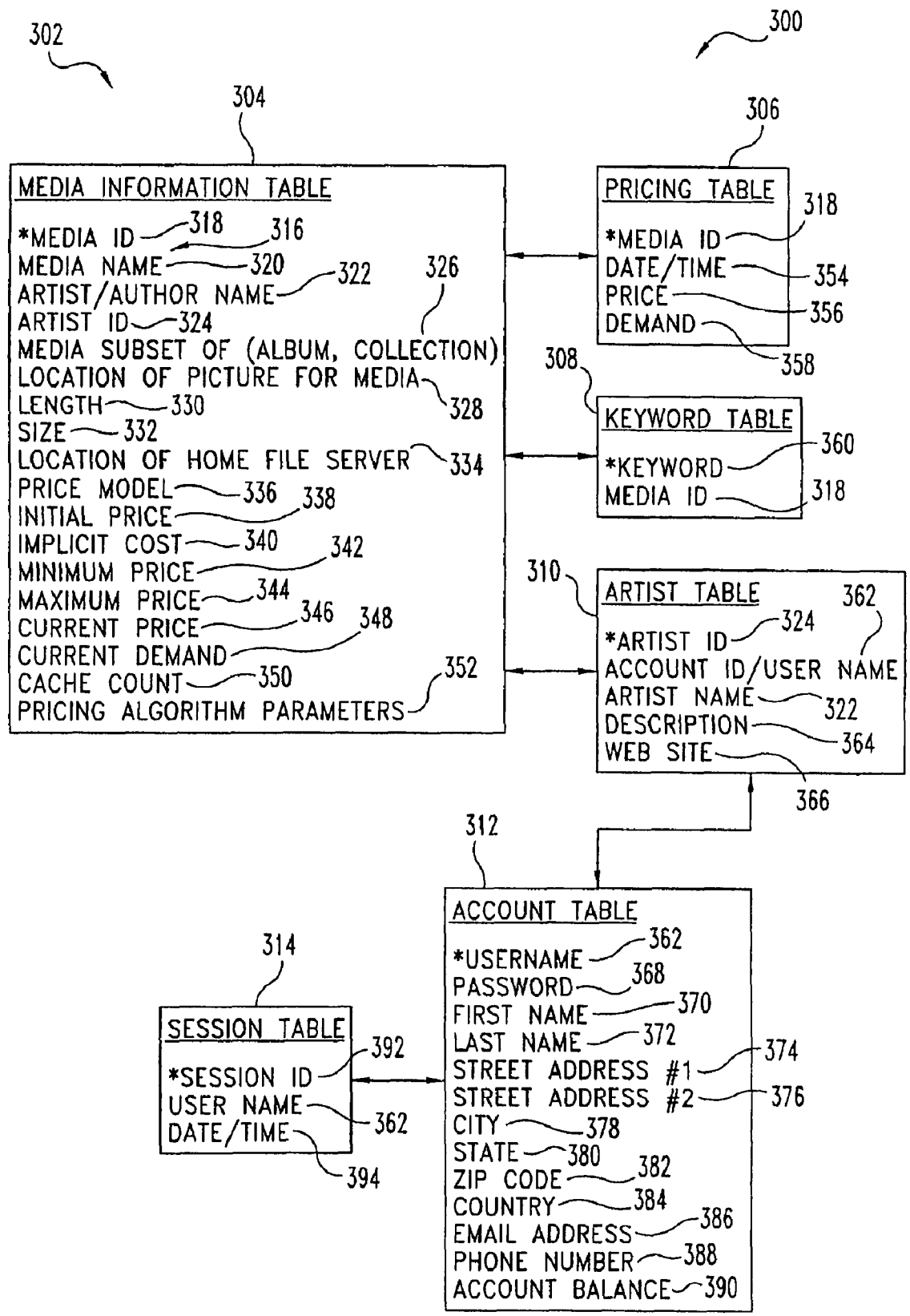
FIG. 3 shows a diagrammatic view of a table structure for the FIG. 2 dynamic pricing system.

A table structure 300 of database tables 302 in the databases 225 according to one embodiment of the present invention is illustrated in FIG. 3. As should be appreciated, the databases 225 can have different tables 302 and/or table structures 300 than the one shown. The tables 302 in the databases 225 include a media information table 304, a pricing table 306, a keyword table 308, an artist table 310, an account table 312, and a session table 314. The media information table 304 stores information about the media content stored on the file servers 210. In one embodiment, the movie 226, books 228, music 230, software 232, and photograph 234 databases each include one or more media information 304, pricing 306 and keyword 308 tables. The media information tables 304 includes a number of fields 316 that contain information about a particular media content item. As shown, the fields 316 in the media information table 304 can include a media ID field 318 for storing a unique identifier for an item; a media name field 320, which for example stores the name of the movie, song, program, etc.; an artist/author name field 322 in which the name of the artist is identified; and an artist ID field 324 which contains a unique identifier for individual artists on the dynamic pricing system 102. In FIG. 3, asterisked ("*") fields in the tables 302 are the fields by which the individual tables 302 are indexed. For instance, the media information table 304 is indexed by the media ID field 318. Categorical information, such as the album name and/or the type of music, can be stored in field 326. The filename, path and/or Internet Protocol (IP) address for an image related to the particular content is stored in field 328. For example, field 328 can contain the path and the file name of an image of a book or an album cover. The physical length of the item, such as the number of pages or playing time, is stored in field 330, and the file size of the item is stored in field 332. The file name and address, such as the path and/or IP address of the home file server 210, of the item is listed in field 334. The price model for dynamically pricing the item, the initial price for the item, and the implicit or marginal cost of the item are stored in fields 336, 338 and 340, respectively. Fields 342, 344 and 346 respectively store the minimum price for the item, the maximum price for the item and the current price for the item. The current demand, or the number of times the item was purchased within a specified period, is maintained in field 348. A count cache field 350 stores the number of purchases of the item since the last time the current demand was determined. Pricing algorithm parameters field 352 can store information such as the historical pricing and quantity ordered information for the item. In one form, field 352 stores the price and corresponding demand for the item over the last seven periods. It should be appreciated that depending on the dynamic pricing technique used, field 352 can store other parameters, such as the time between purchases.

The pricing table 306 stores information related to the price of particular media content items. The pricing table 306 includes media ID field 318 for identifying the particular item. The date/time, the price at that time, and the quantity demand at that time for the item identified by the media ID field 318 are stored in fields 354, 356 and 358, respectively. The keyword table 308 is used for searching and locating records of items in the databases 225 by keywords. In keyword table 308, the keywords are stored in field 360 and the media ID of the record that contains the keywords is stored in the media ID field 318. The artist table 310 is maintained in the artist database 238 and contains information about artists, authors, performers, directors, producers, and the like. The artist ID field 324 is a unique identifier for the artist. The username and artist name are respectively stored in fields 362 and 322 in table 310. A description of the artist and their work is maintained in field 364. The address to the web site for the artist is stored in field 366.

As illustrated in FIG. 3, account information for the users of the dynamic pricing system 102, both customers and suppliers, is maintained in account table 312. In one form, the account information table 312 is maintained in each user database 236. It should be appreciated that the user information in table 312 can be encrypted in order to ensure privacy. In table 312, the username and password for accessing the dynamic pricing system are maintained in fields 362 and 368, respectively. As shown, the first name and last name of the user is stored in fields 370 and 372, respectively. The street address of the user is stored in fields 374 and 376. The city, state, zip code, country, email address, and telephone number of the user are stored in fields 378, 380, 382, 384, 386 and 388, respectively. The account balance of the user is maintained in field 390. Information about user access to the dynamic pricing system 102 is maintained in the session table 314. In one form of the present invention, the session table 314 is stored in the user database 236. As should be appreciated, the session table 314 can be stored in other databases 225. The session table 314 stores a unique session ID in field 392 and the username in field 362. The date/time of the session is maintained in field 394. The tables 302 are linked to one another by various fields 316. For instance, the pricing 306 and keyword 308 tables can be linked to the media information table 304 via the media ID field 318. The session 314 and account 312 tables are linked to one another by the username field 362. The artist table 310 can be linked to table 304 via the artist ID field, and the artist table 310 can be linked to the account table via the username field 362.

In another embodiment of the present invention, the dynamic pricing system 102 is configured to dynamically price P2P transactions. In this embodiment, as shown in FIG. 1, the content is stored across multiple content supplier computers 116. The content supplier registers their content for sale on the dynamic pricing system 102, and the dynamic pricing system 102 dynamically prices the content. When an item is purchased, the content supplier computer/device 116 that has the item transfers the file containing the item directly over the network 106 to the customer device 124. For example, in one form of this embodiment, the content supplier computers 116, which are remotely distributed across the network 106, act like the file servers 210 of FIG. 2; while the database servers 208 remain centrally located in the manner as illustrated in FIG. 2. Like the other embodiments, the database servers 208 track the purchases made and administer user accounts. Moreover, the databases 225 store the file names of the content items for sale along with the corresponding addresses (paths) of the content supplier computers 116 that store the file. For example, the file server field 334 in the media information table 304 of FIG. 3 can store the file name and IP address of the content supplier computer 116. As should be appreciated, the dynamic pricing system 102 according to this embodiment provides a centralized access point for conducting and administering searches. In a further form, the dynamic pricing system 102 provides a mechanism, such as keys for encrypted content, for unlocking downloaded files and certifying that the downloaded file is correct. It should be appreciated that the propagation technique for popular downloads, as described above for the file servers 210, can also be used with the content supplier computers 116 in the P2P embodiment.

Figure 4:
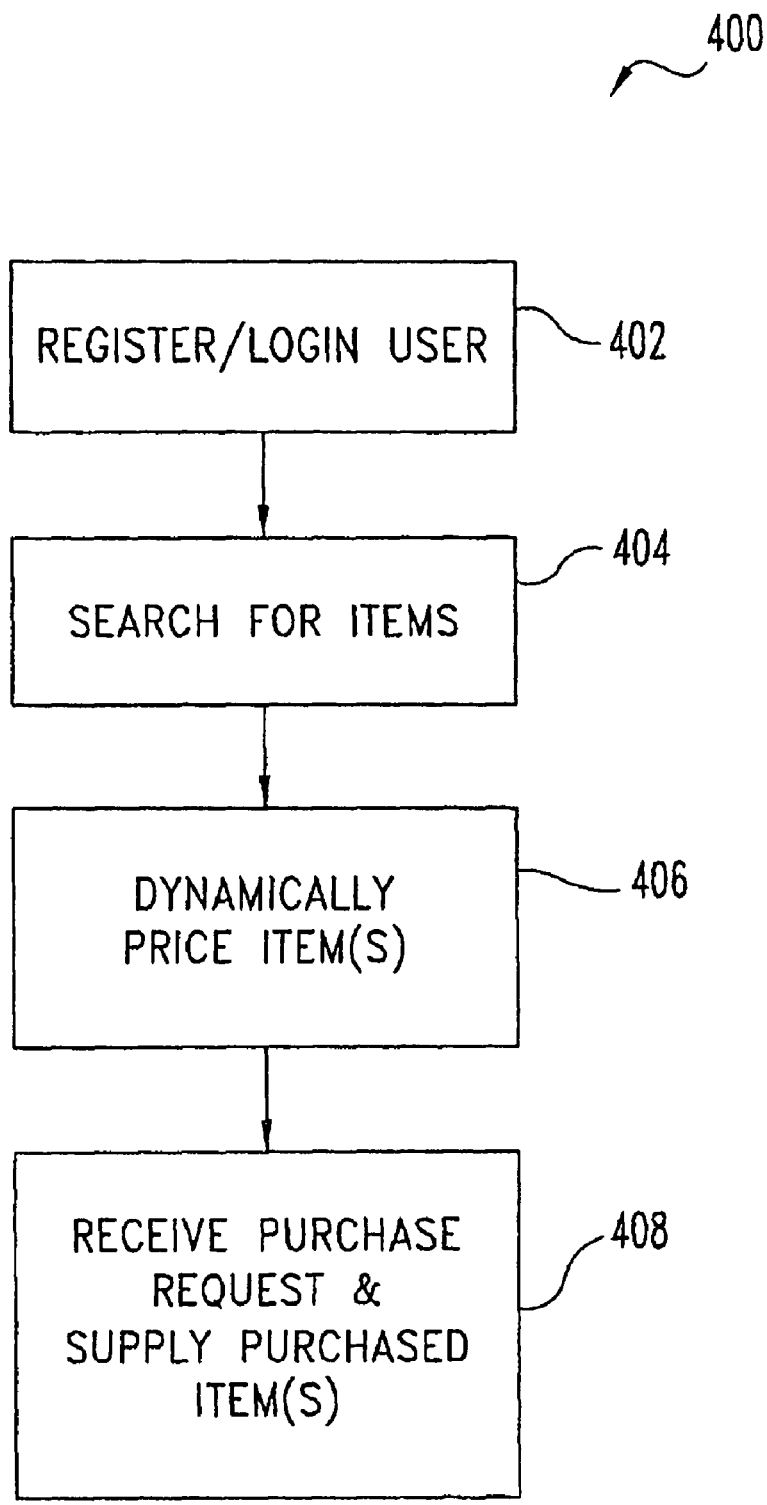
FIG. 4 is a flow diagram illustrating process for dynamically pricing and providing content according to one embodiment of the present invention.

A technique for dynamically pricing and providing content, according to one embodiment of the present invention, is illustrated with flow diagram 400 in FIG. 4. In stage 402, the customer with customer device 124 registers with the dynamic pricing system 102. Alternatively, if the customer has already registered with the dynamic pricing system 102, the customer can directly login to the dynamic pricing system 102. In one form, the client 108 has proprietary client software for interacting with the dynamic pricing system 102. In another form of the present invention, which is described below, the client 108 includes a web browser for interacting with the dynamic pricing system 102. The web browser allows the customer and/or artist to view web pages from the dynamic pricing system 102 and to submit forms to the dynamic pricing system 102. As should be appreciated, the customer first accesses the dynamic pricing system 102 by entering and/or selecting the domain name or the IP address of the dynamic pricing system 102 with the web browser. After accessing the dynamic pricing system, one of the navigation servers 204 sends a main web page to the client 108.

Figure 5:
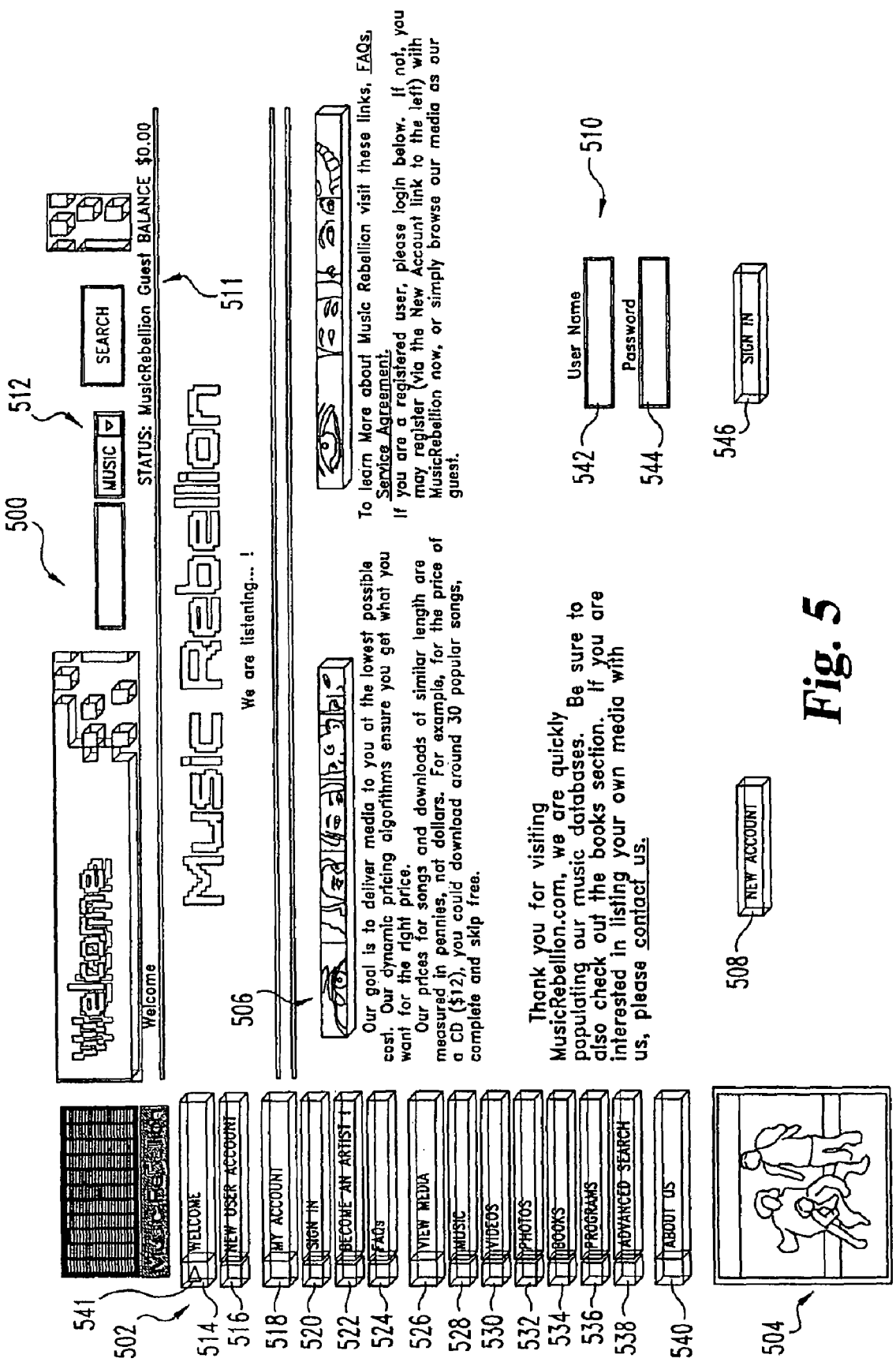
FIG. 5 shows a main display screen for the dynamic pricing system.

An example of a main web page 500 is illustrated in FIG. 5. It should be appreciated that the web pages described below can omit certain information and/or include information. Furthermore, although the interface describe below uses web pages, it should be appreciated that other types interfaces can be used to interact with users of the dynamic pricing system 102. For instance, a proprietary interface, a menu type interface, a voice command interface, and/or other types of interfaces as generally known by those skilled in the art can also be used. Page 500 includes a navigation toolbar 502, an advertisement portion 504, a general information portion 506, a new user button 508, a login portion 510, an account information portion 511, and a search portion 512. With the navigation toolbar 502, the user can navigate between the various web pages of the dynamic pricing system 102. As illustrated, the navigation tool bar 502 includes a welcome button 514, a new user account button 516, an account button 518, a sign in button 520, an artist registration button 522, a frequently asked question (FAQ) button 524, a view media button 526, a music button 528, a video button 530, a photograph button 532, a book button 534, a programs button 536, an advanced search button 538 and an about button 540. Selecting the welcome button 514 causes the main web page 500 to appear on the client 108. As shown in FIG. 5, page pointer 541 is positioned next to the welcome button 514 so as to indicate that the user is currently on the main web page 500. The user of the dynamic pricing system can create a new user account by selecting either the new user account button 516 or the new account button 508, and can edit their account information by selecting the account button 518. The sign in button 520 allows the user to sign into the dynamic pricing system 102. With the artist registration button 522, a content supplier, such as an artist, can register with and/or receive information on how to register as a content supplier on the dynamic pricing system 102. A user can receive answers to questions by selecting the FAQ button 524. A customer can select the view media button 526 in order to view the different categories of media content (music, movies, etc.) that are available on the dynamic pricing system 102. Alternatively, the user can directly access the music, videos/movies, photographs, text/book and software category screens, which list the content available, by selecting the music button 528, the video button 530, the photograph button 532, the book button 534 and the program button 536, respectively. The user can search for content on the dynamic pricing system 102 by selecting the advanced search button 538, and the user can retrieve general information about the dynamic pricing system, such as contact information, by selecting the about button 540.

Figure 6:
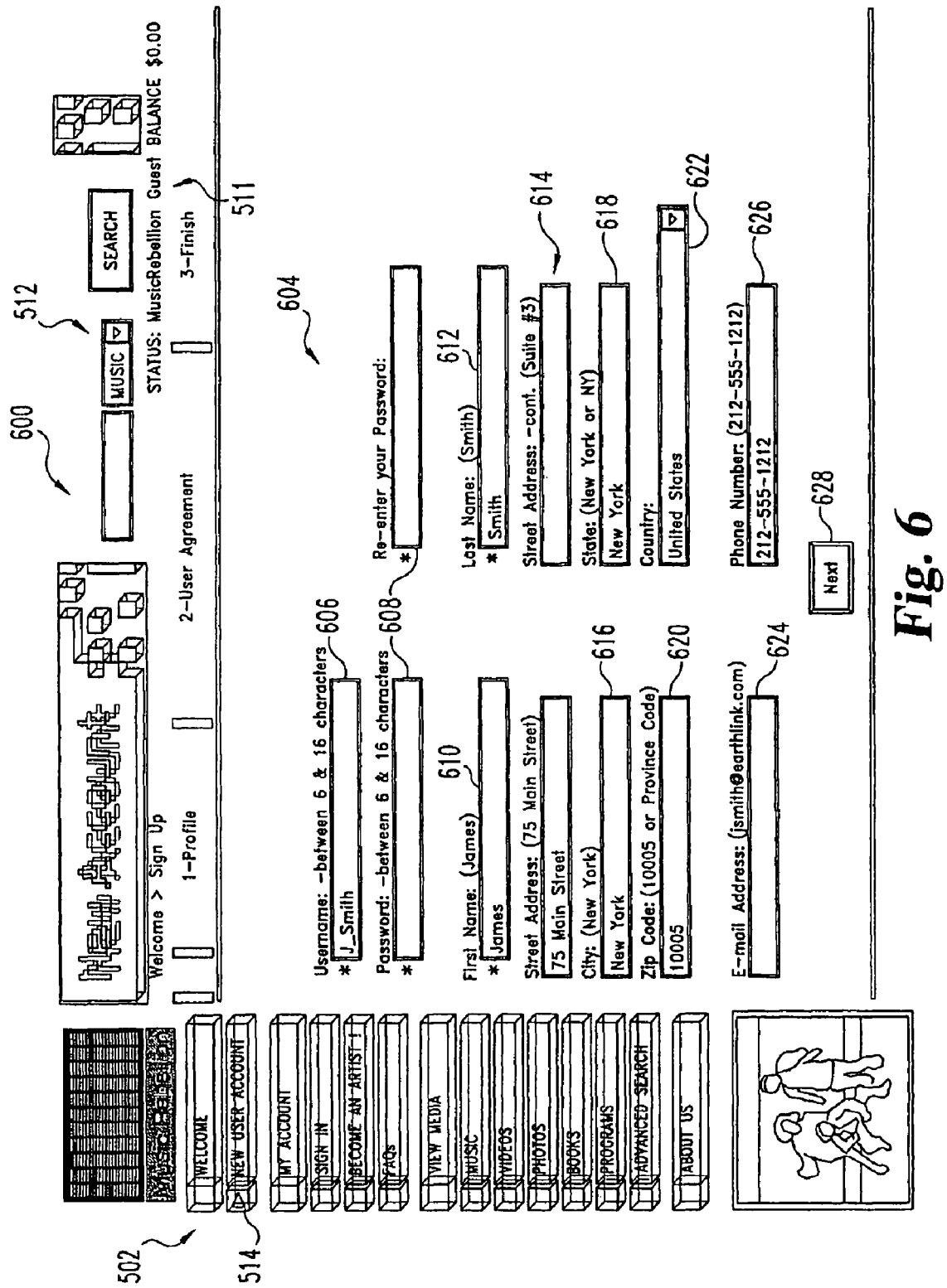
FIG. 6 shows a registration display screen for the dynamic pricing system.

Content suppliers on the dynamic pricing system 102 can advertise their work in the advertisement portion 504 of the main web page 500. It should be appreciated that other types of advertisements can be displayed in the advertisement portion 504. General information portion 506 displays general information about the dynamic pricing system 102, such as operational status information and how to use the dynamic pricing system 102. As mentioned above, a new user of the dynamic pricing system 102 can register with the system 102 by either selecting the new account button 508 or the new user button 516. After selecting either button 508 or 516, the dynamic pricing system 102 sends to the client 108 a registration form 600 (FIG. 6). As illustrated, the registration form 600 includes a registration status portion 602 that indicates the steps required to register with the dynamic pricing system 102 and an information entry portion 604 in which user information is entered. The entry portion 604 includes a username field 606 in which the user can type in a username and one or more password fields 608 in which the user enters (and re-enters) password information. In entry portion 604, the user can enter their first name, last name, street address, city, state, zip code, country, email address and telephone number into fields 610, 612, 614, 616, 618, 620, 622, 624 and 626, respectively. After the information is entered into entry portion 604, the user can submit the registration form 600 to the dynamic pricing system 102 by selecting a next button 628. As should be appreciated, the client 108 (through applets in the form) and/or the dynamic pricing system 102 can check for errors (and/or missing information) in the registration form 600. If the registration form 600 was not properly filled out, the dynamic pricing system 102 and/or client 108 can ask that the information be corrected and resubmitted.

Figure 7:
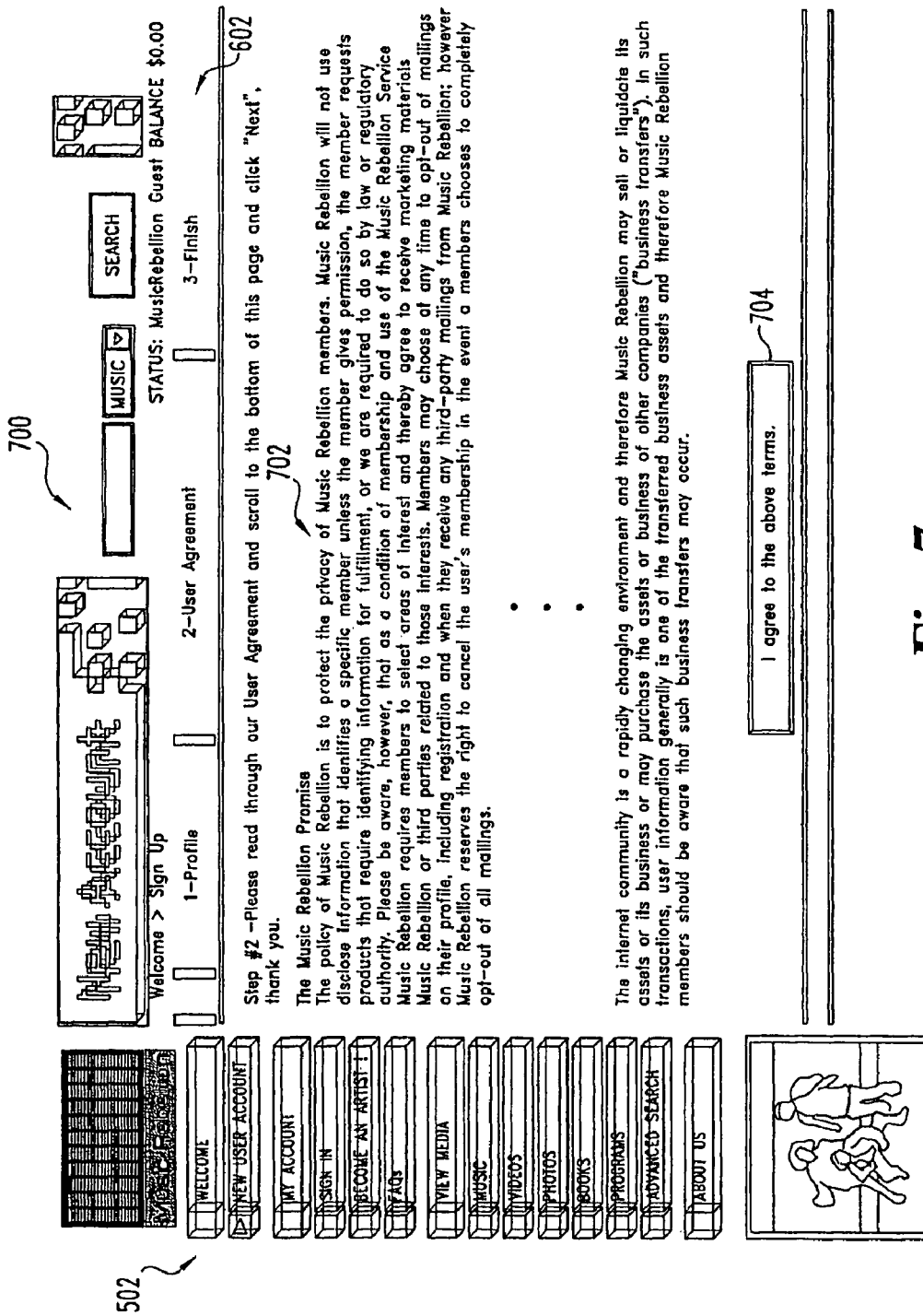
FIG. 7 shows a user agreement display screen for the dynamic pricing system.
Figure 8:
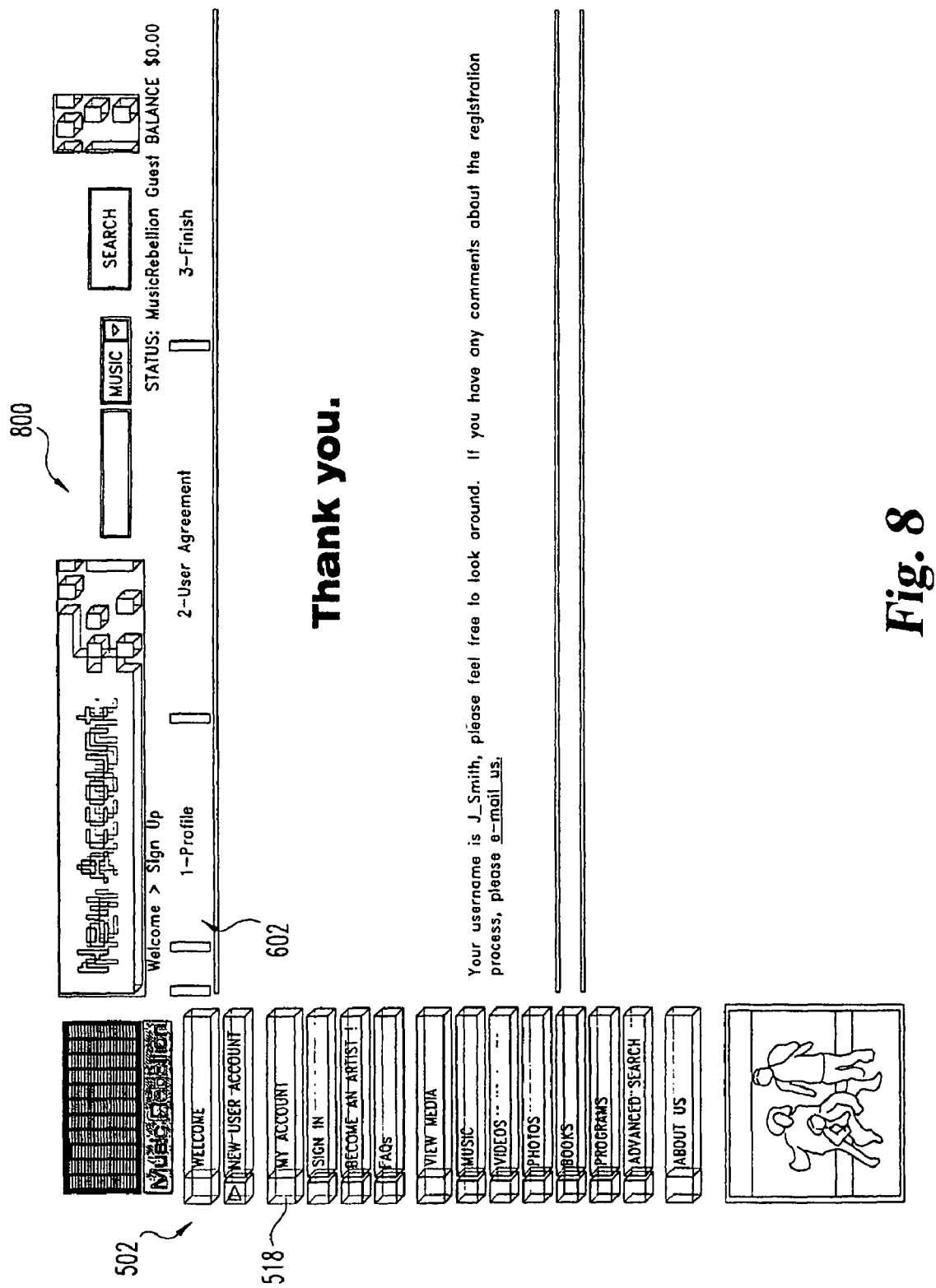
FIG. 8 shows a registration completed display screen for the dynamic pricing system.
Figure 9:
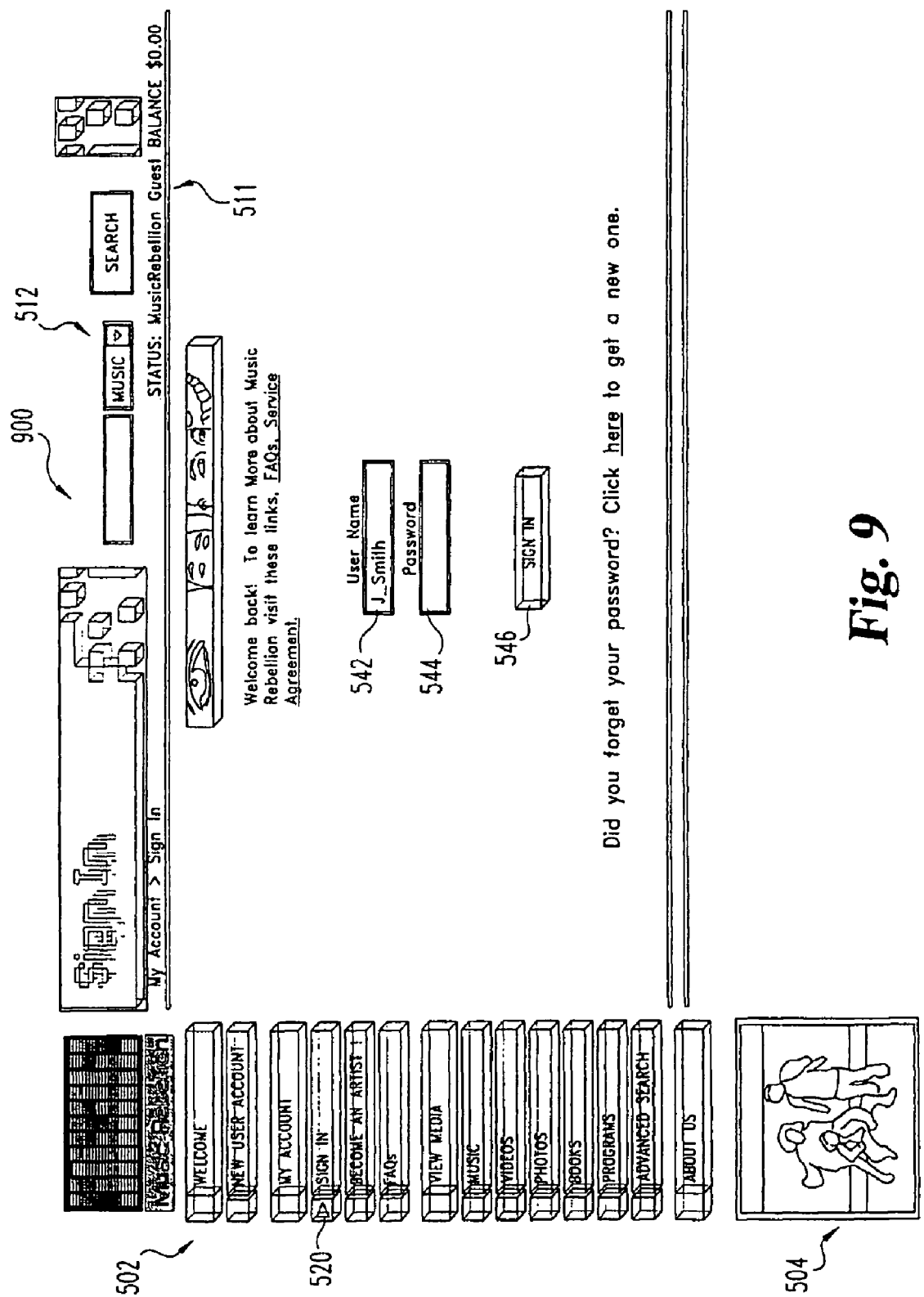
FIG. 9 shows a sign-in display screen for the dynamic pricing system.

After the registration form 600 is submitted, the dynamic pricing system 102 sends a user agreement form 700 to the client 108. As shown in FIG. 7, the user agreement form 700 includes an agreement text portion 702 in which the text of the agreement is displayed and an assent button 704. The user agrees to the terms of the user agreement by selecting the assent button 704. The user information is then stored in the user database 236, and a registration completion form 800, which is illustrated in FIG. 8, is displayed on the client 108. Subsequently, a user can access the dynamic pricing system 102 by manually logging onto the dynamic pricing system 102. The user can also be automatically logged onto the dynamic pricing system 102 with a user identifier, such as a "cookie", that is stored on the client 108. Referring again to FIG. 5, the user can enter their username and password in fields 542 and 544, respectively, and select sign in button 546 to log into the dynamic pricing system 102. Alternatively, the user can select the sign in button 520 on the navigation tool bar 502 in order to be shown a sign in form 900, which is illustrated in FIG. 9. The user can then enter their account information into fields 542 and 544, and select the sign in button 546 to log into the dynamic pricing system 102.

Figure 10:
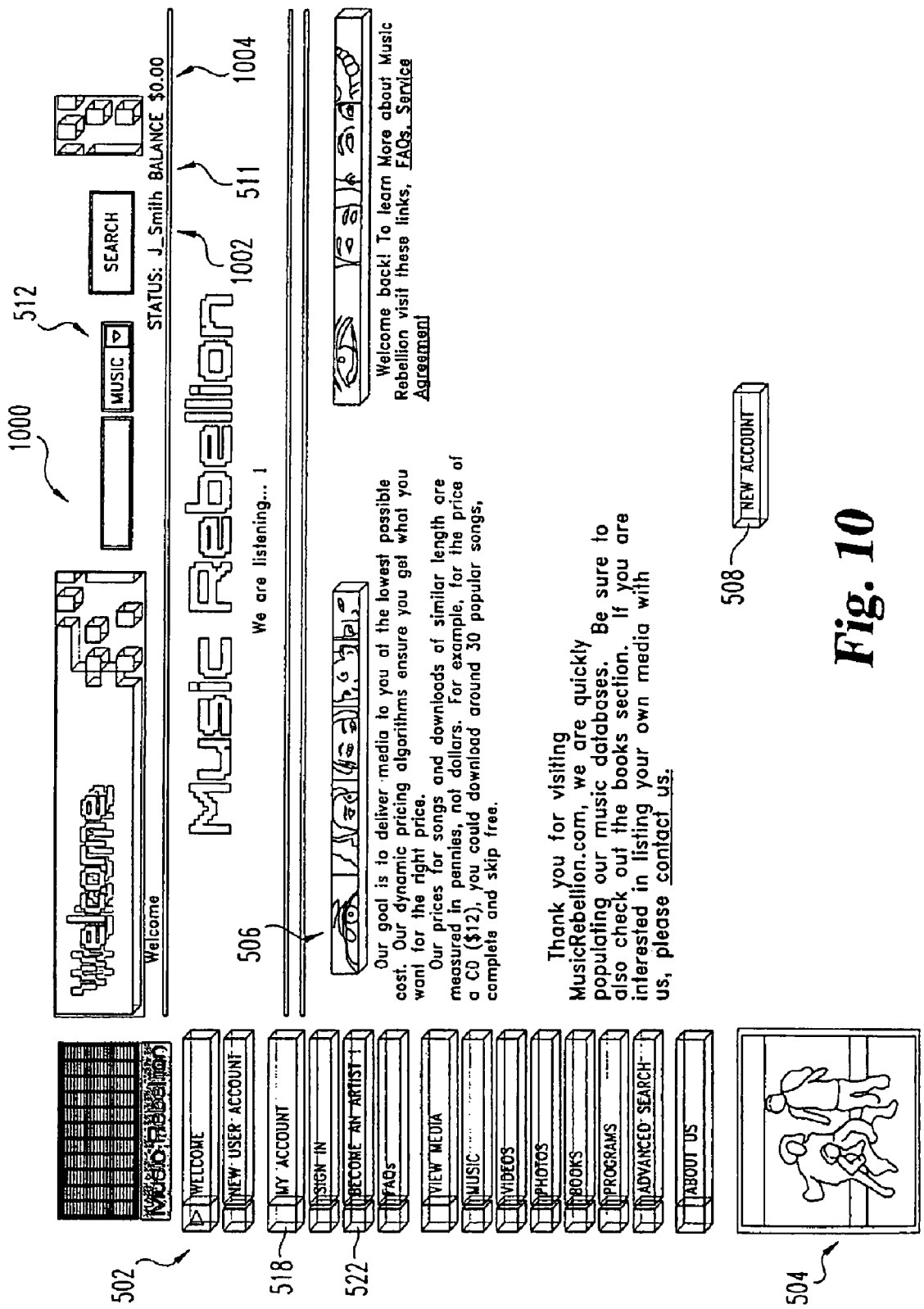
FIG. 10 shows a registered user main display screen for the dynamic pricing system.

After logging into the dynamic pricing system 102, the user is shown a registered user main page 1000, which is depicted in FIG. 10. As shown, the registered user main page 1000 contains similar portions and buttons as shown in the main page 500 of FIG. 5, with the exception that the registered user main page 1000 does not have the login portion 510 and the account information portion 511 lists the particular account information of the current user. In the illustrated embodiment, the account information portion 511 includes a username identifier 1002, which identifies the current user, and an account balance 1004, which indicates the amount of money the current user has in their the dynamic pricing system account.

Initially, when the user registers with the dynamic pricing system 102 their account balance 1004, which is stored in field 390 of the account table 312, is zero-dollars ($0.00). Although dollars are used when describing the account balance 1004 of the user in one embodiment, it should be appreciated that different currencies can be used in the account balance 1004, such as the Euro and the yen. With a zero ($0.00) account balance 1004, the user can still use the dynamic pricing system 102. For example, an artist does not need money in order to supply content to the dynamic pricing system 102. In another example, even with a zero account balance, a customer can download free content from the dynamic pricing system 102. In the illustrated embodiment, a customer pre-deposits money into an account from which their purchases are deducted. By pre-depositing money into an account, purchases on system 102 occur quickly and the purchasing experience for the user is similar to the "free" systems, such as the Gnutella. The customer can add money to their account in a number of ways including, but not limited to: payments through credit or debit cards; wire transfers; being billed; sending cash, checks or money orders to administrator of the dynamic pricing system 102; and/or transacting payments through the third party payment service 136, such as Verisign's PayFlow system or PayPal.com's system, to name a few. In another embodiment, a customer does not maintain an account balance, but rather pays for each individual purchase at the time of the purchase.

Figure 11:
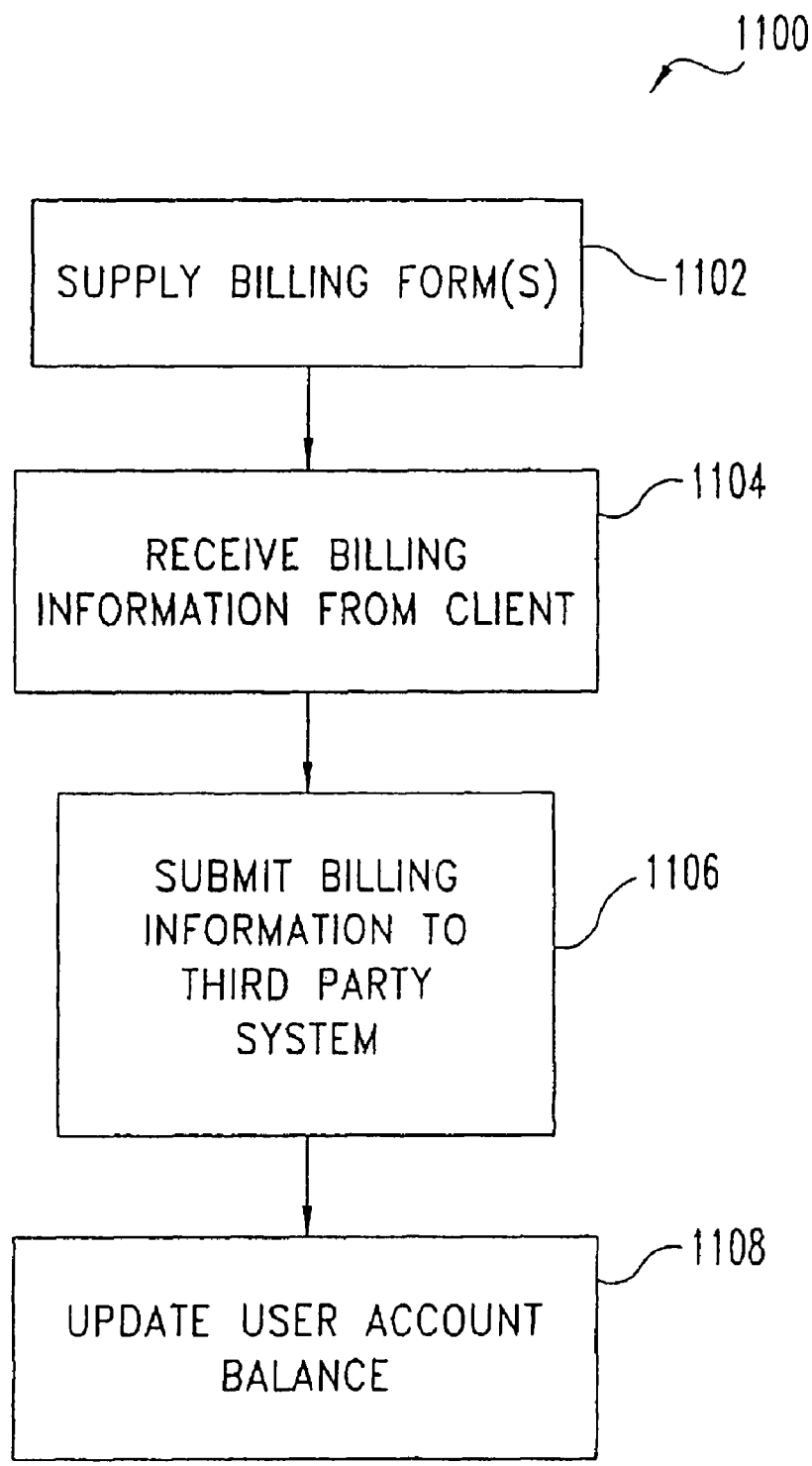
FIG. 11 is a flow diagram illustrating a process of crediting a user account according to one embodiment of the present invention.
Figure 12:
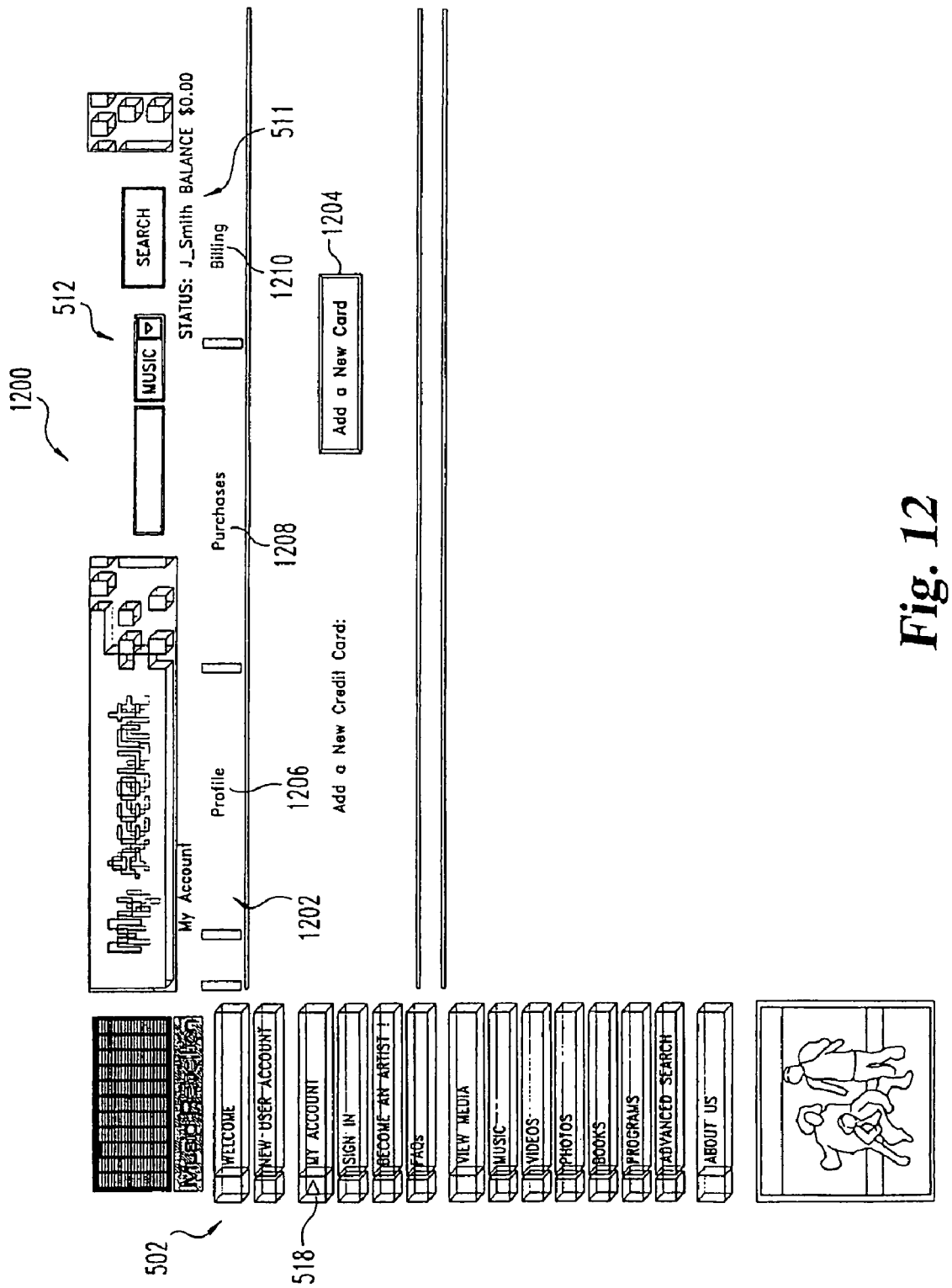
FIG. 12 shows a billing display screen for the dynamic pricing system.
Figure 13:
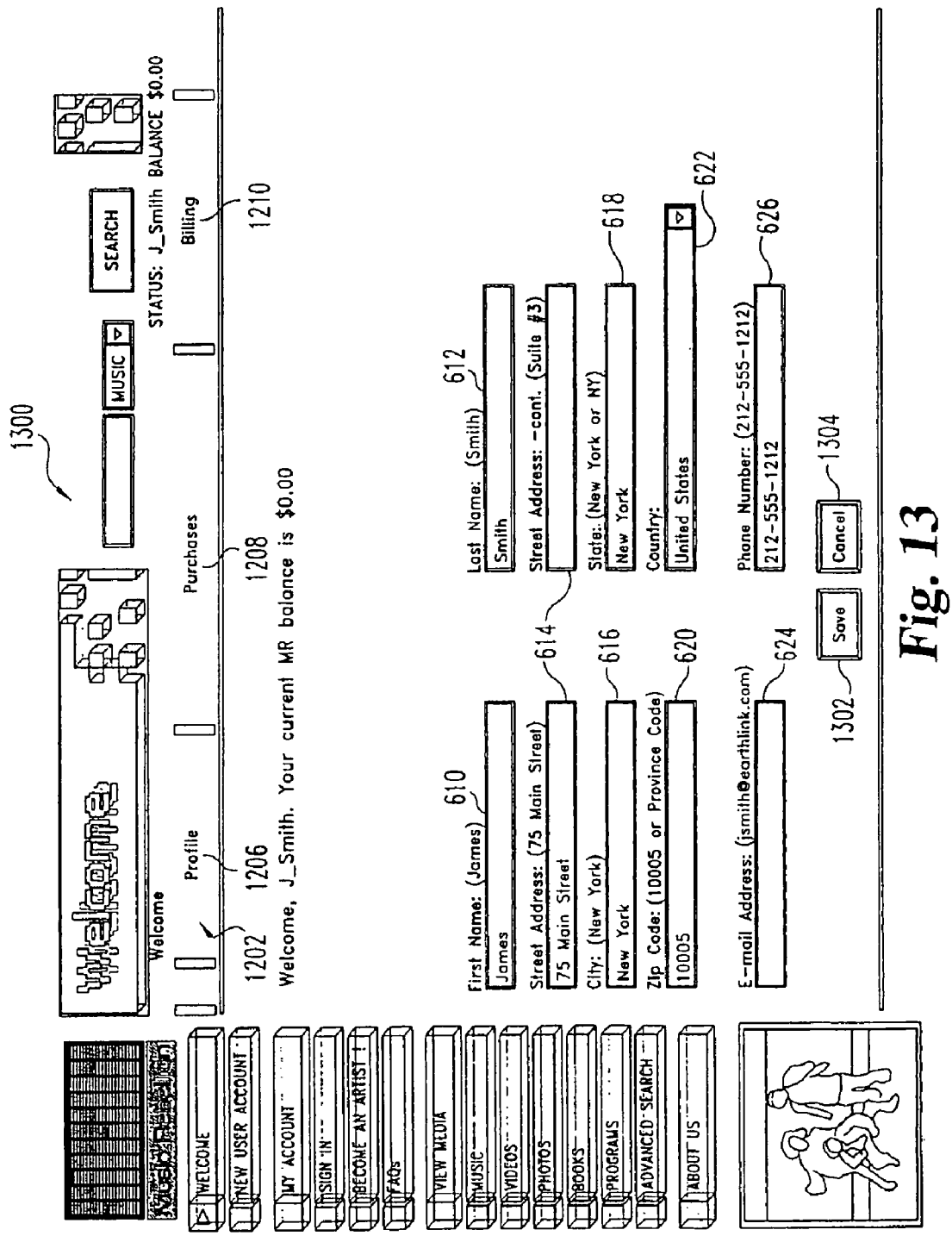
FIG. 13 shows an update user profile display screen for the dynamic pricing system.
Figure 14:
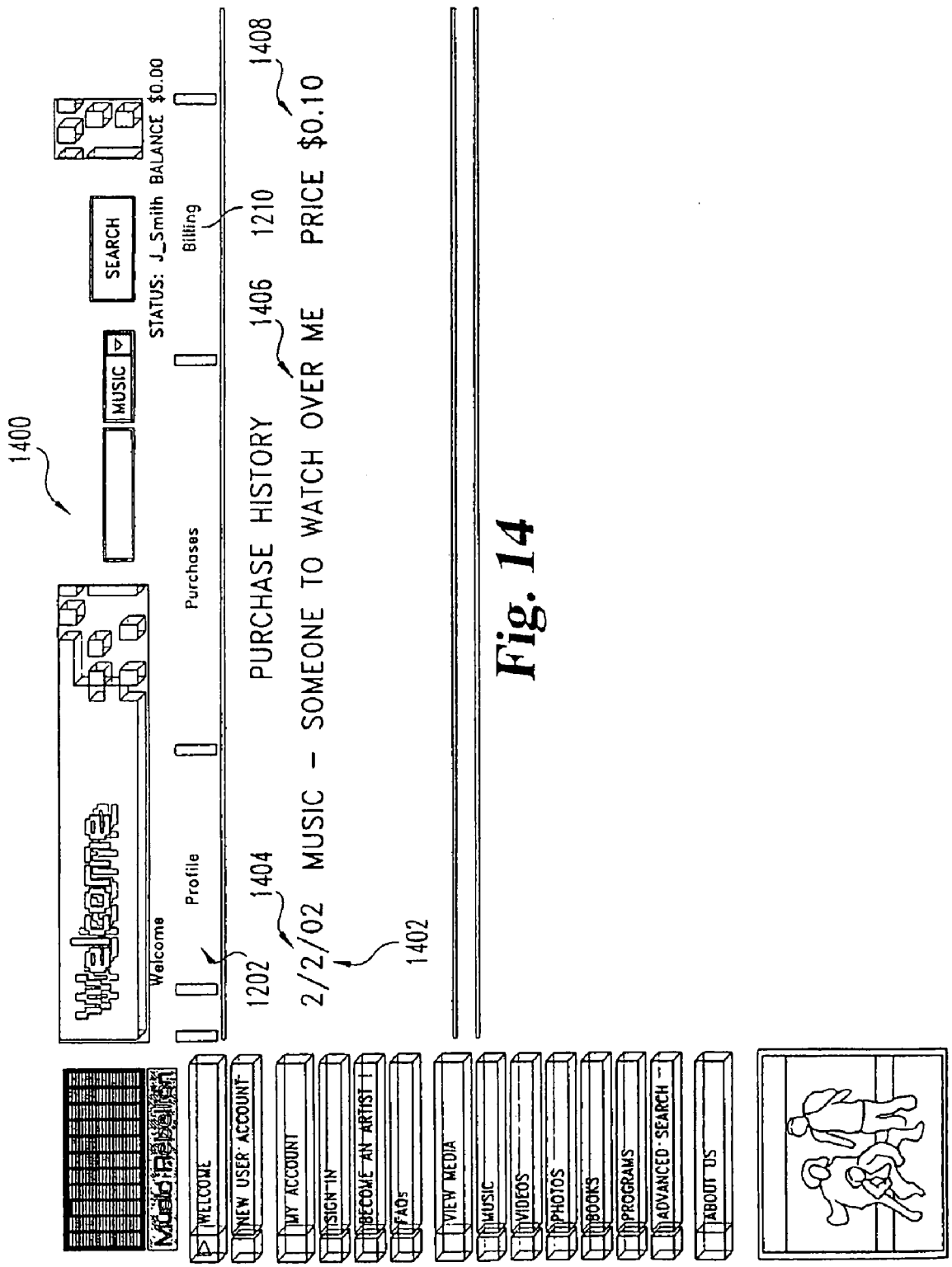
FIG. 14 shows a purchase history display screen for the dynamic pricing system.

A flow diagram 1100 for illustrating one technique for adding money to an account in the dynamic pricing system 102 according to one embodiment of the present invention is shown in FIG. 11. In stage 1102, the dynamic pricing system 102 sends to the client 108 one or more forms for crediting the account of the customer. To add money, the customer selects the my account button 518 on the navigation tool bar 502. In response, the dynamic pricing system 102 sends to the client 108 a billing form 1200 (FIG. 12). Form 1200 includes a my account tool bar 1202 and an add new card button 1204. The my account tool bar 1202 allows the user to navigate through a number of forms related to their account. The my account tool bar 1202 includes a profile form link 1206, a purchases form link 1208, and a billing form link 1210. With the profile link form 1206, the user can edit their account profile information. As illustrated in FIG. 13, the account profile form 1300 contains many of the fields shown in form 600 (FIG. 6) for entering user information, including fields 610, 612, 614, 616, 618, 620, 622, 624 and 626. The account profile form 1300 further includes the my account tool bar 1202, a save button 1302 for saving any changes to the user database 236 and a cancel button 1304 for not saving the changes. With the purchases form link 1208, the user can view their past purchases on purchase history form 1400 (FIG. 14). The purchase history form 1400 includes a list 1402 of past purchases. This list 1402 can include date of purchase 1404, title of content 1406 and price paid for the content 1408.

Figure 15:
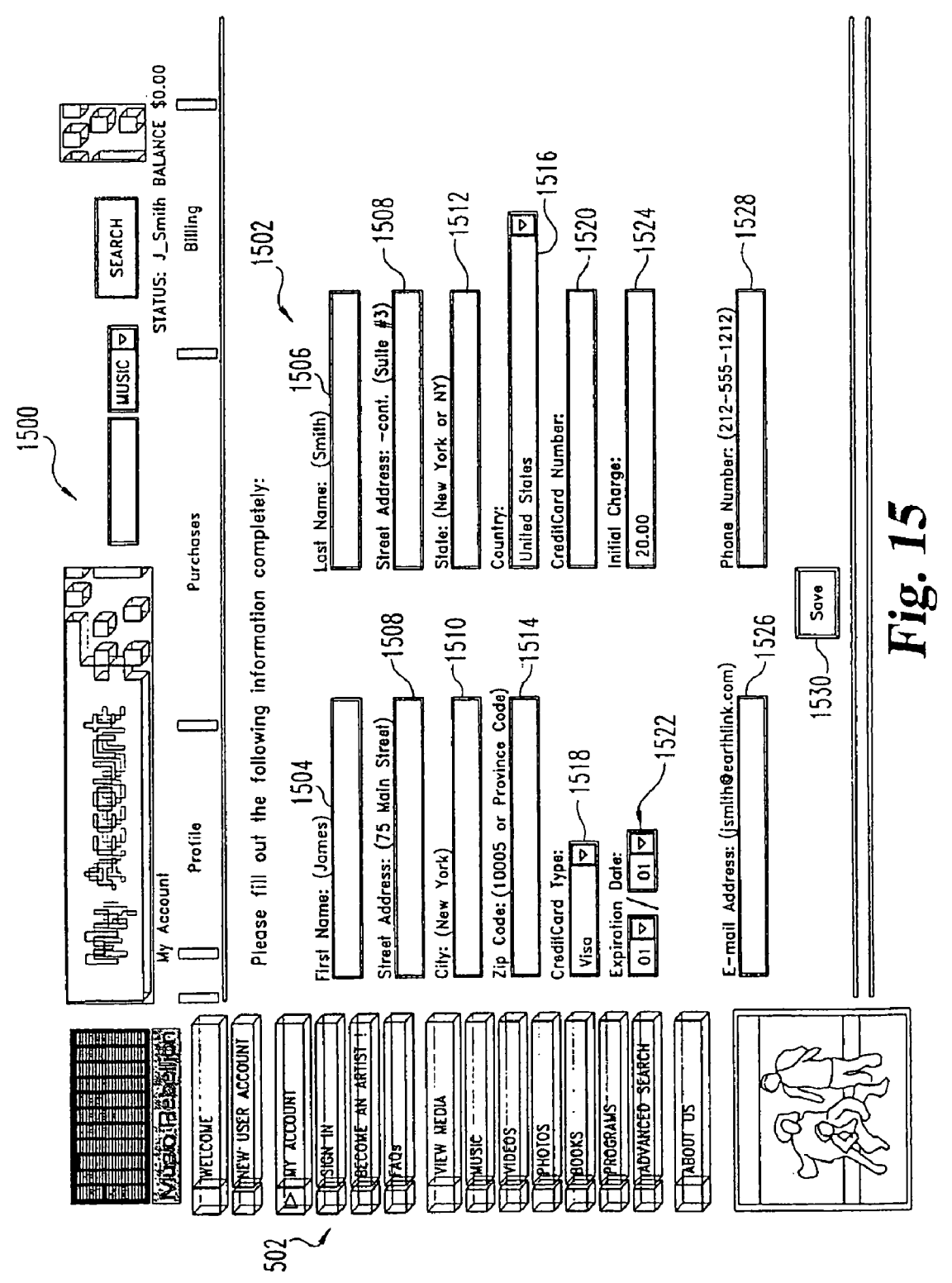

The billing form 1200 (FIG. 12) is shown on the client 108 when the billing form link 1210 is selected on the my account tool bar 1202. On the billing form 1200, the user can add money to their account by selecting the add new card button 1204. In response, the dynamic pricing system 102 sends to the client 108 a charge form 1500 (FIG. 15) in which the user can add money to their account by charging a credit card. As should be appreciated, a secure socket layer (SSL) can be used on the client 108 for authentication purposes and to encrypt the credit card information sent over the network 106. As shown, the charge form 1500 contains fields 1502 for charging money to a credit card. To charge the credit card, the user enters their first name, last name, street address, city, state, zip code, country, credit card type, credit card number, expiration date, amount to charge, email address and telephone number in fields 1504, 1506, 1508, 1510, 1512, 1514, 1516, 1518, 1520, 1522, 1524, 1526 and 1528, respectively. In the charge field 1524, the user enters the amount to add to their account balance, which is to be charged to the credit card. To charge the amount in the charge field 1524 to the credit card, the user selects save button 1530, which submits the information entered in form 1500 to the dynamic pricing system 102.

In the embodiment illustrated in FIG. 1, the dynamic pricing system 102 incorporates client software from the third party payment system 136 that handles the transactions for crediting money to the account of the user. In one form, the third party payment system 136 is VeriSign's PayFlow system and the third party client software is VeriSign's PayFlow client software. As should be appreciated, other types of third party payment systems 136 can be used.

In stage 1104 (FIG. 11), the dynamic pricing system 102 receives the credit card billing information from the client 108, and in stage 1106, the dynamic pricing system 102 through the third party client software forwards the billing information to the third party payment system 136, which administers the transaction. The third party payment system 136 collects the transaction information from the dynamic pricing system 102 and then securely routes the transaction via a gateway through a financial network to the appropriate bank, ensuring that user is authorized to make the purchase. The third party client software in the dynamic pricing system 102 also sends an acknowledgement back to the third party payment service 136 after returning the payment results to the dynamic pricing system 102, in order to protect the user against double billing due to latency or broken communication sessions. It should be understood that the dynamic pricing system 102 can send an error message to the client 108, when the dynamic pricing system cannot charge the credit card (i.e., not authorized to charge the credit card or insufficient funds on the card). When the transaction is authorized, the dynamic pricing system 102 in stage 1108 updates the account balance information stored in the user database 236 by adding the amount from the charge field 1524 to the account balance field 390 of table 312 (FIG. 3). On the third party payment system 136, the funds for the transaction are transferred to an account for the dynamic pricing system 102. In another embodiment, the dynamic pricing system 102 directly processes the transaction without using the third party payment system 136.

Figure 16:
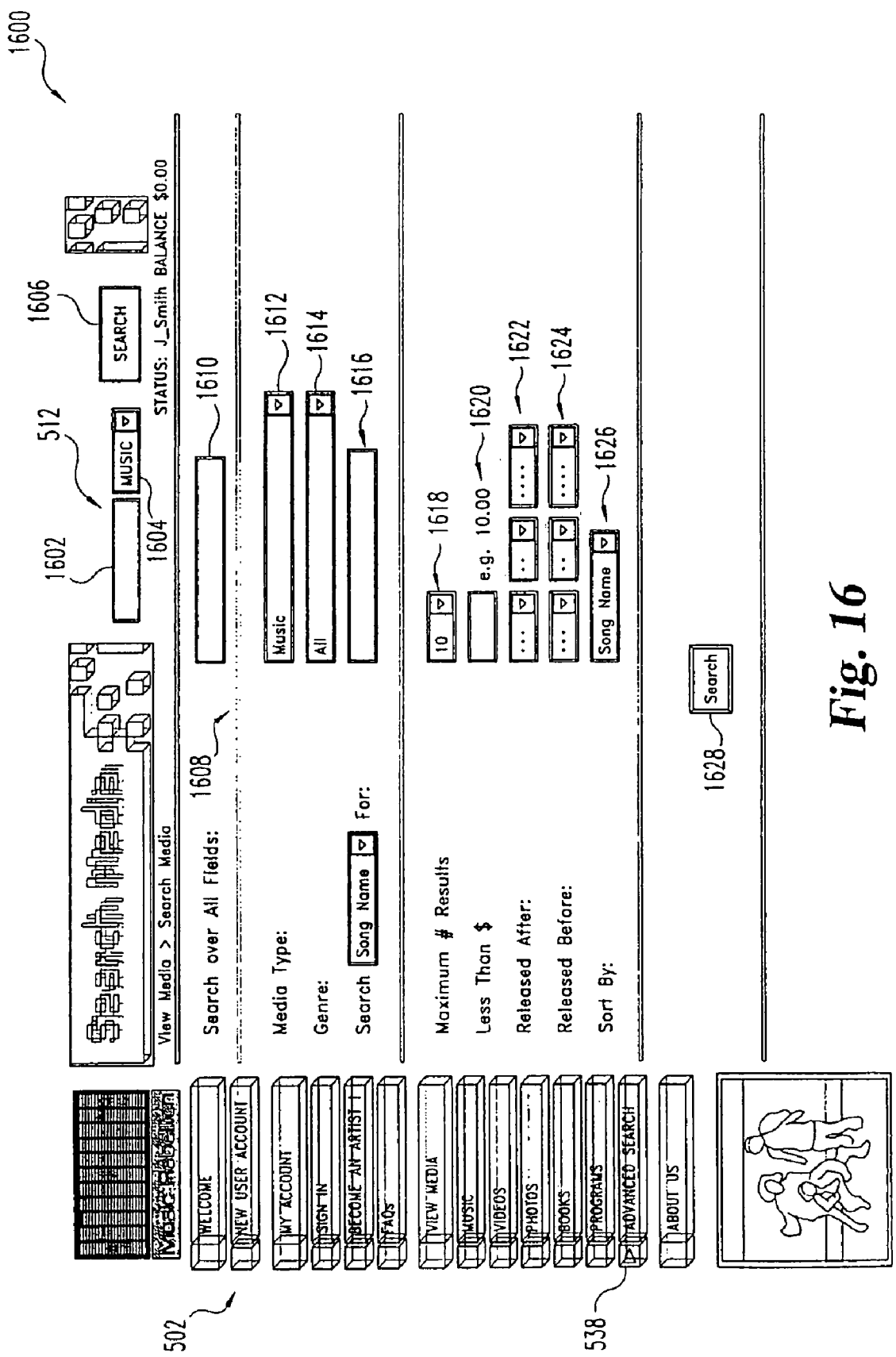
FIG. 16 shows a search display screen for the dynamic pricing system.

In stage 404 (FIG. 4), the user can search for content of interest in the dynamic pricing system 102. To perform an advance search for content, the user can select the advance search button 538 on the navigation toolbar 502. As shown in FIG. 16, in response to the selection of the advanced search button 538, the dynamic pricing system 102 sends an advanced search form 1600 to the client 108. The advanced search form 1600 includes the simple search portion 512 in which the user can perform simple searches for content. The simple search portion 512 includes a simple term entry field 1602, a media type drop-down list 1604, and a simple search button 1606. The user enters one or more search terms into the simple term entry field 1602 and selects the media type to search (i.e. movies, books, and music) with the media type drop-down list 1604. To submit the search to the dynamic pricing system 102, the user selects search button 1606. Advanced search form 1600 further includes an advanced search portion 1608 in which advanced searches can be created. The advanced search portion 1608 includes a search all field 1610, a media type field 1612, a genre field 1614, "specific field" search field(s) 1616, a maximum results drop-down list 1618, a maximum amount field 1620, released after date drop-down lists 1622, released before date drop-down lists 1624, a sort drop-down list 1626, and an advanced search button 1628. It should be understood that form 1600 can omit certain search criteria fields and/or include additional search criteria fields. In field 1610, the user can enter one or more search terms that are searched throughout every field of the database 225. The user can specify the media type and genre in drop-down lists 1612 and 1614, respectively. The user can search for terms in specified fields, such as by title, with portion 1616. The maximum number of search results can be specified in drop-down list 1618, and the maximum price for the content can be specified in field 1620. The content can be searched by release dates of the content with drop down lists 1622 and 1624. The user can specify how the search results are sorted. The user submits the advanced search to the dynamic pricing system 102 by selecting search button 1628. Based on the search criteria specified, the dynamic pricing system 102 queries the databases 225 stored in memory 112.

Figure 17:
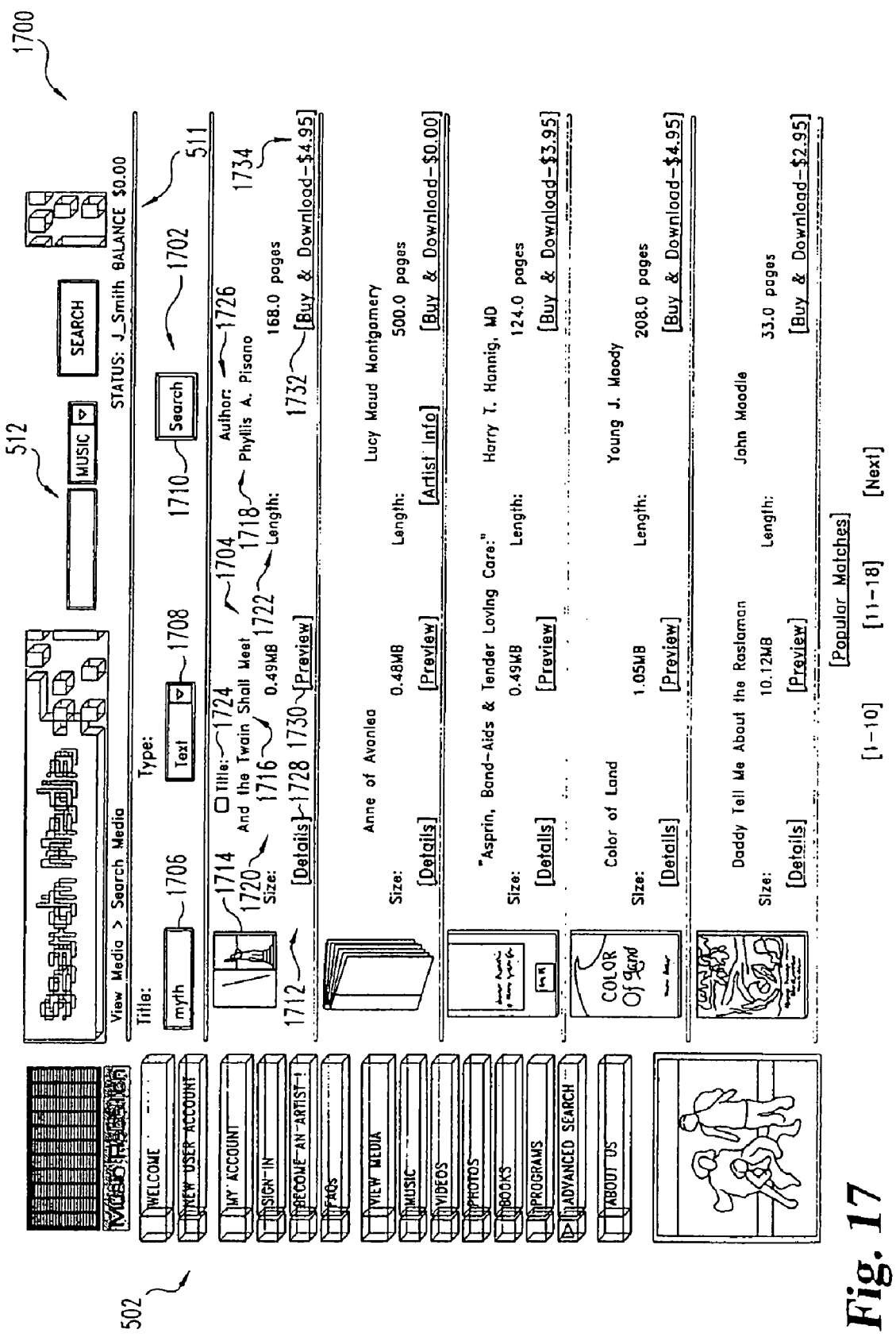
FIG. 17 shows a search results display screen for the dynamic pricing system.

An example of a search results page 1700 is illustrated in FIG. 17. As illustrated, the search results page 1700 includes a modify search portion 1702 and a results portion 1704. With the modify search portion 1702, the user can submit another search to the dynamic pricing system 102. Portion 1702 has a search term field 1706 in which search terms are entered, a media type drop down list 1708 in which the type of media to be searched is entered, and a search button 1710 for submitting the search. The results portion 1704 of the search results page 1700 displays the results from the submitted search. Each row/record 1712 of the results portion 1704 contains information about an item, in this example a book, that matched the search criteria. As shown, each record 1704 in the results portion 1704 can display an image 1714, a title 1716, author 1718, file size 1720, and length 1722 of the work. In the illustrated example, image 1714 contains an image of the cover of the book, and length 1722 lists the number of pages the book contains. The results portion 1704 further contains a title header 1724 that allows the user to sort the records 1712 by title when selected and an author header 1726 that allows the user to sort the records 1712 by author when selected. The user can view additional details about the work by selecting a details link 1728 for the record 1712, and the user can preview the work by selecting a preview link 1730 for the record 1712. The content listed in the record 1720 can be bought by selecting buy link 1732. As shown, buy link 1732 lists a current dynamic price of the content. By selecting link 1734, the user can purchase and download the work.

Figure 18:
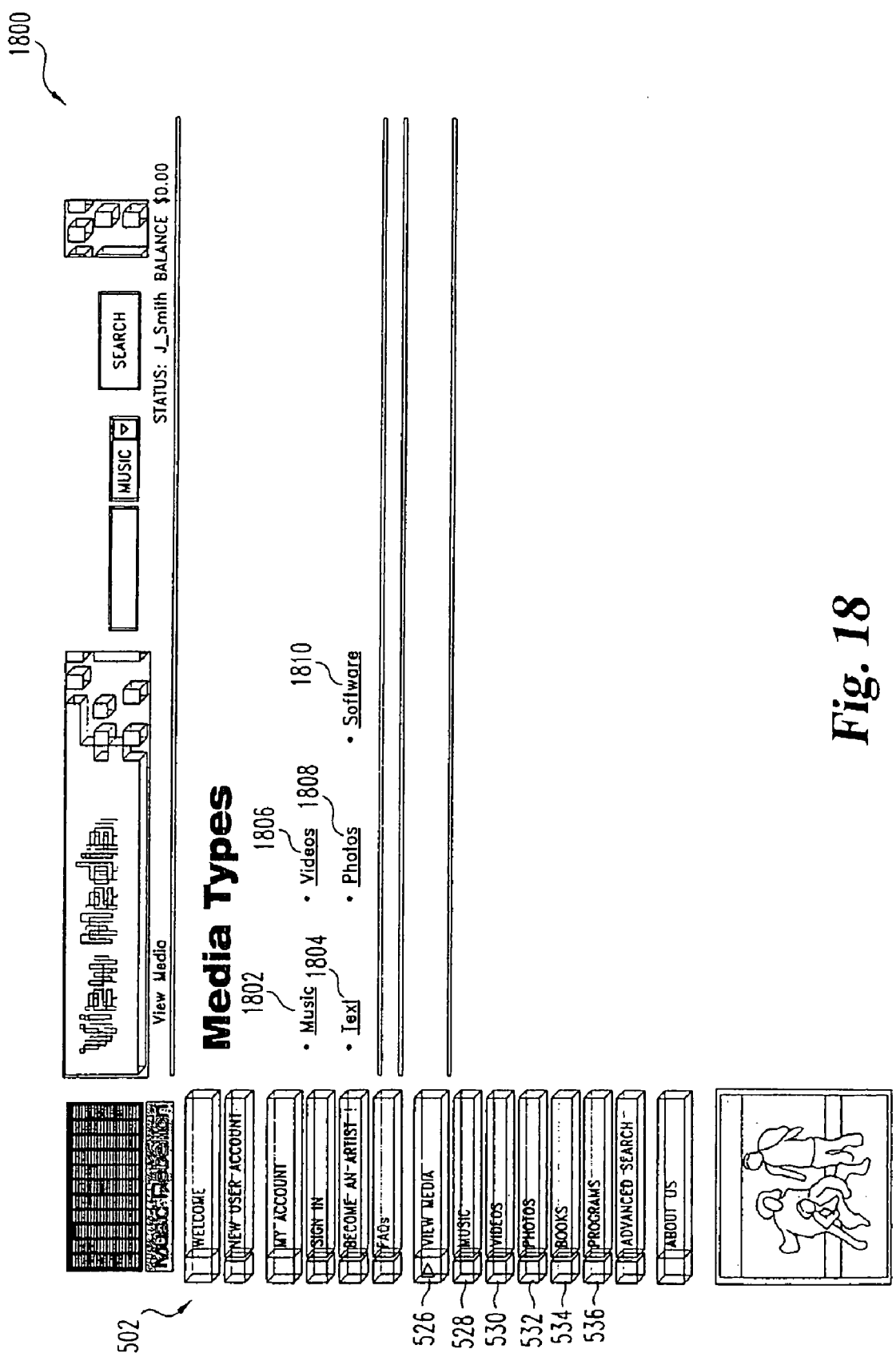
FIG. 18 shows a media type display screen for the dynamic pricing system.

In addition, customers of the dynamic pricing system 102 can browse through hierarchical categories by selecting the view media button 526. In response to the selection of the view media button 526, the dynamic pricing system 102 sends to the client 108 a media types page 1800, which is shown in FIG. 18. As illustrated, the media types page 1800 includes a music page link 1802, a text page link 1804, a videos page link 1806, a photograph page link 1808 and a software page link 1810 that respectively link to a music page, a text page, a video/movie page, a photograph page and a software page. Alternatively, the user can directly access the music page, the video/movie page, the photograph page, the text page and the software page by selecting the music button 528, the videos button 530, the photographs button 532, the books button 534 and the programs button 536, respectively. It should be appreciated that the user can access other types of media content using a similar interface.

Figure 19:
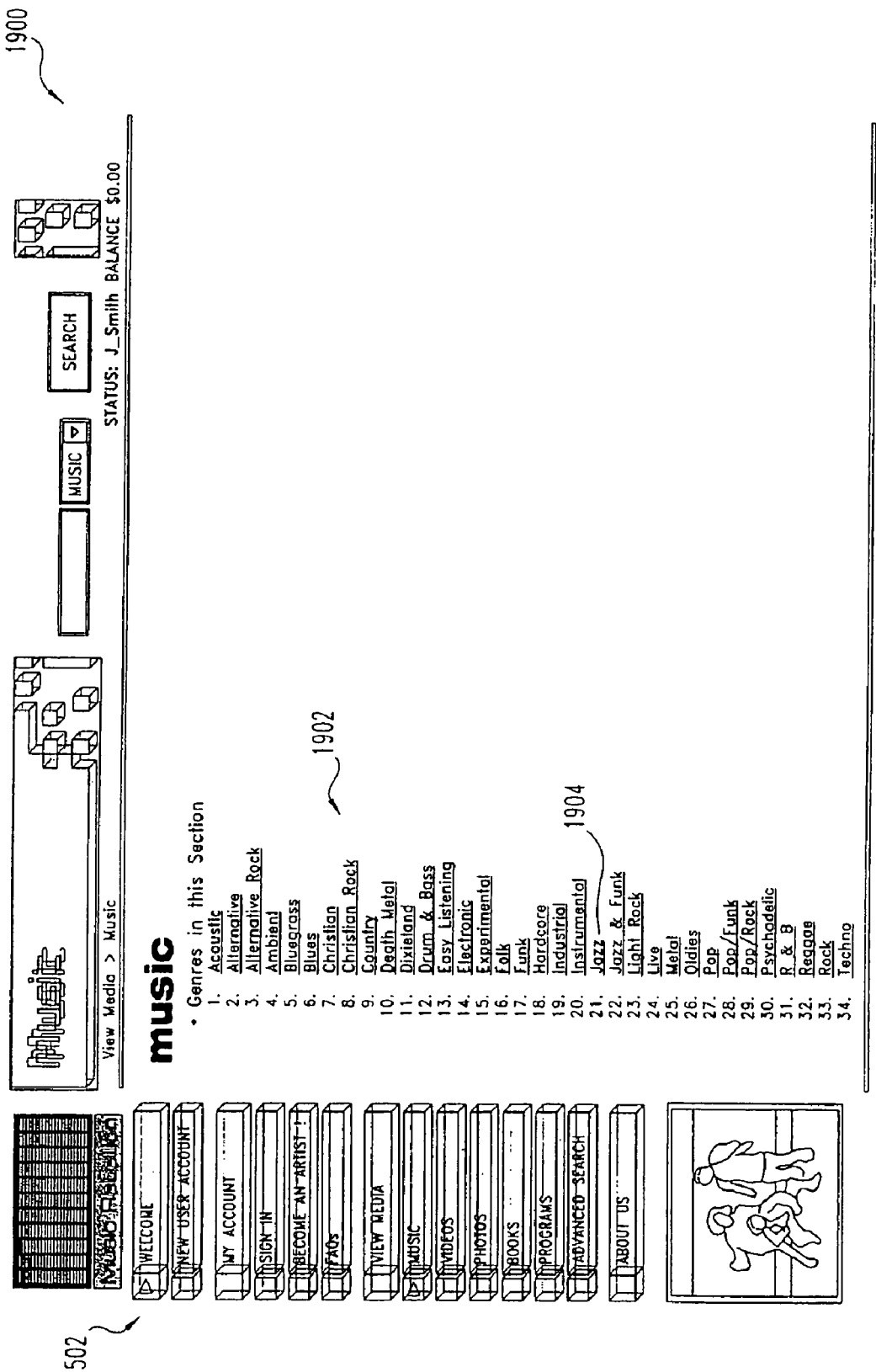
FIG. 19 shows a music category display screen for the dynamic pricing system.
Figure 20:
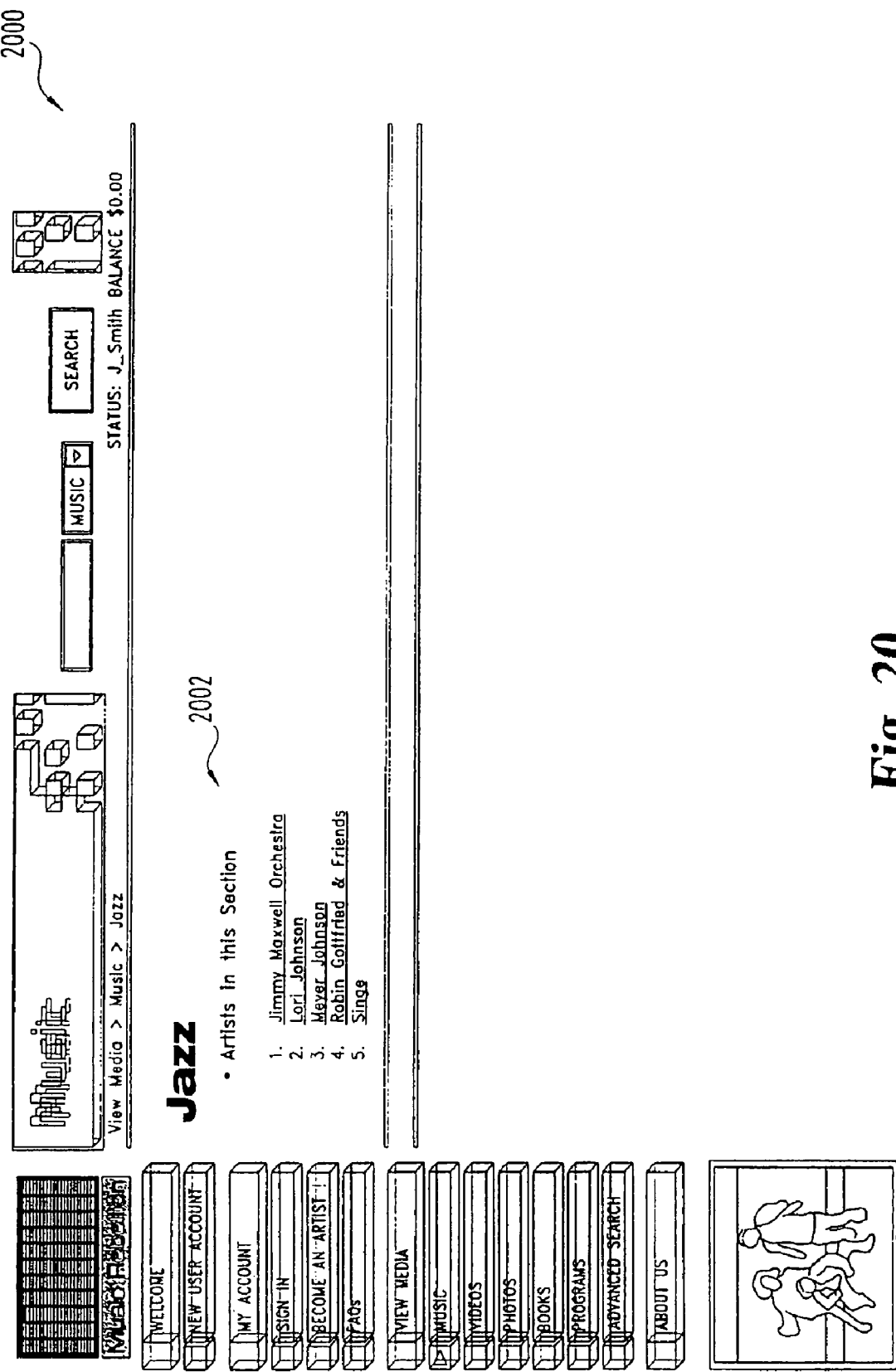
FIG. 20 shows a genre display screen for the dynamic pricing system.
Figure 21:
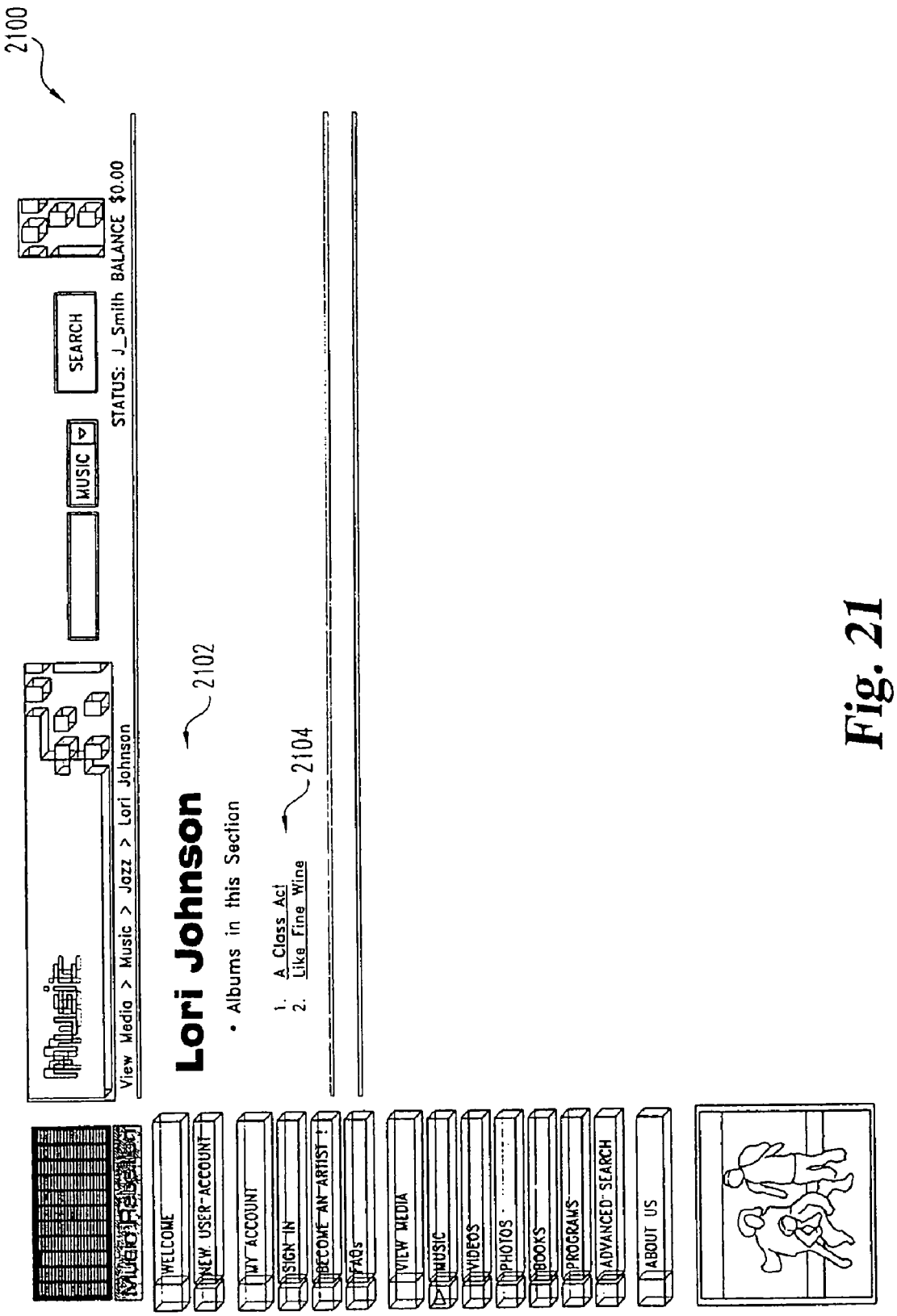
FIG. 21 shows a musical artist display screen for the dynamic pricing system.
Figure 22:
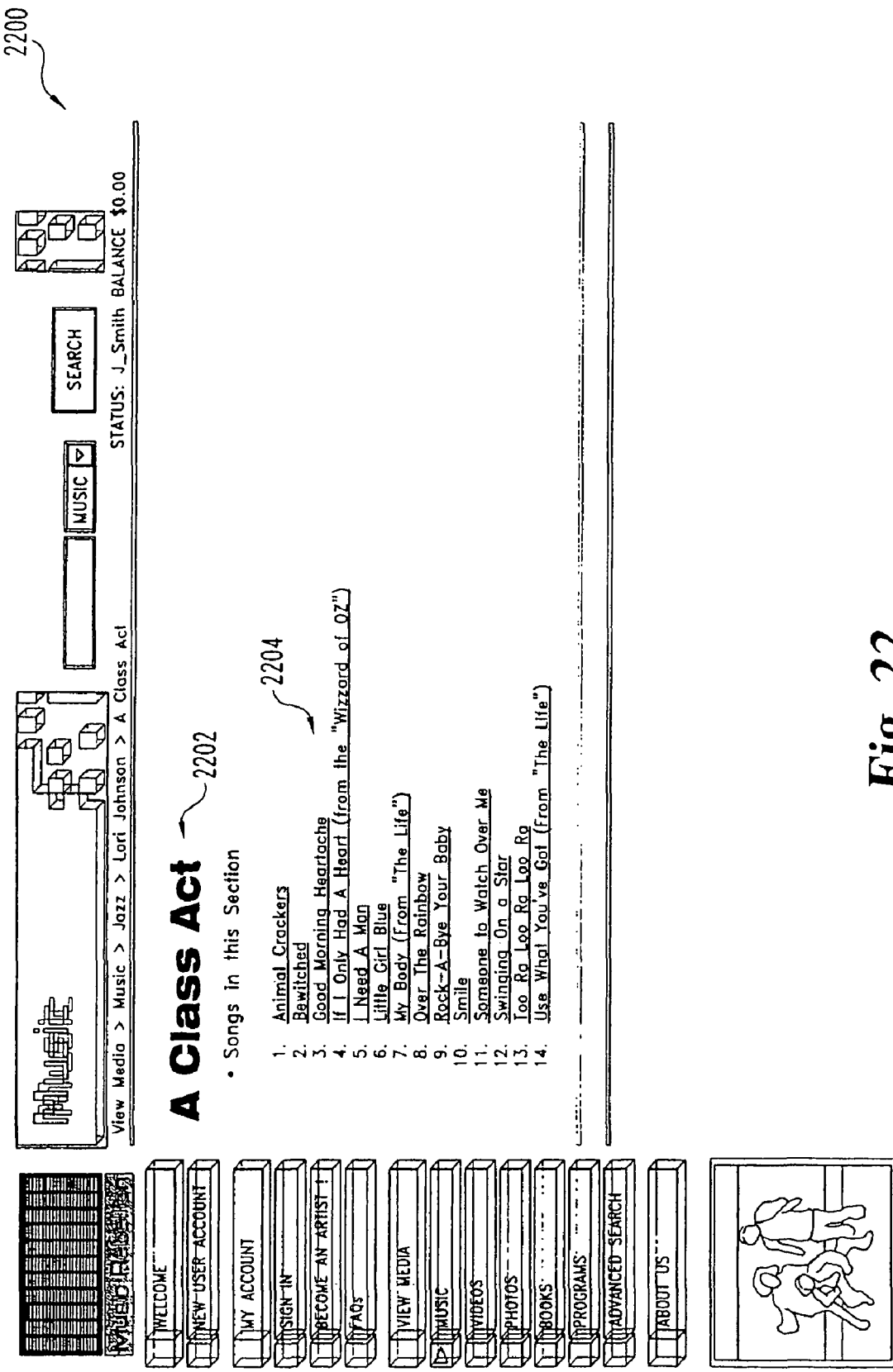
FIG. 22 shows an album display screen for the dynamic pricing system.

For example, when either the music page link 1802 or the music button 528 is selected, the client 108 displays music page 1900. As shown in FIG. 19, the music page 1900 includes links 1902 that are organized by musical genre, such as "jazz", "funk" and "rock", to name a few. Selecting one of the links 1902 will cause the client 108 to display a page organized specifically for the selected musical genre. For instance, if jazz link 1904 is selected, the dynamic pricing system 102 will query the music databases 230 in order to generate a genre page 2000 on the client 108. In FIG. 20, the genre page 2000 contains musical artist links 2002 that allow the user to browse the musical works that are available for sale from the listed artists. When one of the musical artist links 2002 is selected, the dynamic pricing system 102 sends to the client 108 a musical artist page 2100, which is shown in FIG. 21. In the illustrated embodiment, the artist page 2100 contains a name 2102 of the artist and album links 2104 that list the albums available from that artist. When the customer selects one of the album links 2104, the client 108 displays to the customer an album page 2200 (FIG. 22) that includes album (or CD) name 2202 and song links 2204 for songs on that album.

Figure 23:
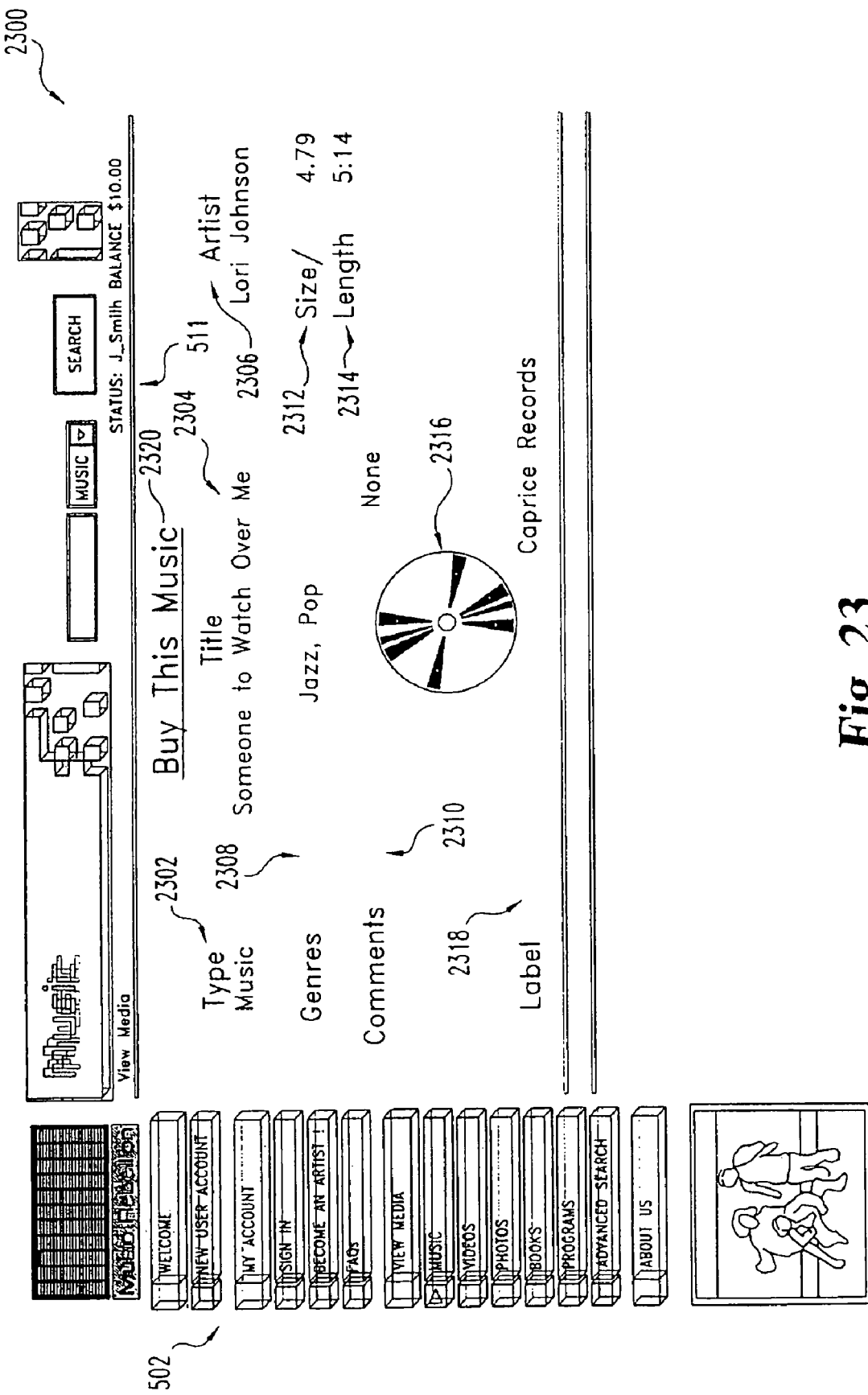
FIG. 23 shows a details display screen for the dynamic pricing system.

As depicted in FIG. 23, a details page 2300 for a song is displayed on the client 108 when the link 2204 for the song is selected. The details page 2300 can also be accessed by selecting the details link 1728 in the search results page 1700 (FIG. 17). As illustrated in FIG. 23, the details page 2300 includes: a type portion 2302 in which the type of content, in this case "music", is displayed; a title portion 2304 in which the title of the media content is listed, which in this example is the song title; and an artist name portion 2306 in which the name of the artist is listed. The genre, such as jazz, for the content (song) is displayed in genre portion 2308, and any comments concerning the content are displayed in comments portion 2310. The file size for the content is displayed in size portion 2312, and the length of the content is displayed in length portion 2314. In the illustrated embodiment, the file size portion 2312 displays the file size of the song in megabytes (MB), and the length portion 2314 lists the length of the song in minutes. The details page 2300 can further include an image 2316 for the content, such as a picture of the album cover. The label for the album is displayed in label portion 2318. The other content type pages (i.e., the text page, the video/movie page, the photograph, and the software page) contain similar hierarchical page formats for accessing content.

Figure 24A:
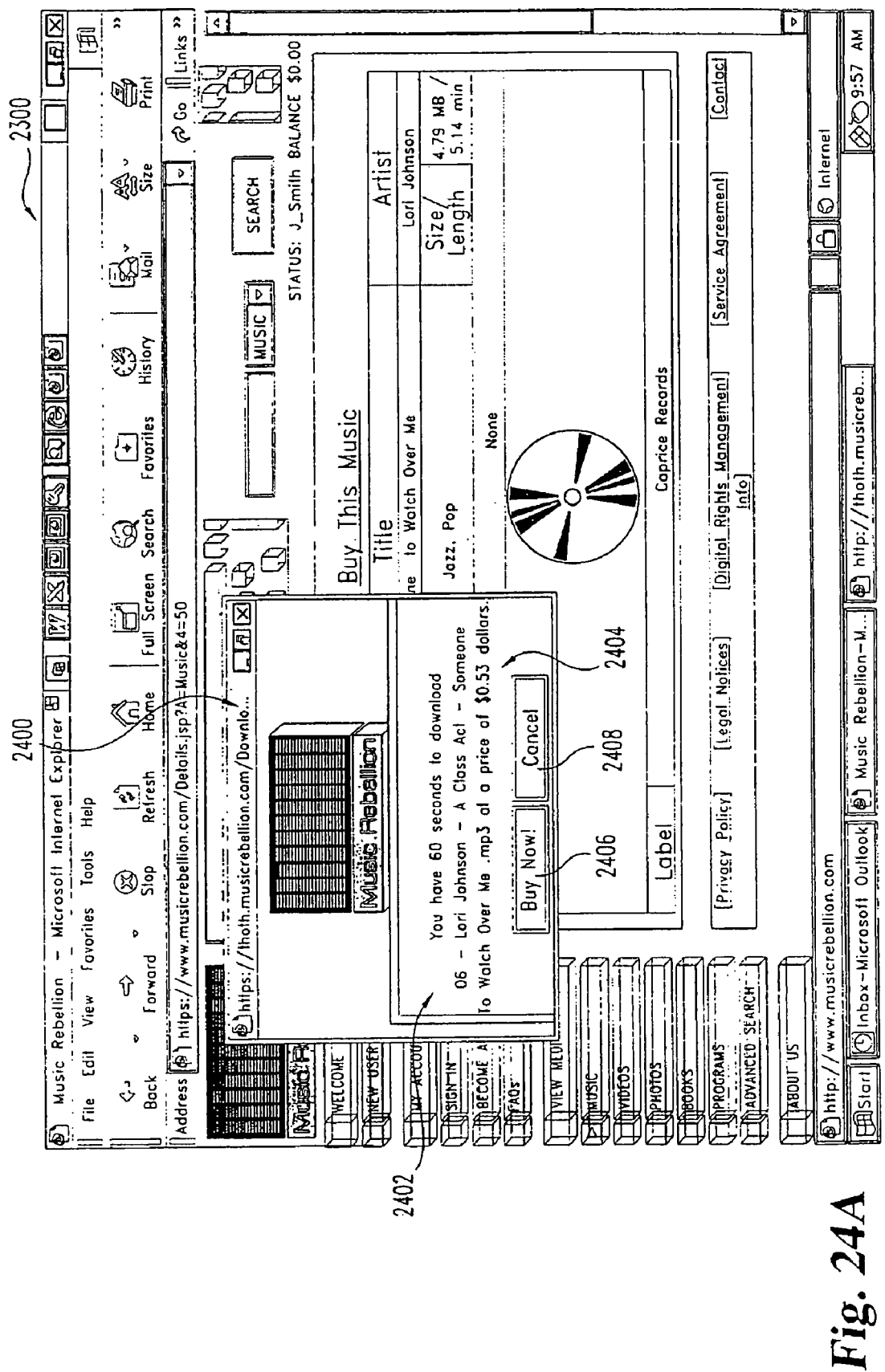
FIG. 24A shows a purchase content display screen for the dynamic pricing system.
Figure 24B:
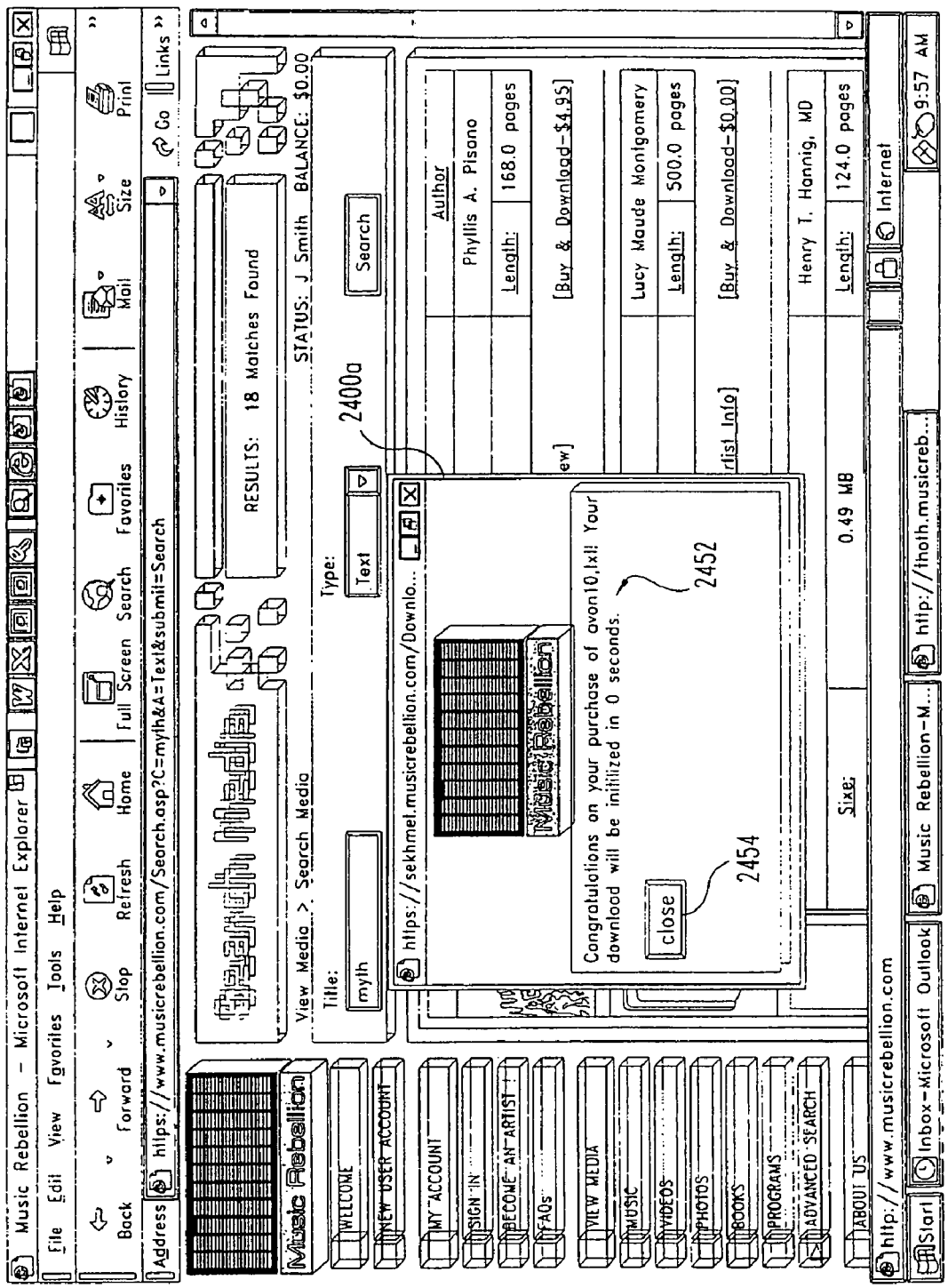
FIG. 24B shows a download display screen for the dynamic pricing system.

To receive a dynamic price for the content listed in the details page 2300, the customer selects buy link 2320. In the illustrated embodiment, the customer receives a dynamic price for the song by selecting buy link 2320, which sends a signal to the dynamic pricing system 102 that indicates that the customer wants the current dynamic price for the song. In response to receipt of this signal, the dynamic pricing system 102 in stage 406 (FIG. 4) supplies a dynamic price for the song and generates a purchase window 2400 on the client 108 that lists the current, dynamic price for the song. Purchase window 2400 is also generated when the user selects the buy link 1732 in the search results page 1700 (FIG. 17). As illustrated in FIG. 24A, the purchase window 2400 includes a message portion 2402 with a dynamic price 2404 for the song, a purchase button 2406 in order to purchase the song, and a cancel button 2408 to not purchase the song. In the illustrated embodiment, the customer is given a specified time window to purchase the song. After the period elapses, the purchase window 2400 automatically closes. The purchase window 2400 can also be closed by selecting the cancel button 2408. In another embodiment, the dynamic pricing system 102 periodically refreshes the price 2404 in the purchase window 2400. The price 2404 for a particular item, such as the song shown, and/or for a group of items is generated and dynamically adjusted by server 102. In one embodiment, the price is adjusted based on demand for the item so as to maximize profit. Generally, the greater demand for the particular item, server 102 will increase the price until the profit is maximized, and when the demand for the item is lower, the dynamic pricing system 102 lowers the price until the profit is maximized. The price of a song can also be dynamically adjusted based on other factors such as the amount of transfer time, the length of the song and overall quality of the song, to name a few factors. When the purchase button 2406 is selected, the dynamic pricing system 102 deducts the purchase price 2404 from the account of the user (see field 390) and the purchased item is transferred from the dynamic pricing system 102 to the customer device 124 over the network 106 in stage 408. When the user does not have enough money in their account, the dynamic pricing system 102 requests the user to deposit additional funds into their account before downloading the item. In one embodiment, the hypertext transfer protocol (HTTP) is used to download the item from the dynamic pricing system 102. In another embodiment, the file transfer protocol (FTP) is used to download the item from the dynamic pricing system 102 to the client 108. As should be appreciated, items can be downloaded in other manners and using other types of protocols. For example, in the above-described P2P embodiment of the dynamic pricing system 102, the purchased item is transferred over the network 106 directly from the content supplier computer 116 to the customer device 124. During downloading, screen 2400 is changed to downloading screen 2400a (FIG. 24B), which indicates the download status of the item. Screen 2400a contains a message portion 2452 that displays the status of the download and a close button 2454 for closing screen 2400a. After the item is successfully downloaded, message 2452 indicates that the download process is complete. If the download is unsuccessful, message 2452 indicates that the download was not completed, and the dynamic pricing system 102 gives the customer a certain amount of time, such as two days, from the purchase to download the item without being charged again for the item.

As should be appreciated, customers can access and purchase items on the dynamic pricing system 102 using other types of interfaces. For example, when the client 108 is a telephone, the customer can access and purchase items on the dynamic pricing system 102 through an automated voice menu system (i.e. "The price is 33 cents. You have 1 minute to press 1 to confirm your order or press 0 to cancel."). When for example customers use portable devices 126, a wireless protocol, such as Wireless Application Protocol (WAP), can be used to interface with system 102.

Below a number of techniques for dynamically pricing items on the dynamic pricing system 102 will be described. The dynamic pricing system 102 tries to optimize profit; this typically involves some estimation of the demand curve(s) for the items. The dynamic pricing system 102 in dynamically pricing the media content actually never knows the demand curve for an item for sale. Generally, the dynamic pricing system 102 continues to raise the price for an item until total profits are reduced. Alternatively, system 102 will decrease the price of content whenever an increase in price reduces profits. A general description of one embodiment of the pricing algorithm will now be described below. In this embodiment, the dynamic pricing system 102 through processor 110 calculates price adjustments using a logarithmic demand curve that has been found in empirical econometric studies to be the best fitting of algebraically tractable functional form for many retail markets. The quantity of a particular item (q) purchased at a particular price (p) is assumed to take the form of equation 1 below:

$$\text{Log } [q] = \alpha - \beta p \tag{Equation 1}$$

where

Log [0] is a natural logarithm q=quantity of an item p=Price of the item

β, α.=parameters.

With Equation 1 above, parameters α and β are unknown. In order to solve these parameters, the technique according to the present invention uses data observed through sales of items to estimate these parameters. Another factor in determining the optimal price for an item is that the demand curve for an item will change over time. Therefore, in one embodiment, the dynamic pricing system 102 does not base its price upon very old data. Still yet another obstacle the dynamic pricing system 102 faces in determining pricing for a particular item is that customer demand at the time periods in which a particular item is demanded varies depending on the nature of a particular item. For example, a hit song may have may sell a thousand copies a day. However, an obscure or old song to reach that level of sales may take a week, months, and/or even years. The profit (profit$_t$) made in a particular time period (T) is described below in equation 2:

$$\text{profit}_t = q_t(P_{t-c}) \tag{Equation 2}$$

where t=time period profit$_t$=profit for a particular item at time period t q$_t$=quantity of items sold time period t P$_t$=price of the item at time period t.

c=marginal cost.

It should be noted that for this embodiment the fixed costs such as cost of the servers, employees and other resources are ignored in Equation 2. Equation 2 only considers the marginal cost (c) caused by changes in sales volumes for a particular item. However, it should be understood that in other embodiments fixed costs can be a factor for dynamically pricing an item. Other factors may be incorporated into Equation 2 in order to determine the optimal profit. For example, if the time period (t) was twelve-hours (12 hours), one would expect that more sales would occur during the day as opposed during the middle of the night. This situation could result in undesirable, dramatic price fluctuations. To compensate for the difference between the periods, Equation 2 can factor in one or more additional variables in order to stabilize prices. Alternatively or additionally, the length of the time periods can vary in order to compensate for the differences between the periods. In another form, the price fluctuations between day and night are left alone so that users are given an incentive to download content when system activity is lower.

With the above background, an example will now be used to describe how prices are dynamically adjusted according to one embodiment of the present invention. In an initial time period (t=1), an initial price for an item is set. For example, the initial price of a song could be set to 90 ($0.90), depending on whatever the content supplier and/or the administrator using second time period (t=2), the processor 110 of the dynamic pricing system 102 changes the price in order to get a sample of the change in client demand at a differing price levels. In the current example, the price of a particular song is raised by 10¢, which is shown in equation 3 below.

$$p_2 = p_1 + 0.10 p_1 \text{ (or } p_2 = p_1 \times 1.0) \tag{Equation 3}$$

where p$_2$=price in the second time period.

Figure 25:
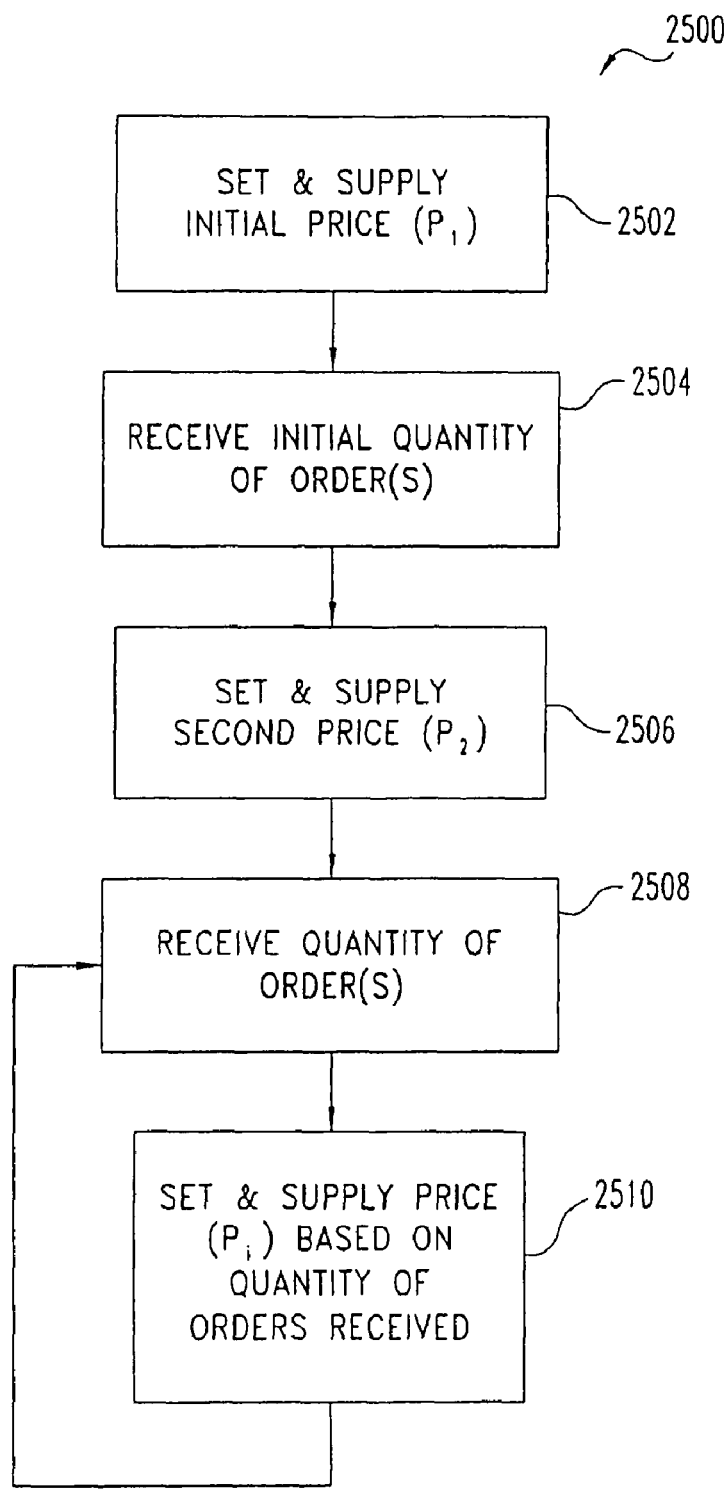
FIG. 25 is a flow diagram illustrating a process for dynamically pricing an item according to one embodiment of the present invention.

Flow diagram 2500 in FIG. 25 illustrates this technique according to one embodiment of the present invention. The technique described below will be for a song, but as should be understood this technique can be applied to the other types of media content items on the dynamic pricing system 102. In stage 2502, the initial price (p$_1$) of a song for sale is set by the dynamic pricing system 102 and displayed to the customer device 124. One or more orders for the song are received by the dynamic pricing system 102 in stage 2504, and the dynamic pricing system 102 stores in memory 112 the price (p$_1$) and quantity ordered (q$_1$) for the first time period. The length of the time periods in this embodiment can for example be by second, by minute, hourly, daily, weekly, monthly, yearly, or some other time increment (i.e., every 33.5 seconds). In one form, the time interval for each period is one day. For instance, the first time period would be day 1, the second time period would be day 2 and the third time period would be day 3. After the first time period, the processor 110 of the dynamic pricing system 102 in stage 2506 sets a second price (p$_2$) for the song and supplies the second price (p$_2$) for the song to the customer devices 124 (see, Equation 3). The processor 110 in stage 2506 can either increase or decrease the price of the song. For explanation purposes, we will assume that the dynamic pricing system 102 increased the price in stage 2506. In stage 2508, the dynamic pricing system 102 receives a quantity of orders ($q_2$) for the song from the customer devices 124. In time period three (t=3), the price and quantity ordered information from the previous two periods is used to determine whether the price change from the first period to the second period increased profits or not. If profits increased ($q_2$ ($p_2$-c)>$q_1$ ($p_1$-c)) then increasing prices further may be profitable. If profit decreases, however, then a price decrease from initial price ($p_1$) may be appropriate. The changes in prices depend on the functional form of the particular demand curve for the particular content for sale. Using a logarithmic demand curve, Equation 4, which is shown below, can be used to calculate profit.

$$\text{profit}=q(p-c)\text{-Exp}(\alpha-\beta p)(p-c) \quad \text{(Equation 4)}$$

From Equation 4, the profit maximizing price can be determined to be as shown below in Equation 5.

$$p = \frac{(1+c)}{\beta} \quad \text{(Equation 5)}$$

A nice property of Equation 5 is that price is not dependent upon unknown parameter $\alpha$. However, the optimal price still depends on unknown parameter $\beta$. As should be appreciated, a number of techniques can be used to estimate the parameters $\beta$. In one technique, the two observations of price (p) and quantity (q) are combined from periods one and two to generate an estimate of $\beta$. Equations 6 and 7 illustrate this technique.

$$\text{Log }[q_1]=\alpha-\beta p_1+\epsilon_1 \quad \text{(Equation 6)}$$

$$\text{Log }[q_2]=\alpha-\beta p_2+\epsilon_2 \quad \text{(Equation 7)}$$

Where $\epsilon_1$ and $\epsilon_2$=sampling error.

Equations 6 and 7 can be combined in order to determine parameter $\beta$, which is shown below in Equation 8.

$$\beta=\{\text{Log }[q_2]-\text{Log }[q_1]-\epsilon_2-\epsilon_1\}/(p_1-p_2) \quad \text{(Equation 8)}$$

It is assumed that the longer interval time between price changes, the smaller expected sampling error ($\epsilon_2$, $\epsilon_1$) would be relative to the quantities ordered. Over a long period of time, the expected sampling error terms would be zero. This yields equation 9 below.

$$\beta = \frac{\{\text{Log}[q_2] - \text{Log}[q_1]\}}{(p_1 - p_2)} \quad \text{(Equation 9)}$$

The profit maximizing, or optimal price, can be determined by combining Equation 5 with Equation 9, which yields Equation 10 below.

$$p_{t-1,opt} = \frac{(1+c)(p_{t-2} - p_{t-1})}{\{\text{Log}[q_{t-1}] - \text{Log}[q_{t-2}]\}} \quad \text{(Equation 10)}$$

In order to prevent extreme fluctuations in pricing between two periods, the change in pricing between two different periods is dampened so that wild fluctuations in pricing does not occur. The amount of dampening can be adjusted depending on the amount of aggressiveness in pricing the content supplier and/or administrator intends to use. The estimation of $\beta$ is highly subject to sampling error. Therefore, to be conservative, a geometric mean between the previous price and the new estimated optimal price is taken. In addition, absolute bounds on how much a price adjustment between two periods is further set to further dampen pricing. This is done just in case the estimation procedure gives an inaccurate estimate. A generic form of this technique used by the dynamic pricing system 102 is shown in Equation Set 11 below.

Set $$p_t=p_{t-1}-L \text{ if } p_{t-1,opt}<p_{t-1}-L$$

$$p_t=(p_{t-1})^w(p_{t-1,opt})^{(1-w)} \text{ if } p_{t-1}-L \leq p_{t-1,opt} \leq p_{t-1}+L \quad \text{(Equation Set 11)}$$

$$p_t=p_{t-1}+L \text{ if } p_{t-1,opt}>p_{t-1}+L$$

Where

L=limit bounds

W=weighting factor.

Limit bounds (L) in Equation Set 11 is used to limit how much the price will be adjusted between two periods. For example, if the optimal price for the previous time period is greater than the limit bounds (L) from the actual price, then the dynamic pricing system 102 sets the price for the current time period ($p_t$) to the limit bound (L) from the previous time period price ($p_{t-1}$). Weighting factor (W) is used as a geometric mean of weighting the different prices between the optimal and the actual pricing. For example, the weighting factor is used when the optimal price for the previous time period ($p_{t-1,opt}$) is within the limit bounds (L). The geometric mean of the weighting factor (W) allows the price to move in the direction of the estimated optimal price ($p_{t-1,opt}$), but forces the price to move slowly. Aggressiveness in price adjustments can be adjusted by adjusting the weighting factor W. The more comfortable the administrator and/or content supplier are with the pricing estimates, the more aggressive the pricing can become by adjusting weighting factor W.

For example, at time period one, the dynamic pricing system 102 priced the song at $1.00 ($p_1$=$1.00) and the number of copies of the song that were purchased during time period one was 150 ($q_1$=150). During time period two, the dynamic pricing system 102 priced the same song at $1.40 ($p_2$=$1.40) and the number of copies of the song that were purchased during time period two was 100 ($q_2$=100). In time period three, the dynamic pricing system 102 determines the optimal price to be the following in Equation 12 (stage 2510). In Equation 12, we have assumed the marginal cost of supplying an additional copy to be negligible, or zero (c=0) for this example.

$$p_{2,opt} = \frac{(1+c)(p_1 - p_2)}{\{\text{Log}[q_2] - \text{Log}[q_1]\}} \quad \text{(Equation 12)}$$

$$p_{2,opt} = \frac{(1+0)(1.00 - 1.40)}{\{\text{Log}[100] - \text{Log}[150]\}} = 0.99$$

With the bounds equals $0.50 (L) and weighting factor W=0.8 in this example, the dynamic pricing system 102 uses Equation Set 13 below in order to determine the dynamic price at time period three ($p_3$).

Set $$p_3=p_2-0.50 \text{ if } p_{2,opt}<p_{2}-0.50$$

$$p_3=(p_2)^{0.8}(p_{2,opt})^{0.2} \text{ if } p_{2}-0.50 \leq p_{2,opt} \leq p_2+0.50 \quad \text{(Equation Set 13)}$$

$$p_3=p_2+0.50 \text{ if } p_{2,opt}>p_2+0.50$$

$$p_3=(1.40)^{(0.8)}(0.99)^{(0.2)}=\$1.31$$

In stage 2510, the dynamic pricing system 102 with processor 110 sets the revised sale price for the item and stores the price in memory 110. Using the above example, the dynamic pricing system 102 would then set the price of the song to $1.31 in time period three. For subsequent time periods, as more orders are received in stage 2508, the dynamic pricing system 102 continues to periodically re-price the content according to the Equation Set 11.

Equation 14 below is a generic form for another technique of dynamically pricing an item according another embodiment of the present invention.

$$\text{New Dynamic price} = \text{Price Basis} \times \text{Dynamic Price Modifier} \quad \text{(Equation 14)}$$

In Equation 14, the price basis is modified by the dynamic price modifier so as to result in a new dynamic price for an item. In one form, the dynamic price modifier is some measure of change in demand for one or more items being priced. In another form, the dynamic price modifier can take into account profitability of different price levels. It should be understood that the dynamic pricing modifier can take into account other factors. These factors can include, but are not limited to: the marginal and/or fixed costs of the item; price ceilings and/or floors for the item; file size of the item; the bandwidth of the connection to the dynamic pricing system 102; the quality of the item; the popularity of the item as measured by third parties, such as the Billboard ranking of a song; reviews of an item; and number of times an item has been viewed on the dynamic pricing system 102. Generally, the dynamic price modifier increases the price of an item when demand for that item increases and reduces the price of an item when the demand for the item decreases. In one form, the dynamic pricing modifier is based on the differences between the quantity ordered at specific intervals. For instance, these intervals can be by second, by minute, hourly, daily, monthly, or yearly. In another form, the dynamic pricing modifier is based on the time between successive purchases. For example, if the time delay between successive purchases decreases, the dynamic pricing system 102 can infer that demand is increasing and thus increase the price for the item.

Figure 26:
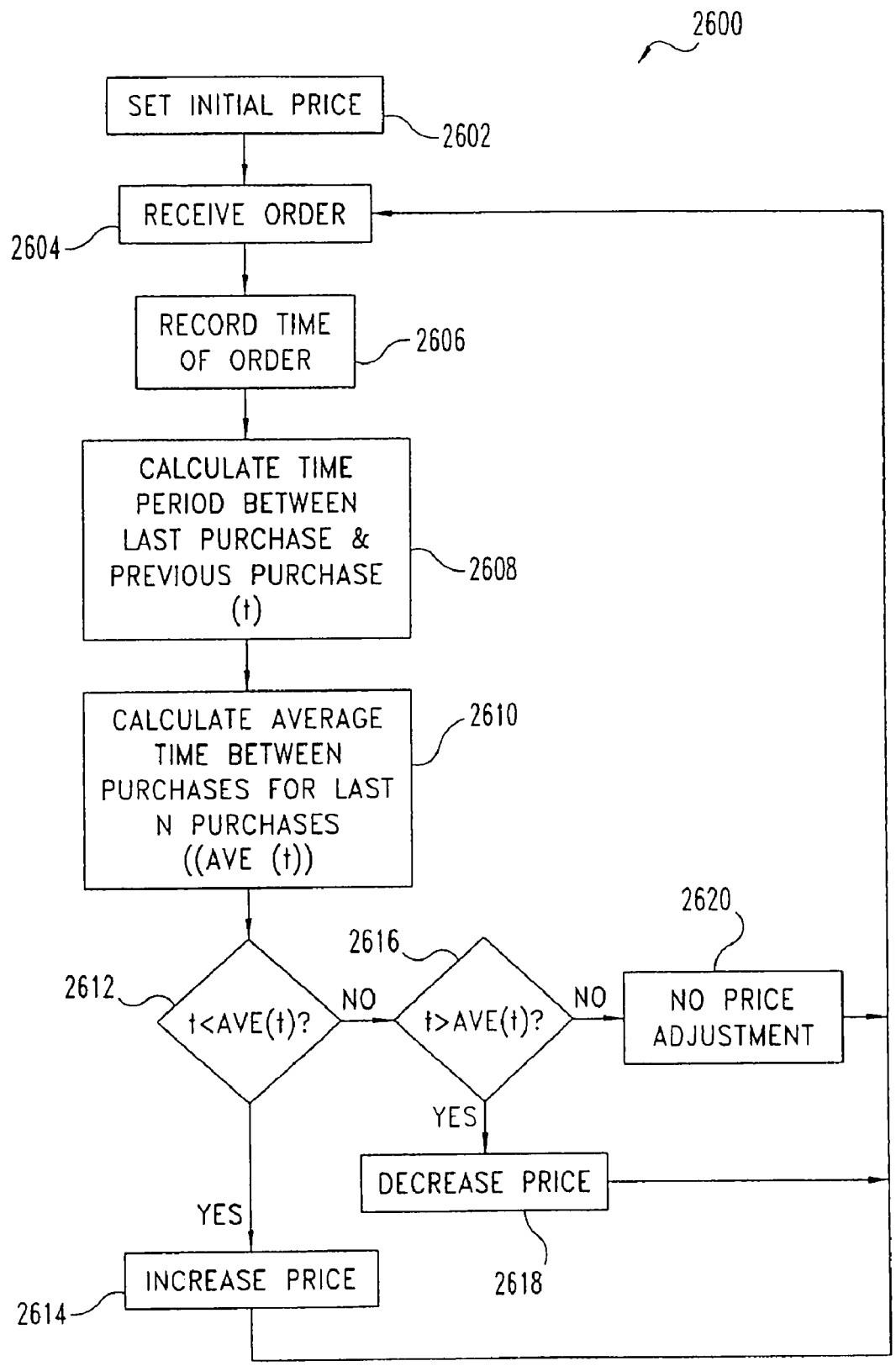
FIG. 26 is a flow diagram illustrating a process for dynamically pricing an item according to another embodiment of the present invention.

FIG. 26 is a flow diagram 2600 that illustrates a technique for dynamically pricing content items according to another embodiment of the present invention. In the technique illustrated in FIG. 26, the price of an item is changed based on the time delay between orders for the item. An initial price for the item for sale on the dynamic pricing system 102 is set in stage 2602. The content supplier and/or the system administrator can set the initial price initial price for the item. Alternatively or additionally, the dynamic pricing system 102 in this and other embodiments can automatically set the initial price based on default prices and/or historical prices for similar content stored in memory 112. In one form, the administrator through administrative computer 104 sets the initial price for content on the dynamic pricing system 102. In another form, the content supplier sets the initial price in stage 2602. In stage 2604, the processor 110 of the dynamic pricing system 102 receives a customer order over the network 106. From the clock 111, the processor 110 in stage 2606 stores in memory 112 the time the order was received, and the dynamic pricing system 102 processes the order. It should be appreciated that the time recorded from the clock 111 can be based on other events related to the order, such as when the content was actually delivered. In stage 2608, the processor 110 determines the time period (t) between the current purchase and the previous purchase of the item. In another form, the clock 111 is reset after each purchase such that the processor 110 stores in memory 112 the time period (t) between the current and previous purchases. Initially, at the first purchase of the item, the time period (t) between purchases can be based on the time delay between when the item was originally available on the dynamic pricing system 102 and when the first purchase was made. The time when the item was first available on the dynamic pricing system 102 can be stored into memory in stage 2602. In another form, the processor 110 waits to receive a second order from a customer before calculating the time delay (t) between purchases. It should be appreciated that the dynamic pricing system 102 can record a series of purchase times before dynamically pricing an item.

In stage 2610, the processor 110 determines the average time delay ((AVE(t)) between purchases. In one form, the average time delay is calculated for all purchases, and in another form, the average time delay is calculated for a set number (N) of previous purchases so as to take into account shifts in the demand curve. In one particular form, the average time delay is calculated for the last 10 periods (N=10). Equation 15 below illustrates how the average time delay is calculated.

$$AVE(t) = \frac{t_i + t_{i-1} + \ldots + t_{i-N+1}}{N} \quad \text{(Equation 15)}$$

Where
AVE(t)=Average Time Delay Between Purchases
$t_i$=Time delay Purchase Period i
N=Number of Periods Generally, when the current time delay is less than the average time delay, it can be inferred that demand for the item has increased. Conversely, if the current time delay is greater, then it can be inferred that demand has lowered. In stage 2612, the processor 110 of the dynamic pricing system determines whether or not the current time delay between purchases (t) is less than average time delay between purchases (AVE(t)). If the current time delay is less than the average, the processor 110 increases the price of the item in stage 2614. In one form of the present invention, the price would be adjusted according to Equation 16 as illustrated below. As can be seen below, Equation 16 is derived from Equation 14.

$$P_{i+1} = P_i \times \frac{AVE(t)}{t_i} \quad \text{(Equation 16)}$$

Where
$P_{i+1}$=New Dynamic Price
$P_i$=Price Basis, or Current Price for Period i.

In Equation 16, the price basis is the price of the item for the latest period, and the dynamic price is the new price for the item. For example, if the price of the item was currently $1.20, the average time between purchases was 20 seconds and the current delay between purchases was 15 seconds, the new price for the item would be $1.60 (1.20.times.20/15=1.60). In another form of the present embodiment, the processor 110 takes into account of the upper price, or price ceiling, for the item. As previously mentioned, the content supplier, such as the artist, and/or the system administrator can specify upper and lower price limits for a particular item, such as a song. If, for example, the calculated new dynamic price exceeded the upper price limit, the processor 110 in stage 2614 would set the new price to the upper limit price. It should be appreciated that other factors, such as the ones mentioned above, can be factored in when adjusting the price in stage 2614. Potential customers can review the new, dynamic price 2404 in screen 2400 (FIG. 24A) and can decide whether to purchase the item at the new price 2404. When a customer decides to purchase the item at the increased price (after stage 2614), the processor 110 then proceeds to stage 2604 so as to process the next customer order.

If the current time delay (t) between purchases is not less than the average time delay between purchases in stage 2612, then the processor 110 in stage 2616 determines whether the current time delay (t) between purchases is greater than the average time delay between purchases. If so, then it can be inferred that demand for the item has lowered, and the processor 110 in stage 2618 decreases the price of the item. In one form, the processor 110 reduces the price using Equation 16 (above). For example, if the price of the item was currently $1.20, the average time between purchases was 15 seconds and the current delay between purchases was 20 seconds, the new price for the item would be $0.90 (1.20.times.15/20=0.90). As should be appreciated, the processor 110 can consider other factors, such as the quality of the item, marginal cost and available bandwidth, when adjusting the price in stage 2618. For instance, in one form, the processor 110 also determines in stage 2618 whether the new price is less than the predefined lower price limit, or floor, for the item. If the new price is less than the lower price limit, then processor 110 only sets the new price at the lower limit. In another embodiment, to prevent wild fluctuations in price, the dynamic pricing system 102 in stages 2614 and 2618 can dampen the price changes between periods. When in stage 2616 the current time delay (t) between purchases is not greater than the average time delay between purchases, the processor in stage 2620 makes no price adjustment. In another embodiment, to prevent the price from being locked into a local maximum price, the processor 110 in stage 2620 randomly adjusts the price. After stages 2614, 2618 or 2620, customers can review the new price and place orders in stage 2604.

Figure 27:
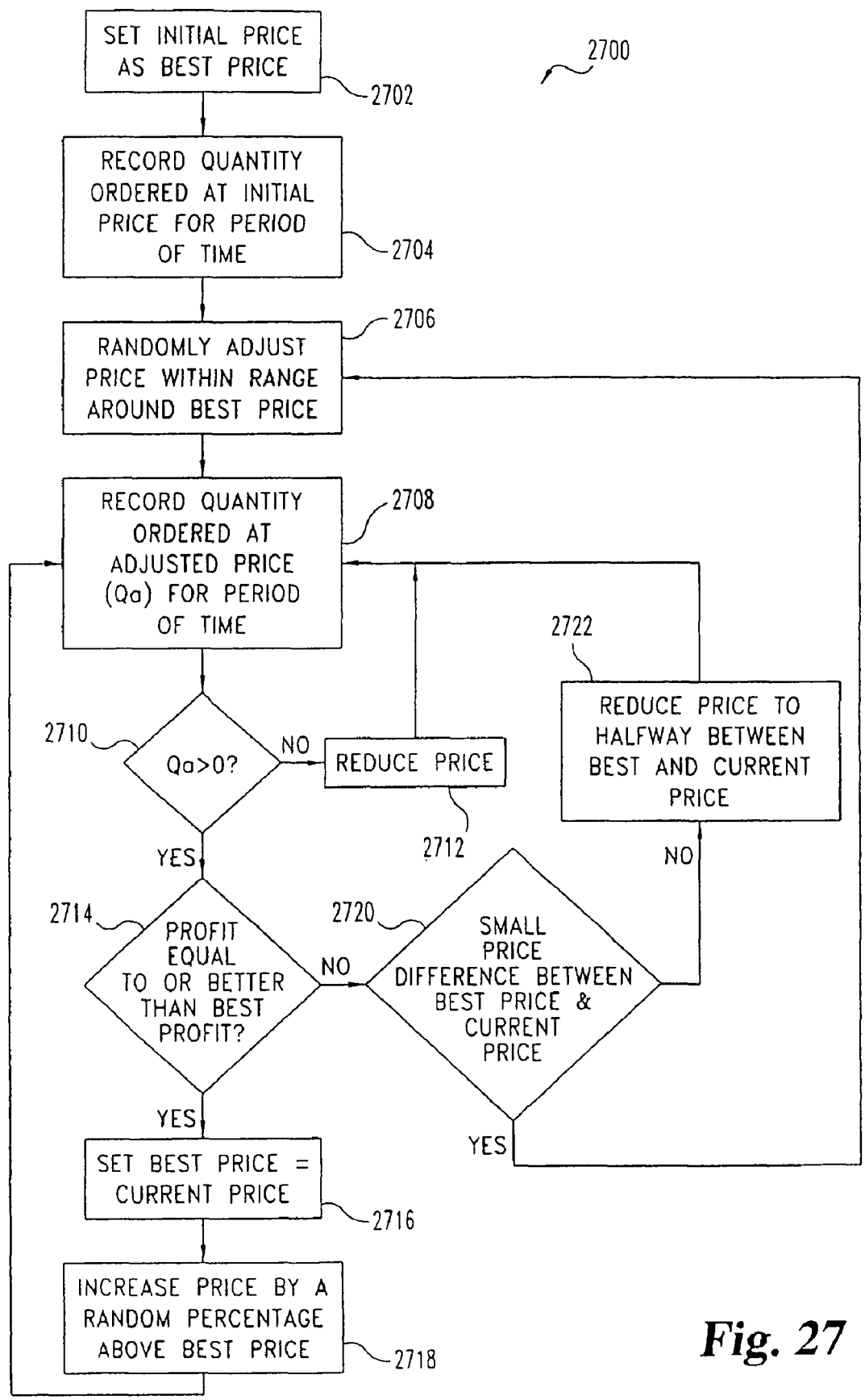
FIG. 27 is a flow diagram illustrating a process for dynamically pricing an item according to a further embodiment of the present invention.

A technique for dynamically pricing items according to another embodiment of the present invention will now be described with reference to flow chart 2700 in FIG. 27. In this technique, the databases 225 record the number purchases of each item in the dynamic pricing system 102. In one form of this embodiment, a dynamic pricing system 102 periodically updates the prices of each item for sale. The periodic update can be for every second, every minute, hourly, monthly, and/or yearly, to name a few time periods. In one form, the price of individual items is updated nightly. In another form, the prices are updated every minute. Each item for sale and/or type of item for sale, such a country songs, can be dynamically priced at different intervals and/or use different pricing techniques depending the nature of the item sold. For example, higher ticket items, which sell at a slower rate, may have their prices less frequently updated as compared to lower ticket items, which sell at higher volumes. Further, groups of items can be aggregately priced together.

As mentioned above, a number of different people can set the initial price of an item. For instance, the artist, content supplier, owner of the item, and/or the system administrator can set the initial price for an item. In stage 2702, the dynamic pricing system 102 stores in memory 112 the initial price as the current best price for the item. The processor 110 in stage 2704 stores in memory 112 the number of sales of the item at the initial price for a specified time interval and the profit generated (best profit). In one form, the pricing and quantity information is updated daily in the tables 302 of the database 225. After the specified time interval, the processor 110 randomly changes the price within a range around the best price in stage 2706. In one form, the dynamic pricing system 102 randomly adjusts the current price within −5% to +5% of the best price. As should be understood, the price can be randomly adjusted within different ranges. In another form, the price is randomly adjusted without having specified upper and/or lower range limits. In stage 2708, the processor 110 records in memory 112 the quantity order ($Q_a$) at the adjusted current price for the same time interval as in stage 2704 (for example, daily or every minute). The processor 110 in stage 2710 checks to see if the quantity ordered in the last time interval was greater than zero (0). If not, the processor 110 in stage 2712 reduces the current price. For example, the processor 110 can reduce the price by $0.10 increments when there are no sales of the item within the specified period. In another form, the price is lowered by a percentage of the current price, such as 10% of the current price. If the price reduction in stage 2712 would reduce the current price below the lower price limit, when specified, the process 110 sets the current price to the lower limit. As mentioned above, the lower limit may be based in part on the marginal and/or fixed costs for the item. After the price is reduced in stage 2712, the processor 110 in stage 2708 records the quantity sold at the new reduced price for the specified time interval. In an alternate form, the processor 110 in stage 2712 increases the time interval in which the quantity ordered is recorded in stage 2708. As should be appreciated, the processor 110 can both reduce the price and increase the time interval in stage 2712.

When in stage 2710 the quantity ordered at the adjusted price is greater than zero (0), the processor 110 determines whether the profit at the current price is at least equal to the best profit stored in memory 112. In one form, the processor 110 determines profit by using Equation 2, above. As should be appreciated, the dynamic pricing system 102 can take into account other factors when determining the profit. For example, these factors can include fixed costs, bandwidth used, and file size, to name a few. If in stage 2714 the current profit is equal to or better than the best profit at the best price, which is stored in memory 112, then the processor 110 in stage 2716 sets the current price as the best price in memory 112. In one form, the processor 110 also stores in memory 112 the quantity ordered at the now, best price such that profit can be calculated. In another form, the processor 110 stores in the memory 112 the current profit as the best profit. Following stage 2716, the processor 110 randomly increases the price for the item within a specified range above the current price. This range limit can be predefined and/or determined through historical data. In one form, the random price is generated within a range from 0% to 10% above the current price. It should be appreciated that the processor 110 can use a number of techniques for generating the random numbers (pseudo-random) as would occur to those of ordinary skill in the art. When an upper limit in price is defined, the price of the item will only be increased to the upper limit price. After the price is increased in stage 2708, the processor 110 proceeds to stage 2718 and records the quantity ordered ($Q_a$) at the new adjusted price. By changing the best price in stage 2716 even when the current profit is equal to the best profit in stage 2714, removes old best prices that may be based on a different demand curve.

In another alternative, the processor 110 in stage 2714 determines whether the profit at the current price is better than the profit at the recorded best price. If so, the processor 110 proceeds to stage 2716. If the current profit is equal to the best profit, then the best price remains the same, the current price is not adjusted, and the processor 110 proceeds to stage 2708.

When in stage 2714 the current profit is less than the best profit, the processor 110 in stage 2720 determines whether there is a small price difference between the current price and the best price. The small difference can be based on a percentage basis between the prices and/or by a fixed amount. In one form, the small price difference is less than or equal to a one-percent (1%) change the price. In another form, the small price difference is two-cents ($0.02). It should be understood that other values can be used for the price differential. If there is a small price difference between the current price and the best price, the processor 110 proceeds to stage 2706 and randomly adjusts the prices within a range around the best price. Stage 2720 reduces the likelihood that the best price will be stuck at a local maximum in profit. When this problem is not a concern, stage 2720 can be omitted. If there is not a small difference in price between the best and current prices in stage 2720, the processor 110 in stage 2722 reduces the current price to halfway between the current price and the best price. For instance, if the current price is $1.00 and the best price is $0.90, the new adjusted price would be $0.95. As should be appreciated, the price in stage 2722 could be reduced by some other fraction of the price differential between the current price and the best price, besides one-half. In one form, if the reduced price is lower than the lower price limit for the item, then the new adjusted price in stage 2722 is set to the lower price limit for the item. After reducing the price in stage 2722, the dynamic pricing system 102 proceeds to stage 2708 and tracks the quantity ordered at the new adjusted price. As shown in FIG. 27, the dynamic pricing system 102 using the technique illustrated in flowchart 2700 continues to periodically adjust the price of items.

In another technique, the period of time between recording the quantity order is variable. This technique can be used in the applicable, above-described techniques for dynamically pricing items, but instead "quantity" in this technique is replaced with "quantity/length of time period". For example, in stage 2708 of flow chart 2700, the "quantity ordered/length of time period" is recorded when the time period is variable. The dynamic pricing system 102 for instance would record one-hundred songs per hour (100 songs/hour) when one-hundred and fifty (150) songs are ordered in a one and a half hour (1.5) time period. By recording the "quantity/length of time period" improves sampling during slow order periods, such as at night.

As should be appreciated, different items for sale on the dynamic pricing system 102 may use different techniques for dynamically pricing the items. For example, popular music may be dynamically priced according to the technique illustrated in FIG. 26; while text may be dynamically priced according to the technique illustrated in FIG. 27. In another example, "popular" songs are dynamically priced using a variable time period; while "classical" songs are dynamically priced using a fixed time period.

As has been previously explained, the databases 225 contain information in tables and fields with regard to each media content item. Such information can include, but is not limited to, the name/address of the "home" file server 210 for the works; the names of the artists, authors, directors, actors and/or owners of the works; titles; publishers; producers; type of work, such as music, text or video; work category or genre (drama, humor, rock, jazz . . . ); subject; pricing information and size/length of the work. The databases 225 include one or more movie databases 226; one or more book/text databases 228; one or more music databases 230; one or more software databases 232; one or more photograph/picture databases 234; one or more user databases 236; and/or one or more artist information databases 238. The movies databases 226 can store the file name along with the name/address of the home movie file server 216; file size; title; writer; director; actors; producers; writers; distributors; movie category, such as drama or action; description; comments; reviews; pricing and demand information; and/or length of the work. The books databases 228 can store the file name along with the home book file server 218 for a work; file size; the title; author; owner; publisher; distributor; picture of the author and/or book cover; category, such as biography or mystery; description; comments; reviews; pricing and demand information; and/or size of the work. Similarly, the music databases 230 can store the file name of a song, the location of the file on the home music server 220, song title, artist, author, producer, distributor (label), album name, album picture, picture of the artist, musical category (i.e. rock, jazz . . . ), description, comments, pricing information, demand information, and/or length/size of the song along with other information relating to the song. The software databases 232 and the picture databases 234 respectively store information about the software stored on the software file servers 222 and the pictures stored on the picture file servers 224, and this information can include file name and home file server information 210; pricing and demand information; titles; size; category; owner and/or authorship. Biographical and other types of artist information is maintained one the artists databases 238. It should be understood that the above-described databases 225 can include additional information and/or omit certain information.

Additionally, as previously explained, the tables 302 in the databases 225 include a media information table 304, a pricing table 306, a keyword table 308, an artist table 310, an account table 312, and a session table 314. The media information table 304 stores information about the media content stored on the file servers 210. In one embodiment, the movie 226, books 228, music 230, software 232, and photograph 234 databases each include one or more media information 304, pricing 306 and keyword 308 tables. The media information tables 304 includes a number of fields 316 that contain information about a particular media content item. As shown, the fields 316 in the media information table 304 can include an artist/author name field 322 in which the name of the artist is identified; and an artist ID field 324 which contains a unique identifier for individual artists on the dynamic pricing system 102. Categorical information, such as the album name and/or the type of music, can be stored in field 326. The price model for dynamically pricing the item, the initial price for the item, and the implicit or marginal cost of the item are stored in fields 336, 338 and 340, respectively. Fields 342, 344 and 346 respectively store the minimum price for the item, the maximum price for the item and the current price for the item. The current demand, or the number of times the item was purchased within a specified period, is maintained in field 348. A count cache field 350 stores the number of purchases of the item since the last time the current demand was determined. Pricing algorithm parameters field 352 can store information such as the historical pricing and quantity ordered information for the item. In one form, field 352 stores the price and corresponding demand for the item over the last seven periods. It should be appreciated that depending on the dynamic pricing technique used, field 352 can store other parameters, such as the time between purchases. The pricing table 306 stores information related to the price of particular media content items. The pricing table 306 includes media ID field 318 for identifying the particular item. The date/time, the price at that time, and the quantity demand at that time for the item identified by the media ID field 318 are stored in fields 354, 356 and 358, respectively.

The databases 225 may also include one or more sales criteria field(s) indicative of the ranking of some sales criteria or each item. For example, the sales criteria field may store a variable representative of sales volume, i.e. such as the previously described quantity demand at that time field 358, count cache field 360 and pricing algorithm parameters field 352. There may be sales criteria fields indicative of the sales volume for all items offered for sale, for all items of the same type, for all items of the same type in the same genre, for all items by a specific composer, artist, author or other creator or publisher of the item. It should be understood that the processor can be programmed to access the databases 225 to obtain data for generating categorical sales criteria as an output which may be stored in memory, in sales criteria field(s) or utilized in a pricing strategy. The output of such a sales criteria calculation should be considered as being included in the following descriptions that refer to using the values stored in sales criteria fields. The variable stored in the sales criteria field or the output of the sales criteria calculation may be an integer type variable indicative of the ranking of the item in any one of the above identified categories or other categories or may be another variable indicative of the percentage sales rank. The software running on the processor may compare the actual number of sales of the item with other items in the appropriate category within which the sales volume of the item is ranked to generate the entry into the sales criteria field(s). The sales criteria field(s) may contain information indicative of the sales volume for all time, or for a specified period of time prior to the ranking period and may be updated continuously or periodically within the scope of the disclosure. It is also within the scope of the disclosure for more and/or other sales criteria field(s) to be included in the database that reflect such things as profitability, net receipts, gross receipts, or other sales criteria.

It is within the scope of the disclosure for the pricing of the items to consider the values in the above described sales criteria field(s) and/or any other field in the database. For instance, considering items that constitute music files, the pricing of any particular item may take into consideration the ranking of the item's sales volume as compared to: all other items; all other music file items; all other music file items in the same genre; all other music file items by the same artist; etc. The top level selling items within any of these categories may be priced utilizing a premium pricing strategy (A), the mid level selling items may be priced utilizing a standard pricing strategy (B) and the lowest level selling items within any of these categories may be priced utilizing a discount pricing strategy (C). In such a three level pricing strategy, the premium pricing strategy (A) will typically generate the highest prices while the discount pricing strategy (C) will typically generate the lowest price. Those skilled in the art will recognize that more of fewer sales levels may be utilized by the system and that more or fewer pricing strategies (A-ZZZ) may be utilized by the system.

Thus one method of dynamically pricing items includes placing items in the inventory into categories according to sales criteria. In one specific embodiment, the top 1% of items by sales rank receive price A, i.e. they are priced using a premium pricing strategy (A), the next 2% of items by sales rank receive price B, they are priced using a standard pricing strategy (B), the next X % of items by sales rank receive price C, etc. Prices A, B, C etc. can be fixed. For example, the top 1% of music song files may all be priced at $0.99, the next 2% of music song files may be priced at $0.89, the next X % of music song files may all be priced at $0.79, etc. It is within the scope of the disclosure for prices A, B and C to be an average or median price and for upper and lower bounds to be set on prices that may be set for items meeting the criteria for each price. For instance, any music song file in the top 1% may be priced between $0.94 and $1.04. These songs may be priced randomly within the upper and lower limits for the sales category into which they fall or may be priced based on their actual sales rank within the sales category within which they fall. It is also within the scope of the disclosure for prices A, B, C etc to be adjusted dynamically as described herein.

The sales criteria utilized to determine the category within which an item falls may be any sales criteria such as, for example, profit, revenue, absolute sales numbers, cost, marginal cost or other sales criteria. The categorization of sales criteria may be based on rank by percentage or an absolute number, e.g. the top 15 items may be priced utilizing the premium pricing strategy (A) instead of top 1% of items.

Since the databases 225 include various fields for each item that facilitate categorization of the items, for example categorical information field 326, it is within the scope of the disclosure to utilize dynamic pricing to maximize the profits (or some other sales criteria) across entire categories. For example, profits or revenues for all items in the music database 230 can be maximized using the disclosed dynamic pricing techniques and systems. Alternatively, musical media may be categorized by some other criteria such as the artist using the artist/author field 322 or 324, type of work or genre etc. for which there is a field in the tables of the databases with each track being placed into a category based on one or more fields of the database. The system may then dynamically price all of the tracks in the same category at the same price in an effort to maximize profit for that category.

Alternatively, instead of every item in a particular category having the same price, each category may be assigned a main price utilizing the disclosed dynamic pricing techniques and system and each item within a category may be given a price randomly scattered around the main price. For example, instead of each track in a genre having the same price, each track in the genre has a price within 10% of a main price which is calculated using the disclosed dynamic pricing techniques and system. Thus, each track within a genre may have a price randomly scattered around a main price.

While certain examples refer to music media and tracks, it should be understood that the teachings disclosed herein are equally applicable to other media, such as books, software, photographs, videos, etc. Each item of such media, as described above, contains fields in the database that may be utilized alone or in combination to categorize such media for dynamic pricing as described above.

Figure 28:
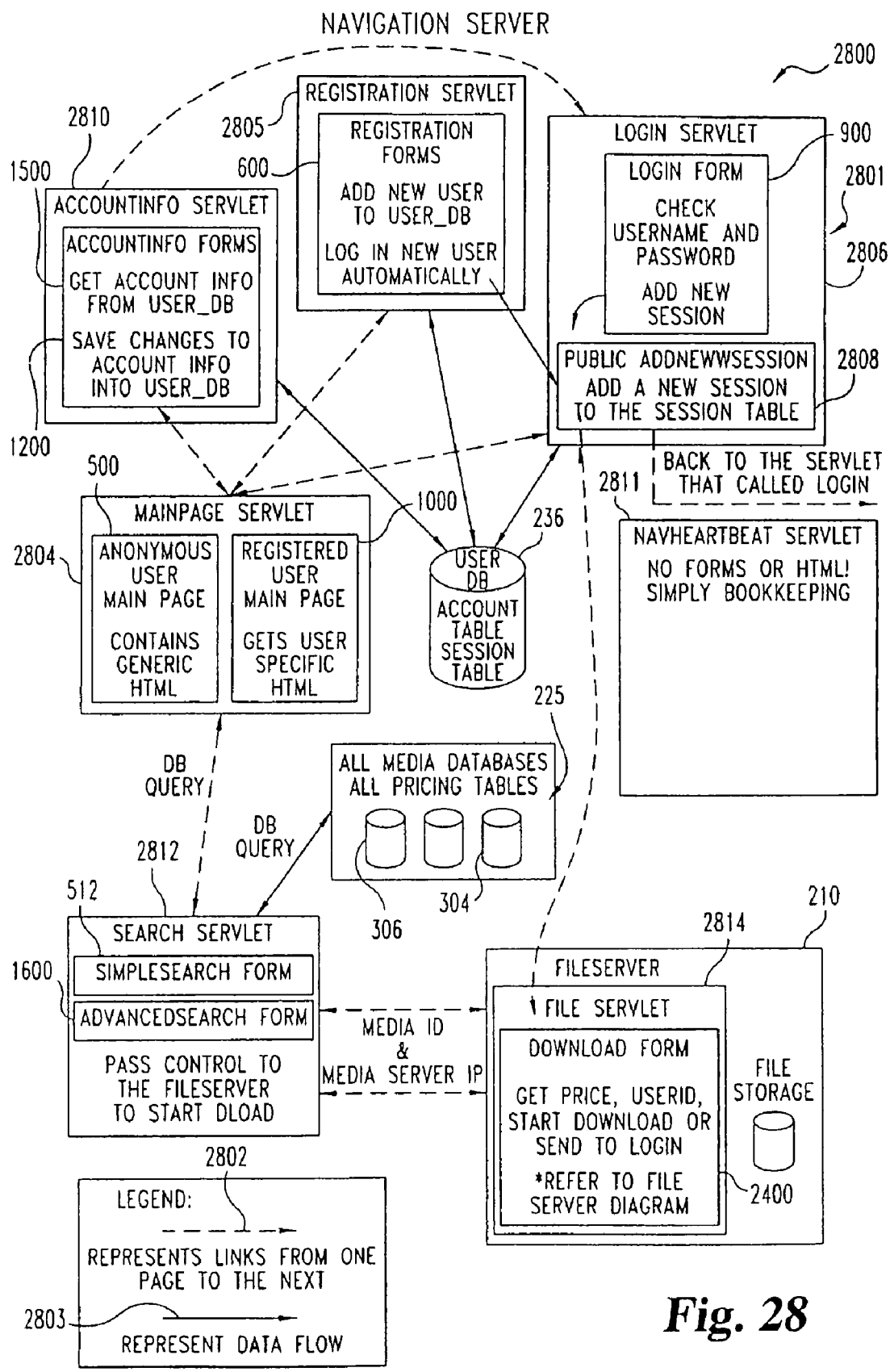
FIG. 28 shows a diagrammatic view of data flow between navigation servlets in the FIG. 2 system.

In one embodiment of the dynamic pricing system 102, servlets perform the above-described functions in order to operate the dynamic pricing system 102. In one form, Java servlets are used. As should be appreciated the dynamic pricing system 102 can use other types of systems in order to operate. A block diagram 2800 showing the relationship of servlets 2801 loaded on each of the navigation servers 204 is illustrated in FIG. 28. In diagram 2800, dashed arrows 2802 represent links between pages and solid arrows 2803 represent data flow. Main page servlet 2804 generates the anonymous main page 500 when the user is not logged into the dynamic pricing system 102 and the registered user main page 1000 when the user has logged onto the dynamic pricing system 102. Registration servlet 2805 handles user registration with the dynamic pricing system 102. As depicted, the registration servlet 2805 creates the registration form(s) 600. Once the user submits form 600, the registration servlet 2805 adds the new user to the user database 236 and logs in the new user automatically. Login servlet 2806 is responsible for logging in registered users into the dynamic pricing system 102. As shown, the login servlet 2806 includes an add session servlet 2808 which adds a new sessions to the session table 314 in the user database 236. For example, after the registration servlet 2805 registers a new user, the registration servlet 2805 automatically logs in the new user by calling the add new session servlet 2808. The login servlet 2806 generates the login form 900, and once the user submits a filled-out login form 900 to the navigation server 204, the login servlet 2806 checks to see if the username and password are valid by comparing the entered username and password with the user database 236. If the username and password are valid, the add new session servlet 2808 adds a new session to the session table 314 in the user database 236. After the user is logged into the dynamic pricing system 102, the login servlet 2806 returns control back to the servlet 2801 that originally called the login servlet 2806. Any page that requires the user to have a session will query the session table 314 in the user database 236 before the user is allowed to proceed. If the user does not have a current session, the login servlet 2806 is called so that the user can login to the dynamic pricing system 102.

In FIG. 28, account information servlet 2810 is responsible for maintaining the user account tables 312 in the user database 236. The account information servlet 2810 generates the forms, such as forms 1200 and 1500, that are used to update the account tables 312 in the user database 236. Navigation heartbeat servlet 2811 monitors the operational load of the servlets 2801 on the navigation server 204 and transmits the load information to the heartbeat server 206. Moreover, the navigation heartbeat servlet 2811 retrieves load information about the other components of the dynamic pricing system 102 from the heartbeat server 206 and communicates the load information of the other components to the individual servlets on the navigation server 204.

Search servlet 2812 processes search requests from the users. As illustrated, the search servlet processes the search forms, such as simple search form 512, media form 1800 and advanced search form 1600. For example, the search servlet 2812 can transmit the advanced search form 1600 to the client 108. After the user through client 108 submits a filled-out advance search form 1600 to the navigation server 204, the search servlet queries one or more of the databases 225, and the databases 225 return results from the query to the search servlet 2812, which in turn sends search results page 1700 to the client 108. An alternate view of the same process is illustrated in FIG. 2. In this example, the client 108 submits a search request form, as shown by arrow 250, to the connection server 202. The connection server 202 based on the load information from the navigation heartbeat servlet 2811, which was supplied by the heartbeat server 206, directs the submitted form, as shown by request arrow 252, to one of the navigation servers 204. As shown by query arrow 256, the search servlet 2812 on the navigation server 204 queries one or more of the databases 225. The results from the query, as shown by results arrow 258, are returned to the search servlet 2812. Based on the results, the search servlet 2812 generates the search results pages 1700 or 2300, for example, and as indicated by arrow 260, the navigation server 204 transmits the search results page 1700 to the client 108.

Figure 29:
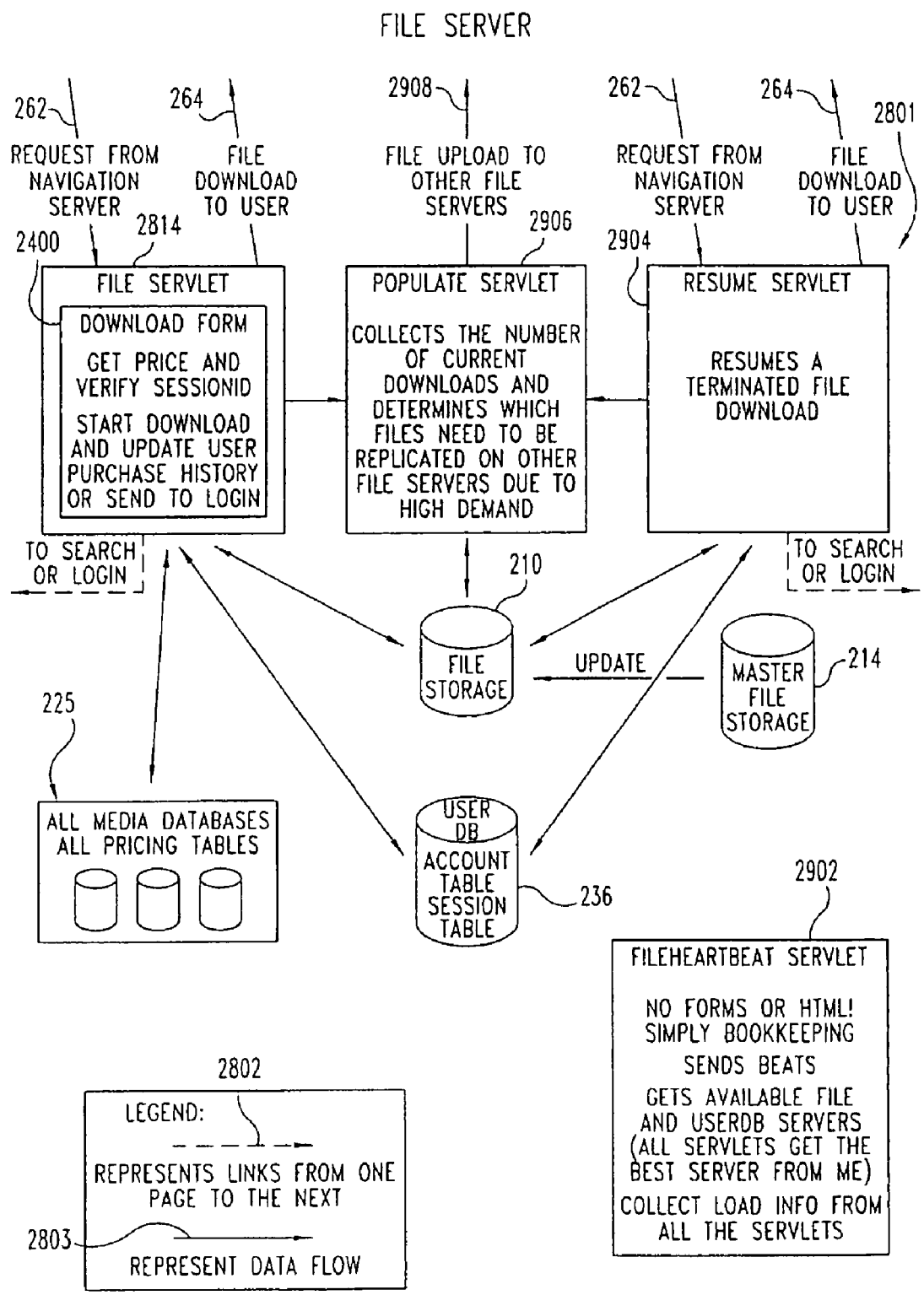
FIG. 29 shows a diagrammatic view of data flow between file servlets in the FIG. 2 system.

Although not loaded on the navigation server 204, file servlet 2814 is shown in FIG. 28 in order to show how the file servlet 2814 relates to the other servlets 2801 on the navigation server 204 in FIG. 28. As shown in FIGS. 28 and 29, the file servlet 2814 runs on the file servers 210 and is responsible for generating the download form 2400. The file servlet 2814 further verifies if the user has a valid, current session identification. If not, then the user is requested by the login servlet 2806 to login to the dynamic pricing system 102. After logging into the system, control is returned to the file servlet 2814. The download form 2400 is generated based on the media ID 318 and the home server location 328 that is stored in the media information tables 304. For example, the file servlet 2814 sends the download form 2400 to the customer device 124, and when the customer selects buy link 1732 in page 1700 or buy link 2320 in page 2300, the file servlet 2814 gets the pricing information from the pricing tables 306 in the databases 225 and debits the user account 390 in the user database 236. The file servlet 2814 further updates the quantity demand in the pricing 306 and media information 304 tables. As shown by arrow 264 in FIG. 2, the file servlet 2814 transfers a file containing the purchased content to the client 108.

As depicted in FIG. 29, each file server 210 incorporates a number of servlets 2801 that are used to control the operation of the file server 210. The servlets 2801 on the file server 210 include the file servlet 2814, a file heart beat servlet 2902, a resume download servlet 2904 and a populate servlet 2906. The file heartbeat servlet 2902 collects the load information from the servlets 2801 on the file server 210 and sends beat information to the heartbeat server 206. The file heartbeat servlet 2902 further retrieves the load information for the other file servers 210 and the database servers 208 from the heartbeat server 206. The heartbeat servlet 2902 communicates the load information to the other servlets 2801 on the file server 210. As mentioned above, the file servlet 2814 downloads purchased items to the clients 108. If while downloading an item, the user becomes disconnected from the network 106 or the download is interrupted in some other manner, the resume servlet 2904 allows the customer to download the content again for a specified period without being charged. For example, if a customer device 124 is disconnected from the dynamic pricing system 102 while downloading a song, the customer can download the song again within two days without having the price of the song deducted from their account for a second time.

In order to service high demand for a particular item, the populate servlet 2906 on each of the file servers 210 collects the number of current downloads of an item and determines which files need to be copied across multiple file servers 210. For example, when a song becomes popular, the populate servlet 2906 places copies of the song on multiple file servers 210, as indicated by arrow 2908. The home file server 210 for the particular song maintains a table that identifies the file servers 210 that have copies of the song. If the home file server 210 for the song is busy when a request to download the song is received, the home file server 210 forwards the request to one of the file servers 210 that has a copy of the song file, which processes the download request. Since the file servlet 2814 of the home file server 210 is always contacted first, the home file server 210 is always able to track the demand of the item and increment the demand in the pricing 306 and media information 304 tables.

Figure 30C:
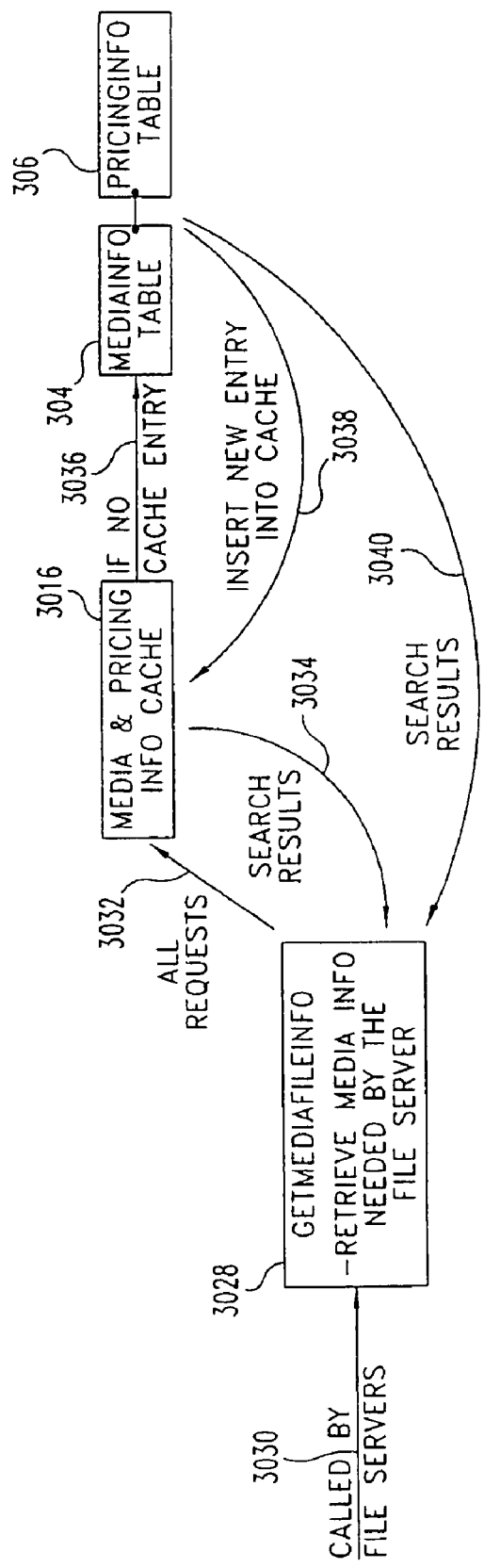
FIGS. 30A 30E show a diagrammatic view of data flow between database servlets in the FIG. 2 system.
Figure 30D:
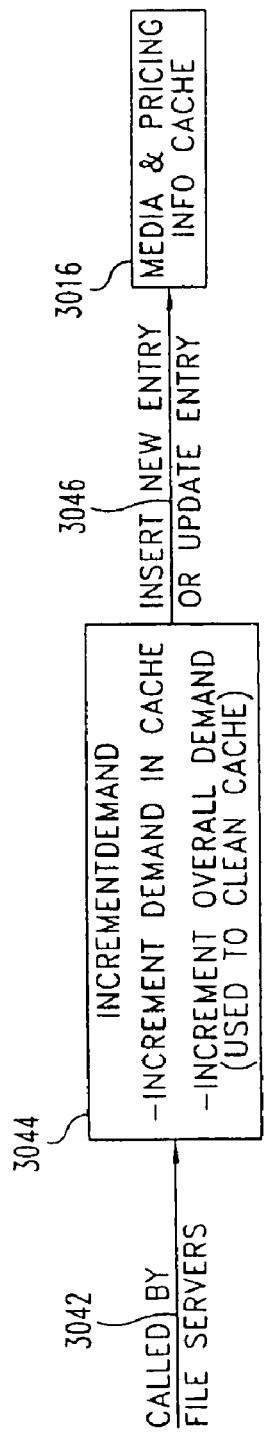
Figure 30E:
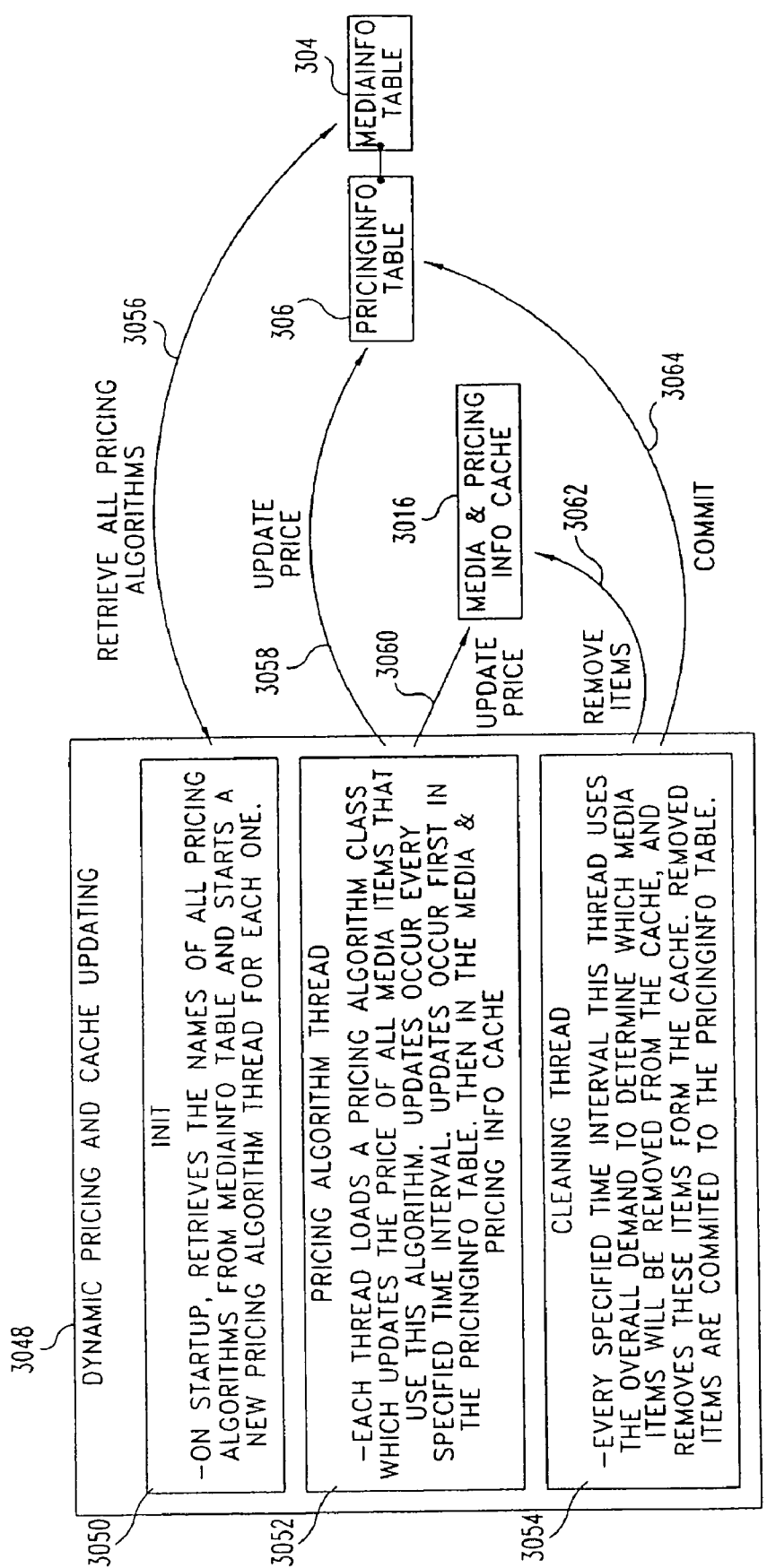

As shown in FIGS. 30A 30E each database server 208 includes a number of servlets 2801 that perform specific tasks on the database server 208. Perform query servlet 3002 can be called by any other part the dynamic pricing system 102, as shown by arrow 3004. As shown by arrow 3006, servlet 3002 can query, insert and/or delete records from the tables 302 of the databases 225. The results of the query, as indicated with arrow 3008, can be returned to servlet 3002.

As indicated by arrow 3010 in FIG. 30B, search servlets 2812 on the navigation servers 204 call execute search servlet 3012 on the database servers 208 in order to search for particular keywords in the media information tables 304. To improve response time for queries, the database servers 210 each maintain a keyword cache 3014 along with a media and pricing information cache 3016. The keyword cache 3014 is structured like the keyword table 308 and maintains a temporary list of popular keyword searches. The media and pricing information cache 3016 temporarily stores information about individual media items along with their current price. Like the keyword tables 308 and the media information tables 304, keyword cache 3014 and media cache 3016 are linked to one another via the media ID 318. When the execute search servlet 3012 receives a simple, or default search request, the execute search servlet 3012, as shown by arrow 3018, first queries the keyword cache 3014. For instance, a simple search can occur when the user is browsing by media type, such as the searches submitted through field 512. When the keyword cache 3014 contains the search keyword, the media cache 3016 returns the search results to servlet 3012, which is depicted with arrow 3020. As shown by arrow 3022, when the keyword cache 3014 does not include an entry for the keyword, the keyword table 308 is then queried. The keyword table 308 is directly queried by servlet 3012, when the user submits an explicit search, such as with form 1600 (arrow 3024). As mentioned above, the keyword 308 and pricing 306 tables are related to the media information table 304 via the media ID field 318. As shown by arrow 3026, the search results from tables 304 and 306 are returned to the execute search servlet 3012, which in turn returns the results to the search servlet 2812 (FIG. 28). As previously discussed, the search results can include the dynamic price for an item, such as a song. The dynamic price for the item is either retrieved from cache 3016 or from the pricing table 306.

As illustrated in FIG. 30, get media file information servlet 3028 is used to retrieve media and pricing information that is used by the file servers 210. As shown by arrow 3030, the file servers 210 can call servlet 3208. The media information servlet 3028 first sends all requests (arrow 3032) to the media cache 3016. If cache 3016 is able to process the request, the search results (arrow 3034) are returned to servlet 3028. When cache 3016 is unable to process the request, the search request is then processed by the media 304 and pricing 306 tables (arrow 3036). In response to the request, tables 304 and 306 insert a new entry corresponding to the search results into the media cache (arrow 3038) and return the search results to the media information servlet 3028 (arrow 3040). Afterwards, the search results from servlet 3028 are then returned to the calling file server 210.

As depicted with arrow 3042 in FIG. 30D, the file servers 210 call increment demand servlet 3044 to increase the quantity demand for an item in the media cache 3016. Servlet 3044 can either insert a new demand entry or update a demand entry for an item in cache 3016 (arrow 3046). For instance, when an item is purchased and downloaded the file server 210 will call the increment demand servlet 3044 in order record an order of the item. If a record for the item is not in cache 3016, increment demand servlet 3044 will create a new record in cache for the item. The record in cache 3016 can contain the media ID 318 and demand 348 (or 350) fields. When a record for the item already exists in cache, servlet 3044 increases the number contained in the demand field 350. Periodically, cache 3016 is cleaned and the demand information contained therein is transferred to the media 304 and pricing 306 tables before cleaning.

In each of the database servers 208, dynamic pricing servlet 3048 is used to dynamically price items in system 102. Servlet 3048 includes an initialization thread 3050, one or more pricing threads 3052, and one or more cleaning threads 3054. On startup of the database server 208, the initialization servlet 3050 retrieves the names of all of the pricing algorithms in field 336 for each item (arrow 3056) and starts a pricing thread 3052 for each pricing technique. As previously discussed, the dynamic pricing system 102 can use different techniques to price individual items and/or groups of items. For instance, country songs can be dynamically priced by a first pricing thread 3052 that uses the technique illustrated in FIG. 26; while jazz songs and mystery books can be dynamically priced by a second pricing thread 3052 that uses the technique illustrated in FIG. 27. In one form, as shown by arrow 3058, the pricing thread 3502 periodically updates at specified intervals the prices of items in fields 346 and 356 of the media table 304 and pricing table 306, respectively. After updating the pricing information in tables 304 and 306, the pricing thread 3502 then updates the pricing information in media cache 3016, as shown by arrow 3060. In one embodiment, the pricing thread 3052 updates the pricing information in tables 304 and 306 for all items that use the pricing thread 3052, and then updates the prices in cache 3016 for the items. In another embodiment, the pricing thread 3052 updates the pricing information in the media 304 and pricing 306 tables along with media cache 3016 individually for each item. The pricing threads 3052 can dynamically price items at different intervals, such as by minute, hourly, or daily. In one form, the pricing threads 3052 dynamically price items daily. When pricing thread 3052 uses the technique of dynamically pricing items based on time between purchases (FIG. 26), the pricing thread 3052 does not necessarily have to update the price at a fixed interval. For example, the pricing thread can update the price of the item after the item is purchased or when a page containing the price for the item is generated.

In FIG. 30E, the cleaning thread 3054 periodically removes items with low demand from the media cache 3016, as shown by arrow 3062, and commits these items removed from cache 3016 to the media 304 and pricing 306 tables, as indicated by arrow 3064. For instance, when the demand for an item in the last dynamic pricing period was zero (0), the cleaning thread 3054 removes the information about the item, such as the media ID, price and demand, from the media cache 3016 and commits this information to tables 304 and 306. It should be understood that the dynamic pricing system 102 can include a single cleaning thread 3054, multiple cleaning threads 3054 or no cleaning threads 3054 at all. For example, no cleaning threads 3054 are needed, when cache is not used. In one form, the cleaning thread 3054 operates periodically in conjunction with a corresponding pricing thread 3052. For example, each pricing thread 3052 can have a corresponding cleaning thread 3054 that runs either before or after the pricing thread 3052 dynamically prices items. In another form, the cleaning thread 3054 periodically operates at a different time interval as compared to the corresponding pricing thread 3052.

Figure 31:
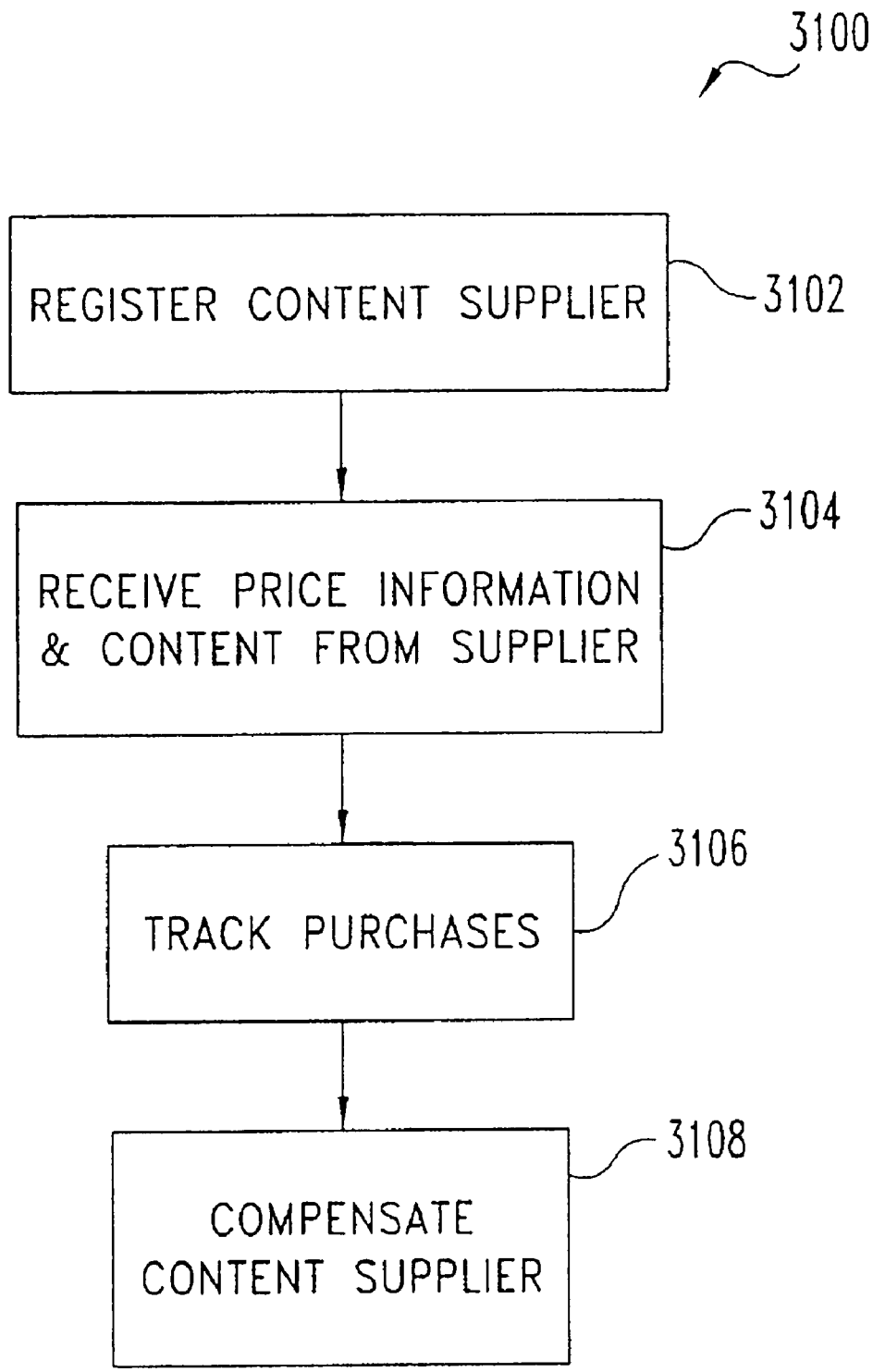
FIG. 31 is a flow diagram illustrating a technique for registering and compensating content suppliers according to one embodiment of the present invention.

A technique for receiving content and paying content suppliers will now be described below with reference to flow chart 3100 in FIG. 31. In stage 3102, a content supplier registers to supply content for sale on the dynamic pricing system 102. As mentioned above, the content suppliers can be for example artists, authors, agents, publishers, content owners, programmers, record labels, publishers, licensing organizations, producers, and the like. Referring to FIG. 10, the content supplier initiates the registration process by selecting artist button 522. After button 522 is selected, the dynamic pricing system 102 sends to the content supplier computer 116 an artist agreement and release form 3200. As illustrated in FIG. 32, form 3200 includes an agreement portion 3202 in which the terms of the artist agreement and release are listed. The name and address of the content supplier can be entered into fields 3204 and 3206, respectively. As should be appreciated, form 3200 can contain other fields in which additional information can be entered. The content supplier agrees with the terms of the agreement by selecting agree button 3208 and cancels the agreement by selecting cancel button 3210. In a further embodiment, the content supplier accepts the contract by applying their digital signature to the agreement form 3200 and sending an email with the agreement form 3200 to the dynamic pricing system 102. After form 3200 is submitted, the dynamic pricing system 102 can store a copy of the agreement in the database 225 for future reference.

Figure 33:
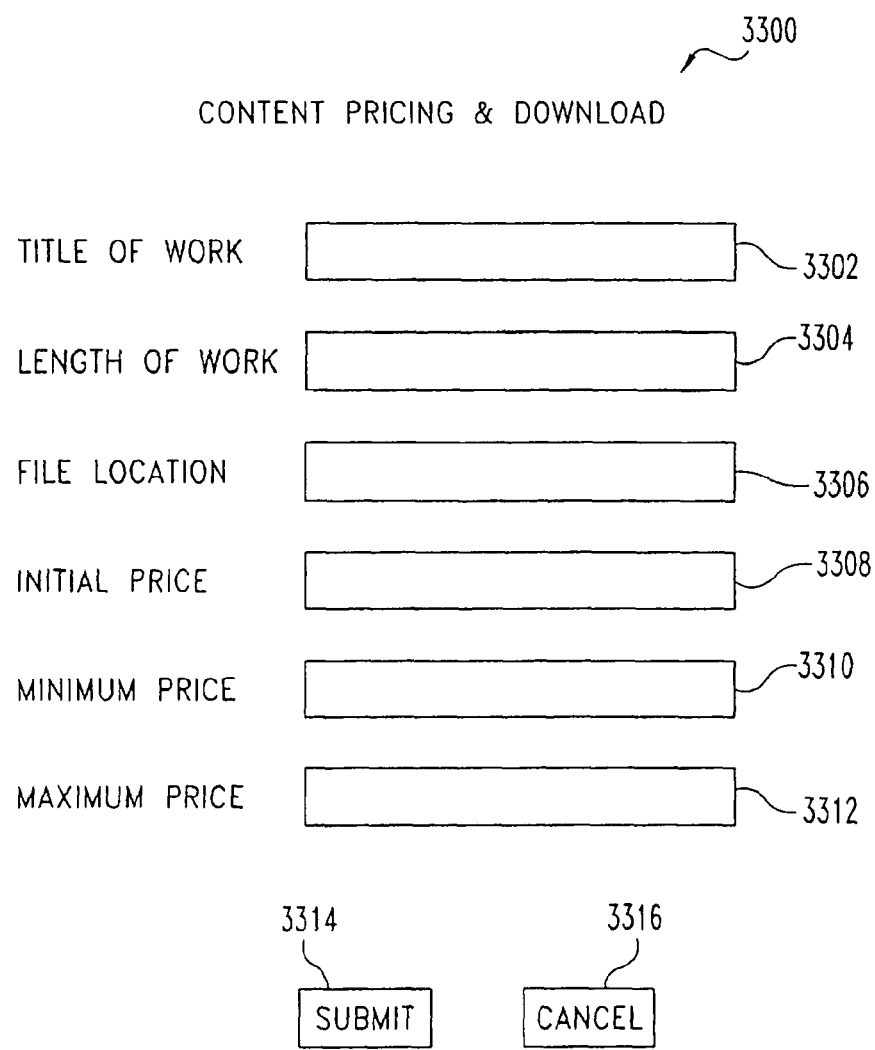
FIG. 33 shows a content pricing and download display screen for the dynamic pricing system.

In response to the submission of form 3200, the dynamic pricing system 102 sends to the content supplier computer 116 a content pricing and download form 3300. In later sessions, once the content supplier has accepted the agreement in form 3200, the dynamic pricing system 102 will send the pricing form 3300 when artist button 522 is selected. With form 3300, the content supplier is able automatically submit content for sale on the dynamic pricing system 102. As depicted in FIG. 33, form 3300 includes a title field 3302, a length field 3304, a file location field 3306, an initial price field 3308, a minimum price field 3310 and a maximum price field 3312. The content supplier can enter the title of the work in field 3302 and the length of the work in field 3304. The filename and path on the content supplier computer 116 for the file that contains the work for sale is entered into field 3306. In another embodiment, the content supplier can enter the path and/or IP address of another client 108 that contains the work in field 3306. The content supplier enters the initial offering price of the work into field 3308. Alternatively, the content supplier can leave field 3308 blank such that the administrator sets the initial price or a default initial price value is used. The content supplier can enter the minimum and maximum price of the work in fields 3310 and 3312, respectively. Alternatively, the content supplier can leave fields 3310 and 3312 blank so that no pricing limits are used when system 102 dynamically prices the work. In another embodiment, the content supplier with form 3300 can determine the rules, pricing techniques and time frames for the sale of the items. For example, when the content supplier provides a subscription service, such as for web site access to a music subscription service, the content supplier limit the access time to one week and/or specify the number of searches on the site. As should be appreciated, form 3300 can omit fields and/or contain additional fields, such a type of work field, an artist identification field, a cost field and a field specifying the dynamic pricing technique to use. In another embodiment, a spreadsheet interface is used to enter information for larger number of works, and in a further embodiment, database files for the items for sale from the content supplier are imported into the dynamic pricing system 102.

To submit the work, the content supplier selects submit button 3314, and in response, the content provider computer 116 transfers over the network 106 the file specified in the file location field 3306 along with the other information from form 3300 to the dynamic pricing system 102. As should be appreciated, with the P2P embodiment of the dynamic pricing system 102, the client 108 only needs to transfer the information from form 3300 to system 102 and does not need to transfer the file. However, in another form of the P2P embodiment, the file is transferred. In stage 3104, the dynamic pricing system 102 receives the file containing the downloaded content and the other information from form 3300. The dynamic pricing system 102 stores the downloaded file in at least one of the file servers 210 and submits the information about the work to the database servers 208. In another embodiment, the dynamic pricing system 102 adds the work to the master database server 212 and the master file server 214, which in turn updates the database 208 and file 210 servers so as to incorporate the new work. In the pricing form 3300, the content provider can cancel a submission by selecting cancel button 3316.

In another embodiment, stages 3102 and 3104 can be performed manually. For example, the artist can manually execute the required paperwork and mail the paperwork along with copies of the content, such as a CD containing the work, to the administrator of the dynamic pricing system 102. Once the paperwork and content is received, the administrator with the administrative computer 104 can add the work and pricing information to master servers 212 and 214. During their periodic update of the database 208 and file 210 servers, the master database server 212 and master file server 214 add the new work to servers 208 and 210.

In stage 3106, the dynamic pricing system 102 tracks the purchases of the work, and the dynamic pricing system 102 stores the price and quantity demand for the item in the database servers 208. In stage 3108, the content supplier of the work is compensated for the work. The owner of the dynamic pricing system 102 generates revenue by receiving a portion of the revenue generated by the sale of items on the dynamic pricing system 102. In one embodiment, the content supplier is paid a percentage of the profit generated from the sales of the work on the dynamic pricing system 102. In another embodiment, the content supplier is paid a fixed fee for each time the work is purchased, and in a further embodiment, the content supplier can be paid a flat fee for the work. The compensation can be sent to the content supplier in a number of manners. For example, each time the work is sold, the account balance 390 for the content provider can be credited. The content supplier can also have the money credited to a deposit account each time the work is purchased. Alternatively, the dynamic pricing system 102 can periodically send a check to the content supplier for the amount the work earned during the last period. In another arrangement, the third party payment system 136, such as PayPal.com, supplies the payment to the content supplier. It should be understood that other types of compensation arrangements can be made.

Figure 34:
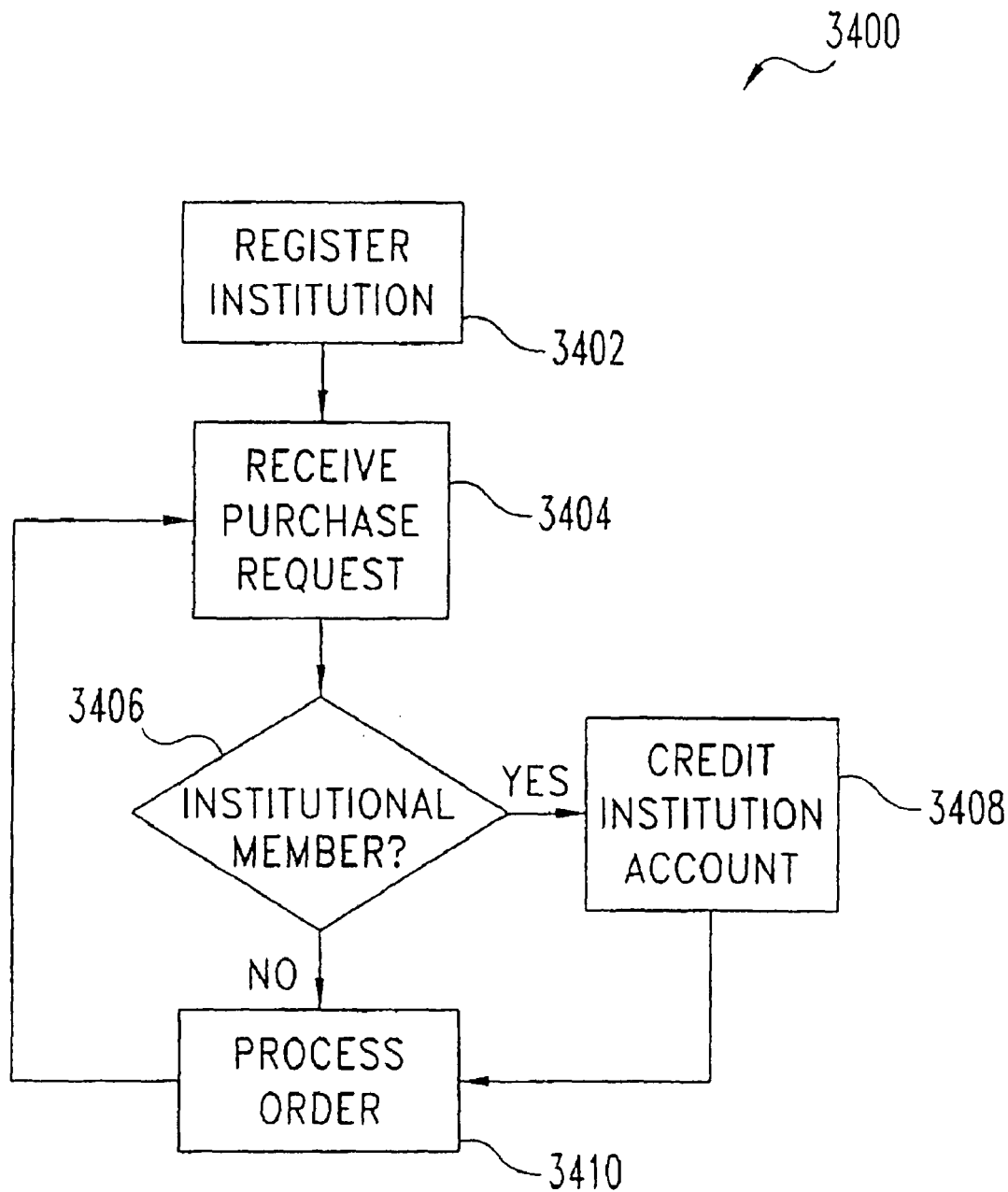
FIG. 34 is a flow diagram illustrating a technique for providing incentives in order to gain access to institutional networks according to one embodiment of the present invention.

As discussed above, institutions such as colleges and universities have blocked file swapping services from their networks 115 because the large volumes of downloads from such systems clog their networks 115. With the high loads created by the file swapping services, institutions bear significant costs and yet receive no benefit from the file swapping services. A technique for providing institutions incentives to allow their members access the dynamic pricing system 102 will now be described with reference to flowchart 3400 in FIG. 34. With this technique, since institutions benefit when their members to use the dynamic pricing system 102, the institutions will be more inclined to not block access to the dynamic pricing system 102. In stage 3402, a representative of the institution, which operates network 115, registers with the dynamic pricing system. During the registration stage 3402, the representative provides the name of the institution along with other information about the institution to the dynamic pricing system 102. The representative can register the institution directly with the dynamic pricing system 102 by filling out an online form. Alternatively, the representative can contact and supply the information to the system administrator, and the system administrator can then enter the information into the dynamic pricing system 102. In another embodiment, institutional registration is optional such that an institution does not need to register in order to receive compensation. For example, the institutional network 115 can be automatically identified by the IP address of the user, and the compensation can be forwarded to the institution and/or the institution contacted about the compensation without requiring any registration by the institution. The representative in stage 3402 further indicates how members of the institution can be identified. These institutional member identifiers can include, but are not limited to, the IP addresses of the institutional devices 125, the IP address of a firewall for the institutional network 115, a client identifier such as a "cookie", and the domain name for the institution. In one form, the domain name for email accounts on the institutional network 115 is used to identify institutional members like college students. Moreover, in stage 3402, the representative can specify how any revenue generated by the institution on the dynamic pricing system 102 is to be paid. For example, a university can designate a particular scholarship that will receive the funds from the dynamic pricing system 102. After the institutional information is submitted, the dynamic pricing system 102 stores the information (all or part) in the database servers 208. In one form, the dynamic pricing system 102 creates a user account for the institution and records the institutional information in the user account. In another form, the institutional information is maintained in one or more separate database tables 302.

In stage 3404, the dynamic pricing system 102 receives a purchase request from a customer, and in stage 3406, the processor 110 of the dynamic pricing system 102 determines whether the customer is a member of one of the registered institutions. In one embodiment, system 102 compares the domain name in the email address field 386 of the customer in account table 312 with the domain name supplied by the institution in order to determine if the customer is a member of the institution. For example, if a college specified that its students have the "college.edu" domain name in their email addresses, then any student that entered an email address with the "college.edu" in the email address field 624 of form 600 (FIG. 6), such as "jsmith@college.edu", would be identified as a member of that college. In another embodiment, system 102 compares the IP address, or some other addressing scheme, of the customer device 124 with the IP addresses (or other address) given by the institution in order to determine if the customer is a member of the institution. If the customer is a member of the institution, the dynamic processing system 102 in stage 3408 credits the account of the institution and in stage 3410 processes the order from the customer. If in stage 3406 the customer is not an institutional member, then system 102 proceeds to stage 3410 in order to process the order. After processing the order in stage 3410, the dynamic pricing system is able to receive other orders in stage 3404. As should be appreciated, the stages in flow chart 3400 can be performed in a different sequence than is shown. For example, the order can be processed and fulfilled in stage 3410 before the dynamic system 102 determines whether or not the customer is an institutional member in stage 3406. In another embodiment, the dynamic pricing system 102 periodically (such as monthly) reviews the purchases of customers that have been identified as institutional members and credits the account of the institutions based on the purchases of their members.

The money accumulated in the institution account can be disbursed at set intervals, at variable intervals, when a specific amount is accumulated, after every purchase by a member, when a specified traffic level is reached and/or in other manners as specified by the institution. As should be appreciated, the payments can be made in the same manners as described above for the content suppliers. For instance, one or more scholarships, which were designated by the university, can receive a monthly check from the dynamic pricing system 102 for the last month's account balance. By directly and/or indirectly receiving compensation from the dynamic pricing system 102, institutions that run institutional networks 115 are provided with an incentive to allow their members to access the dynamic pricing system 102. In one form, five-percent (5%) of sales are rewarded to the institution, and in another form, the institution is rewarded $0.005 (½ cent) from each sale. As should be understood other types of compensation packages and/or amounts can be used. It should be appreciated that the above technique can be applied to other types of institutions, besides learning institutions, that experience problems with high network traffic, such as charitable organizations and corporations.

As should be appreciated the above-discussed dynamic pricing system 102 can be used to dynamically price other types of items. These items can include, but are not limited to, movie tickets; concert tickets; CD's containing selected songs; DVD's; artist memorabilia, such as t-shirts and the like; and video rental coupons. The coupons and tickets can be downloaded from the dynamic pricing system 102 and/or physically delivered to the customer. When a ticket or coupon is downloaded, the customer can print the ticket out with the printer 125. To prevent forgery, the tickets and coupons can contain authentication information, such as a unique serial number, bar code and/or design. Artist memorabilia for example can be physically delivered to the customer or the customer can download a coupon that can be redeemed at a local store in order to receive the memorabilia. Likewise, a CD containing selected songs and/or albums can be mailed to the customer or a coupon for the CD can be redeemed at a local store.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:
1. A method, comprising:
identifying a plurality of media items belonging to a category;
grouping using a processor a first plurality of the media items identified as belonging to the category into a first group based on a sales criteria associated with each of the plurality of media items;
pricing each media item in the first group according to a first pricing strategy using a processor;
sending a first price determined by the processor using the first pricing strategy of a first item of the plurality of items in the first group for sale from a processor to one or more clients over a network;
grouping using a processor a second plurality of the media items identified as belonging to the category into a second group based on a sales criteria associated with each of the plurality of media items; pricing each media item in the second group according to a second pricing strategy;
sending a second price determined by the processor using the second pricing strategy of a second item of the plurality of items in the second group for sale from a processor to one or more clients over a network;
wherein the value of the sales criteria associated with each of the media items in the first group is superior to the value of the sales criteria associated with each of the media items in the second group and wherein the first pricing strategy generates a higher price for media items in the first group than the price generates for each media item in the second group by the second pricing strategy;

receiving one or more orders for the second of the plurality of items in the second group at the second price from one or more of the clients, updating the sales criteria for the second of the plurality of items in the second group using the processor, and regrouping the plurality of items into the first and second groups based on the updated sales criteria.

2. The method of claim 1 wherein the category identifies the type of work of the media item.

3. The method of claim 2 wherein the type of work of the media item is selected from the group of music, text, software or video.

4. The method of claim 1, wherein the category identifies the genre of the media item.

5. The method of claim 1, wherein the sales criteria associated with the media item is reflective of the volume of sales.

6. The method of claim 5, wherein the sales criteria associated with each media item is the rank of the sales of the media item relative to the other media items identified as belonging to the category.

7. The method of claim 1, wherein the sales criteria associated with the media item is reflective of the volume of sales.

8. The method of claim 7, wherein the sales criteria associated with each media item is the rank of the sales of the media item relative to the other media items identified as belonging to the category.

9. The method of claim 1, wherein the sales criteria associated with each item is profit.

10. The method of claim 1, wherein the sales criteria associated with each item is revenue.

11. The method of claim 1 wherein the first pricing strategy generates a median price and further comprising randomly pricing each item in the first group within a price randomly distributed about the median price.

12. The method of claim 11 wherein the median price is dynamically adjusted.

13. The method of claim 1 wherein the first pricing strategy generates a price and further comprising pricing each item in the first group at the price.

14. The method of claim 13, wherein the price is dynamically adjusted.

15. The method of claim 1 and further comprising:
grouping by a processor a third plurality of the items identified as belonging to the category into a third group based on a sales criteria associated with each of the plurality of items;
pricing each item in the third group according to a third pricing strategy;
wherein the value of the sales criteria associated with each of the items in the third group is inferior to the value of the sales criteria associated with each of the items in the second group and the third pricing strategy generates a lower price for each item in the third group than the second pricing strategy.

16. A method, comprising:
identifying a plurality of media items belonging to a category;
grouping by a processor a first plurality of the media items identified as belonging to the category into a first group based on a sales criteria associated with each of the plurality of media items;
pricing each media item in the first group according to a first pricing strategy by a processor;
sending a first price determined by the processor using the first pricing strategy of a first item of the plurality of items in the first group for sale from a processor to one or more clients over a network;
grouping by a processor a second plurality of the media items identified as belonging to the category into a second group based on a sales criteria associated with each of the second plurality of media items;
pricing each media item in the second group according to a second pricing strategy;
sending a second price determined by the processor using the second pricing strategy of a second item of the plurality of items in the second group for sale from a processor to one or more clients over a network;
the sales criteria associated with each of the media items in the first group and the sales criteria associated with each of the media items in the second group is from one of profit, revenue, absolute sales numbers, cost and marginal cost,
the value of the sales criteria associated with each of the media items in the first group is superior to the value of the sales criteria associated with each of the media items in the second group, and
the first pricing strategy is associated with one of ranking of sales volume for a media item in the first group as compared to all other media items, all other media items in the first group, and all other media items with same artist, and
the second pricing strategy is associated with one of ranking of sales volume for a media item in the second group as compared to all other media items, all other media items in the second group as compared to all other media items, all other media items in the second group, and all other media items with same artist;
receiving one or more orders for the second of the plurality of media items in the second group at the second price from one or more of the clients, updating the sales criteria for the second of the plurality of items in the second group by the processor, and regrouping the plurality of items into the first and second groups based on the updated sales criteria.

17. The method of claim 16, the first pricing strategy generates a higher price for media items in the first group than the price generated for each media item in the second group by the second pricing strategy.

18. The method of claim 16, further comprising:
grouping by a processor a third plurality of the items identified as belonging to the category into a third group based on a sales criteria associated with each of the plurality of items; and
pricing each item in the third group according to a third pricing strategy;
the value of the sales criteria associated with each of the items in the third group is inferior to the value of the sales criteria associated with each of the items in the second group and the third pricing strategy generates a lower price for each item in the third group than the second pricing strategy.

* * * * *